United States Patent
Choi et al.

(10) Patent No.: US 11,570,803 B2
(45) Date of Patent: Jan. 31, 2023

(54) METHOD, APPARATUS AND SYSTEM FOR TRANSMITTING AND RECEIVING A PHYSICAL UPLINK SHARED CHANNEL (PUSCH) IN A WIRELESS COMMUNICATION SYSTEM

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 17/585,566

(22) Filed: Jan. 27, 2022

(65) Prior Publication Data
US 2022/0150928 A1   May 12, 2022

Related U.S. Application Data

(63) Continuation of application No. PCT/KR2020/010233, filed on Aug. 3, 2020.

(30) Foreign Application Priority Data

Aug. 1, 2019  (KR) .................. 10-2019-0093865
Aug. 14, 2019  (KR) .................. 10-2019-0099740
(Continued)

(51) Int. Cl.
*H04W 72/00* (2009.01)
*H04W 72/12* (2009.01)

(52) U.S. Cl.
CPC .......................... *H04W 72/1268* (2013.01)

(58) Field of Classification Search
CPC ............ H04W 72/1268; H04W 48/10; H04W 72/042; H04L 1/08; H04L 27/2602; H04L 5/0044; H04L 5/0078
See application file for complete search history.

(56) References Cited

U.S. PATENT DOCUMENTS

2020/0100311 A1\* 3/2020 Cirik ..................... H04W 76/19
2020/0221478 A1   7/2020 Fakoorian et al.
(Continued)

FOREIGN PATENT DOCUMENTS

EP    2 286 536    3/2013
EP    3 697 013    8/2020
(Continued)

OTHER PUBLICATIONS

International Search Report for PCT/KR2020/010233 dated Oct. 30, 2020 and its English translation from WIPO (now published as WO 2021/020955).
(Continued)

*Primary Examiner* — Khaled M Kassim
*Assistant Examiner* — Zhaohui Yang
(74) *Attorney, Agent, or Firm* — Ladas & Parry, LLP

(57) ABSTRACT

Disclosed is a method for a user equipment to transmit a physical uplink shared channel (PUSCH) to a base station in a wireless communication system. The user equipment may receive, from the base station, configuration information for PUSCH transmission and a physical downlink control channel (PDCCH) for scheduling repeated transmission of the PUSCH. Thereafter, the user equipment may determine one or more invalid symbols for the repeated transmission of the PUSCH, and may repeatedly transmit the PUSCH on symbols other than the determined symbols.

22 Claims, 32 Drawing Sheets

(30) Foreign Application Priority Data

Aug. 15, 2019 (KR) ........................ 10-2019-0100004
May 14, 2020 (KR) ........................ 10-2020-0057761

(56) References Cited

U.S. PATENT DOCUMENTS

| | | |
|---|---|---|
| 2020/0267756 A1 | 8/2020 | Fakoorian et al. |
| 2020/0274639 A1 | 8/2020 | Yang et al. |
| 2020/0313793 A1 | 10/2020 | Jung et al. |
| 2020/0367208 A1 | 11/2020 | Khoshnevisan et al. |
| 2021/0022158 A1 | 1/2021 | Wei et al. |
| 2021/0153207 A1 | 5/2021 | Bhamri et al. |

FOREIGN PATENT DOCUMENTS

| | | | |
|---|---|---|---|
| EP | 3 697 015 | 8/2020 | |
| KR | 10-2011-0009723 | 1/2011 | |
| KR | 10-2019-0019837 | 2/2019 | |
| KR | 10-2019-0085507 | 7/2019 | |
| WO | WO-2018004246 A1 * | 1/2018 | ............... H04L 5/00 |
| WO | WO-2019031787 A1 * | 2/2019 | ........... H04L 1/0038 |
| WO | 2020/030013 | 2/2020 | |
| WO | 2020/033785 | 2/2020 | |
| WO | 2020/069359 | 4/2020 | |
| WO | 2020/165835 | 8/2020 | |
| WO | 2020/167238 | 8/2020 | |
| WO | 2020/167650 | 8/2020 | |
| WO | 2020/172613 | 8/2020 | |
| WO | 2021/000707 | 1/2021 | |
| WO | 2021/020955 | 2/2021 | |

OTHER PUBLICATIONS

Written Opinion of the International Searching Authority for PCT/KR2020/010233 dated Oct. 30, 2020 and its English translation by Google Translate (now published as WO 2021/020955).

3GPP TS 38.213 V15.6.0: "3$^{rd}$ Generation Partnership Project; Technical Specification Group Radio Access Network; NR; Physical layer procedures for control (Release 15)", Jun. 2019. See pp. 1-107.

3GPP TS 38.214 V15.6.0: "3$^{rd}$ Generation Partnership Project; Technical Specification Group Radio Access Network; NR; Physical layer procedures for control (Release 15)", Jun. 2019. See pp. 1-105.

Office Action dated Jul. 25, 2022 for Indian Patent Application No. 202227002856.

* cited by examiner (a)

(b)

(a) L=3, S=5, K=2
(gap symbol not used)

(b) L=3, S=5, K=2
(gap symbol used)

METHOD, APPARATUS AND SYSTEM FOR TRANSMITTING AND RECEIVING A PHYSICAL UPLINK SHARED CHANNEL (PUSCH) IN A WIRELESS COMMUNICATION SYSTEM

CROSS-REFERENCE TO RELATED APPLICATIONS

This application is a continuation of International Patent Application No. PCT/KR2020/010233 filed on Aug. 3, 2020, which claims the priority to Korean Patent Application No. 10-2019-0093865 filed in the Korean Intellectual Property Office on Aug. 1, 2019, Korean Patent Application No. 10-2019-0099740 filed in the Korean Intellectual Property Office on Aug. 14, 2019, Korean Patent Application No. 10-2019-0100004 filed in the Korean Intellectual Property Office on Aug. 15, 2019, and Korean Patent Application No. 10-2020-0057761 filed in the Korean Intellectual Property Office on May 14, 2020, the entire contents of which are incorporated herein by reference.

TECHNICAL FIELD

The present invention relates to a wireless communication system, and more particularly, to a method for transmitting/receiving a physical uplink shared channel (PUSCH) in a wireless communication system.

BACKGROUND ART

3GPP LTE(-A) defines uplink/downlink physical channels to transmit physical layer signals. For example, a physical uplink shared channel (PUSCH) that is a physical channel for transmitting data through an uplink, a physical uplink control channel (PUCCH) for transmitting a control signal, a physical random access channel (PRACH), and the like are defined, and there are a physical downlink shared channel (PDSCH) for transmitting data to a downlink as well as a physical control format indicator channel (PCFICH) for transmitting L1/L2 control signals, a physical downlink control channel (PDCCH), a physical hybrid ARQ indicator channel (PHICH), and the like.

The downlink control channels (PDCCH/EPDCCH) among the above channels are channels for a base station to transmit uplink/downlink scheduling allocation control information, uplink transmit power control information, and other control information to one or more user equipments. Since resources available for PDCCH that can be transmitted by a base station at one time are limited, different resources cannot be allocated to each user equipment, and control information should be transmitted to an arbitrary user equipment by sharing resources. For example, in 3GPP LTE(-A), four resource elements (REs) may be grouped to form a resource element group (REG), nine control channel elements (CCEs) may be generated, resources capable of combining and sending one or more CCEs may be notified to a user equipment, and multiple user equipments may share and use CCEs. Here, the number of combined CCEs is referred to as a CCE combination level, and a resource to which CCE is allocated according to a possible CCE combination level is referred to as a search space. The search space may include a common search space defined for each base station and a terminal-specific or UE-specific search space defined for each user equipment. A user equipment performs decoding for the number of cases of all possible CCE combinations in the search space, and may recognize whether the user equipment belongs to a PDCCH through a user equipment (UE) identifier included in the PDCCH. Therefore, such an operation of a user equipment requires a long time for decoding a PDCCH and unavoidably causes a large amount of energy consumption.

Efforts are being made to develop an improved 5G communication system or pre-5G communication system to satisfy wireless data traffic demand that is increasing after the commercialization of a 4G communication system. For this reason, a 5G communication system or pre-5G communication system is referred to as a beyond 4G network communication system or post-LTE system. It is considered to implement a 5G communication system in an ultrahigh frequency (mmWave) band (e.g., 60-GHz band) to achieve a high data transfer rate. To reduce a radio propagation path loss and increase a transfer distance of radio waves in an ultrahigh frequency band, beamforming, massive MIMO, full dimensional MIMO (FD-MIMO), array antenna, analog beamforming, and large scale antenna technologies are discussed in the field of a 5G communication system. Furthermore, to improve a network of a system, technologies such as advanced small cell, cloud radio access network (cloud RAN), ultra-dense network, device-to-device communication (D2D), wireless backhaul, moving network, cooperative communication, Coordinated Multi-Points (CoMP), interference cancellation, and the like are developed in the field of a 5G communication system. In addition, hybrid FSK and QAM modulation (FQAM) and sliding window superposition coding (SWSC), which are advanced coding modulation (ACM) schemes, and filter bank multi carrier (FBMC), nonorthogonal multiple access (NOMA), and sparse code multiple access (SCMA), which are advanced access technologies, are developed in the field of a 5G system.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Here, various attempts are made to apply a 5G communication system to an IoT network. For example, technologies such as sensor network, machine to machine (M2M), and machine type communication (MTC) are implemented with 5G communication technologies, i.e., beamforming, MIMO, array antenna, and the like. Applying a cloud radio access network (cloud RAN) as the above-described big data processing technology may be an example of convergence of 5G technology and IoT technology.

In general, a mobile communication system has been developed to provide a voice service while securing activity of a user. However, the area of a mobile communication system is expanding to not only a voice service but also a data service, and has been so developed as to provide a high-speed data service at the present time. However, in a mobile communication system which is currently being used to provide a service, a resource shortage phenomenon occurs and users require higher-speed services. Thus, a more developed wireless communication system is required.

As described above, a future 5G technology requires lower latency of data transmission with the advent of new applications such as real-time control and tactile Internet, and a required latency of 5G data is expected to be decreased to 1 ms. 5G has an objective of providing a data latency that is reduced by about 10 times compared to the prior art. To resolve such problems, a 5G communication system is expected to be proposed, which uses a mini-slot having a shorter TTI interval (e.g., 0.2 ms) in addition to an existing slot (or subframe).

In the Rel-16 enhanced URLLC (eURLLC), various technologies for providing a lower latency time and higher reliability are discussed. To provide a lower latency time, transmission of an uplink control channel including two or more HARQ-ACKs in a single slot is supported. A user equipment is enabled to transmit HARQ-ACK as quickly as possible as a response for success of reception of a downlink shared channel, thereby securing a lower latency time.

DISCLOSURE OF THE INVENTION

Technical Problem

An object of an embodiment of the present invention is to provide a method for a user equipment to repeatedly transmit a physical uplink shared channel (PUSCH) to a base station in a wireless communication system and a user equipment therefor.

Technical Solution

A method for a user equipment to transmit a physical uplink shared channel (PUSCH) to a base station in a wireless communication system includes the steps of: receiving configuration information for PUSCH transmission from the base station, the configuration information including resource information related to a control resource set used for an initial access procedure; receiving a physical downlink control channel (PDCCH) for scheduling repeated transmission of the PUSCH; determining one or more invalid symbols for the repeated transmission of the PUSCH; and repeatedly transmitting the PUSCH on at least one symbol scheduled by the PDCCH except for the invalid symbols, wherein the one or more invalid symbols are indicated by the resource information related to the control resource set used for the initial access procedure.

Furthermore, in the present invention, the configuration information is indicated by a PBCH, and the control resource set has an index value of 0.

Furthermore, in the present invention, the one or more invalid symbols further include a symbol indicated by a semi-static downlink symbol for downlink reception and synchronization signal (SS) and/or a symbol for receiving a physical broadcast channel (PBCH) in a cell in which the repeated transmission of the PUSCH is performed.

Furthermore, in the present invention, the semi-static downlink symbol and the symbol for receiving the PBCH are indicated by the configuration information.

Furthermore, in the present invention, when the user equipment supports only a half duplex mode, the one or more invalid symbols further include symbol indicated for receiving a downlink channel and signal and/or a symbol indicated by a semi-static downlink symbol in a cell different from a cell in which the repeated transmission of the PUSCH is performed.

Furthermore, in the present invention, the one or more invalid symbols further include a gap symbol, and the gap symbol is at least one symbol positioned after a symbol indicated for downlink reception.

Furthermore, in the present invention, a subcarrier spacing of the gap symbol is a reference subcarrier spacing included in semi-static uplink and/or downlink configuration information of a cell to which the gap symbol is applied for the repeated transmission of the PUSCH.

Furthermore, in the present invention, the symbol indicated for downlink reception is a semi-static downlink symbol, a symbol for receiving a SSB/PBCH block, or a symbol included in the control resource set.

Furthermore, in the present invention, when symbols on which the repeated transmission of the PUSCH is performed and symbols for transmitting a physical uplink control channel (PUCCH) overlap with each other on at least one symbol, the PUSCH and uplink control information (UCI) of the PUCCH are multiplexed and transmitted on a first symbol set among at least one symbol set including the at least one symbol, and the at least one symbol set is a resource on which the repeated transmission of the PUSCH is performed.

Furthermore, in the present invention, the PUSCH transmitted on the first symbol set satisfies a processing time for multiplexing with the UCI.

Furthermore, in the present invention, the PUSCH and the UCI are multiplexed only when the number of symbols for repeatedly transmitting the PUSCH exceeds one in each slot.

Furthermore, the present invention provides a user equipment including: a communication module; and a processor for controlling the communication module, wherein the processor: receives configuration information for PUSCH transmission from the base station, the configuration information including resource information related to a control resource set used for an initial connection procedure; receives a physical downlink control channel (PDCCH) for scheduling repeated transmission of the PUSCH; determines one or more invalid symbols for the repeated transmission of the PUSCH; and repeatedly transmits the PUSCH on at least one symbol scheduled by the PDCCH except for the invalid symbols, wherein the one or more invalid symbols are indicated by the resource information related to the control resource set used for the initial connection procedure.

Advantageous Effects

According to a method for a user equipment to repeatedly transmit PUSCH to a base station according to an embodiment of the present invention, the target performance of a 5G wireless communication system for providing a highly reliable service with low latency can be achieved by enabling a user equipment to repeatedly transmit PUSCH to a base station as quickly as possible.

The effects obtained by the present invention are not limited to the above effects, and other effects would be clearly understood by those of ordinary skill in the art from the following description.

MODE FOR CARRYING OUT THE INVENTION

Figure 1:
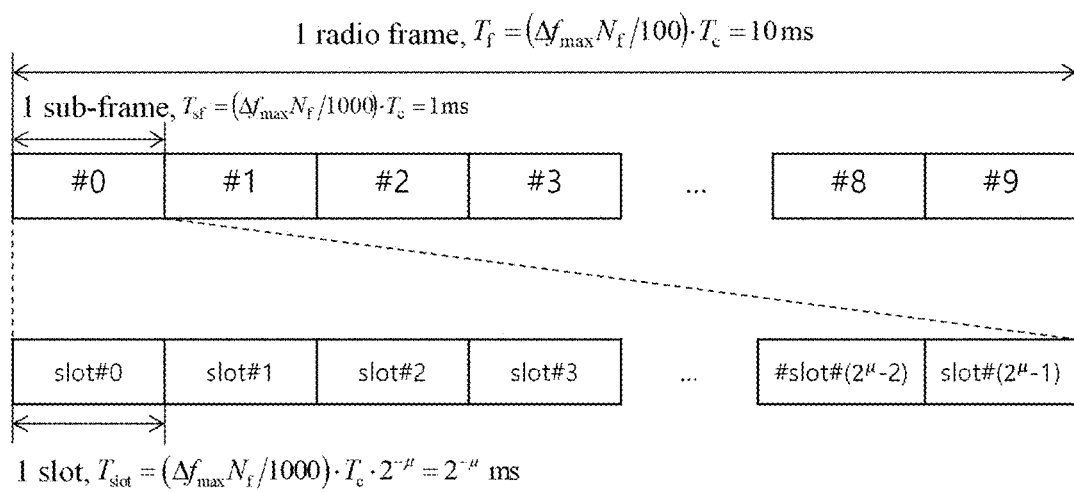
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified in this specification, a base station may refer to a next generation node B (gNB) as defined in 3GPP NR. Furthermore, unless otherwise specified, a terminal may refer to a user equipment (UE).

Although details of the description are separately categorized into embodiments below to assist with an understanding, the embodiments may be used in combination. In the present disclosure, a configuration of a user equipment may represent a configuration by a base station. In detail, a base station may transmit a signal to a user equipment to set a parameter value used in operation of the user equipment or a wireless communication system.

FIG. 1 illustrates an example of a wireless frame structure used in a wireless communication system. Referring to FIG. 1, the wireless frame (or radio frame) used in the 3GPP NR system may have a length of 10 ms ($\Delta f_{max} N_f / 100) * T_c$). In addition, the wireless frame includes 10 subframes (SFs) having equal sizes. Herein, $\Delta f_{max} = 480 * 10^3$ Hz, $N_f = 4096$, $T_c = 1/(\Delta f_{ref} * N_{f, ref})$, $\Delta f_{ref} = 15 * 10^3$ Hz, and $N_{f, ref} = 2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and µ can have a value of µ=0, 1, 2, 3, 4 as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one subframe. In addition, numbers from 0 to $10*2^\mu-1$ may be respectively allocated to slots within one wireless frame. The time resource may be distinguished by at least one of a wireless frame number (also referred to as a wireless frame index), a subframe number (also referred to as a subframe index), and a slot number (or a slot index).

Figure 2:
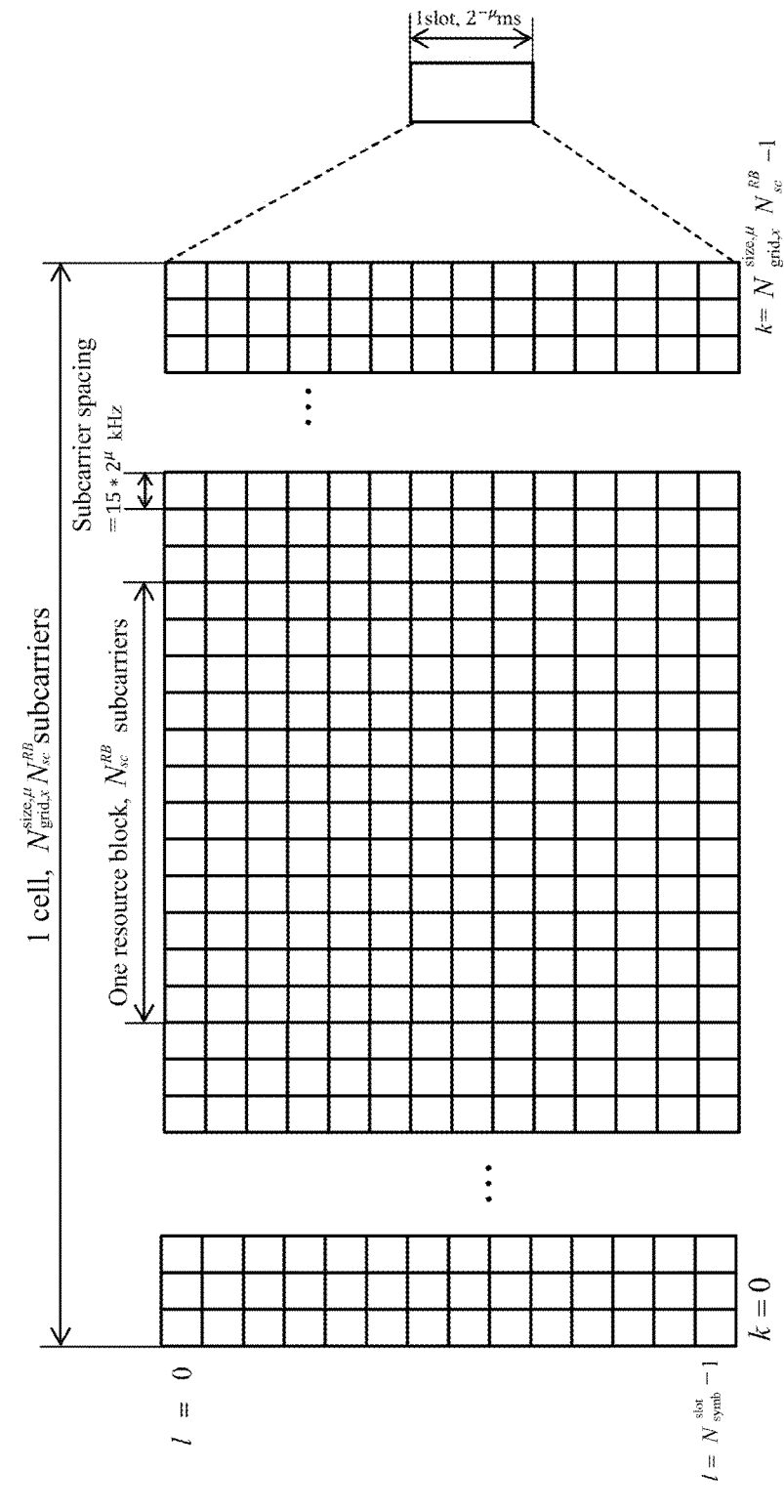
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system. There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 successive subcarriers in a frequency domain. Referring to FIG. 2, a signal transmitted from each slot may be represented by a resource grid including $N^{size, \mu}_{grid, x} * N^{RB}_{sc}$ subcarriers, and $N^{slot}_{symb}$ OFDM symbols. Here, x=DL when the signal is a DL signal, and x=UL when the signal is an UL signal. $N^{size, \mu}_{grid, x}$ represents the number of resource blocks (RBs) according to the subcarrier spacing constituent µ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size, \mu}_{grid, x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb} * N^{RB}_{sc}$ resource elements. Each resource element in the resource grid can be uniquely defined by a pair of indexes (k, l) in one slot. k may be an index assigned from 0 to $N^{size, \mu}_{grid, x} * N^{RB}_{sc}-1$ in the frequency domain, and l may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

Figure 3:
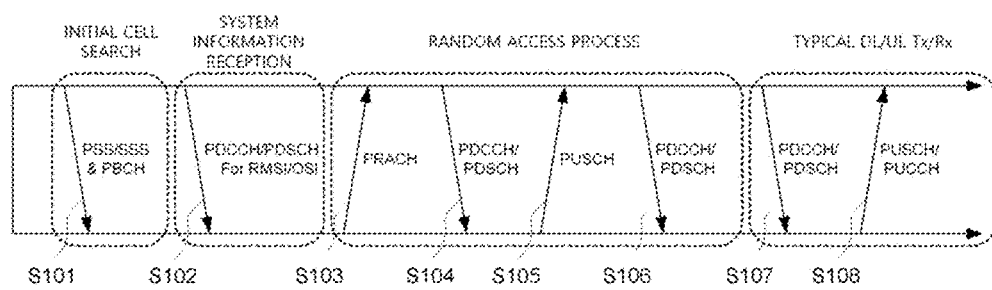
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102).

Here, the system information received by the user equipment is cell-common system information for the user equipment to correctly operate in a physical layer in radio resource control (RRC), and is referred to as remaining system information or system information block (SIB).

When the UE initially accesses the base station or does not have radio resources for signal transmission, the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The user equipment may obtain terminal-specific system information required for the user equipment to correctly operate in a physical layer in an RRC layer during a random access process. When the user equipment obtains the terminal-specific system information from the RRC layer, the user equipment enters an RRC connected mode.

The RRC layer is used to generate and manage a message between the user equipment and a radio access network (RAN). In more detail, the base station and the user equipment may perform, in the RRC layer, broadcasting of cell system information required for all user equipments in a cell, management of transfer of a paging message, mobility management and handover, measurement report of the user equipment and a control therefor, and storage management including user equipment capability management and device management. In general, since update of a signal transferred in the RRC layer (hereinafter, RRC signal) is longer than a transmission/reception period (i.e., transmission time interval (TTI)) in a physical layer, the RRC signal may be maintained for a long period without being changed.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

FIG. 4 illustrates an SS/PBCH block for initial cell access in a 3GPP NR system. When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Figure 4A:
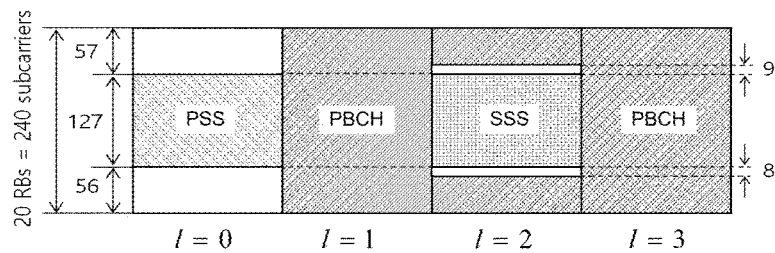
FIGS. 4A and 4B illustrate an SS/PBCH block for initial cell access in a 3GPP NR system.

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 1

| Channel or signal | OFDM symbol number l relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = (n + 43N_{ID}^{(2)}) \bmod 127$$

$$0 \le n < 127$$

Here, $x(i+7)=(x(i+4)+x(i)) \bmod 2$ and is given as $$[x(6)\ x(5)\ x(4)\ x(3)\ x(2)\ x(1)\ x(0)] = [1\ 1\ 1\ 0\ 1\ 1\ 0].$$

Further, the sequence $d_{SSS}(n)$ of the SSS is as follows.

$$d_{SSS}(n) = [1 - 2x_0((n + m_0) \bmod 127)][1 - 2x_1((n + m_1) \bmod 127)]$$

$$m_0 = 15 \left\lfloor \frac{N_{ID}^{(1)}}{112} \right\rfloor + 5N_{ID}^{(2)}$$

$$m_1 = N_{ID}^{(1)} \bmod 112$$

$$0 \le n < 127$$

Here, $$x_0(i + 7) = (x_0(i + 4) + x_0(i)) \bmod 2$$

$$x_1(i + 7) = (x_1(i + 1) + x_1(i)) \bmod 2$$

and is given as $$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1]$$

Figure 4B:
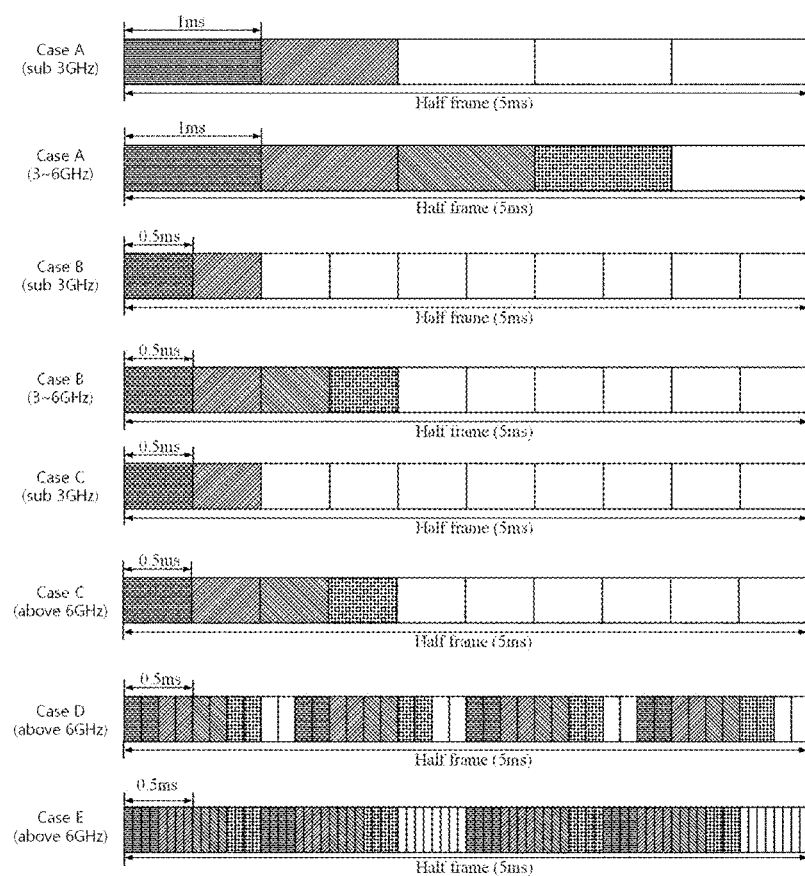

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
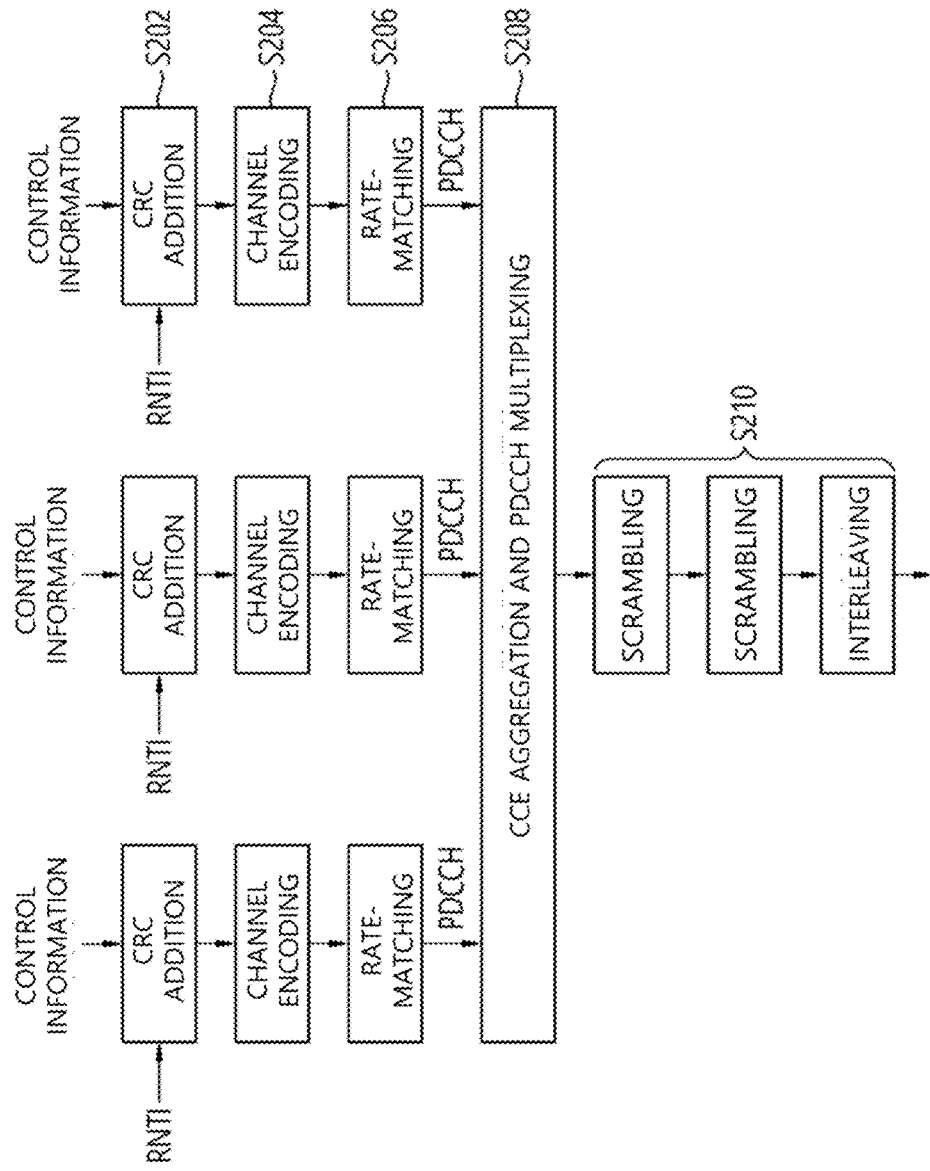
FIGS. 5A and 5B illustrate a procedure for transmitting control information and a control channel in a 3GPP NR system.
Figure 5B:
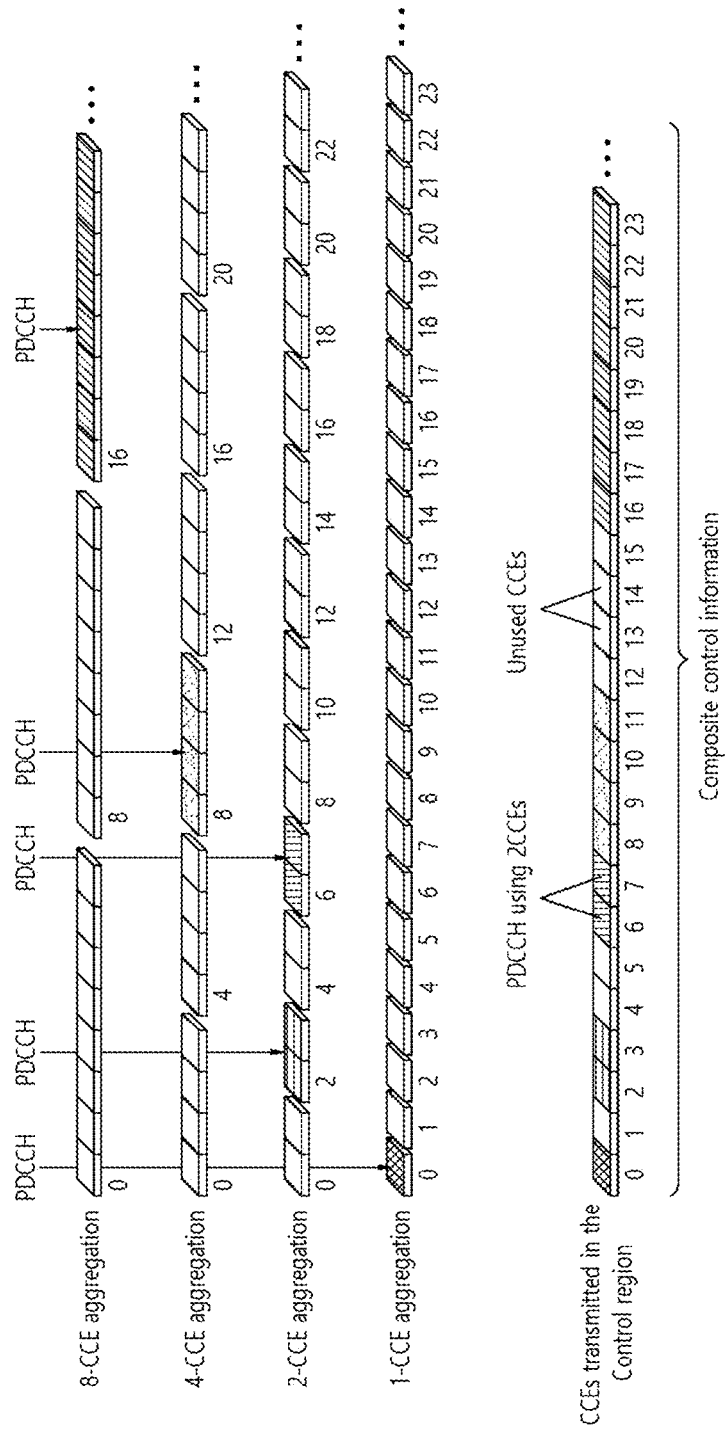

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
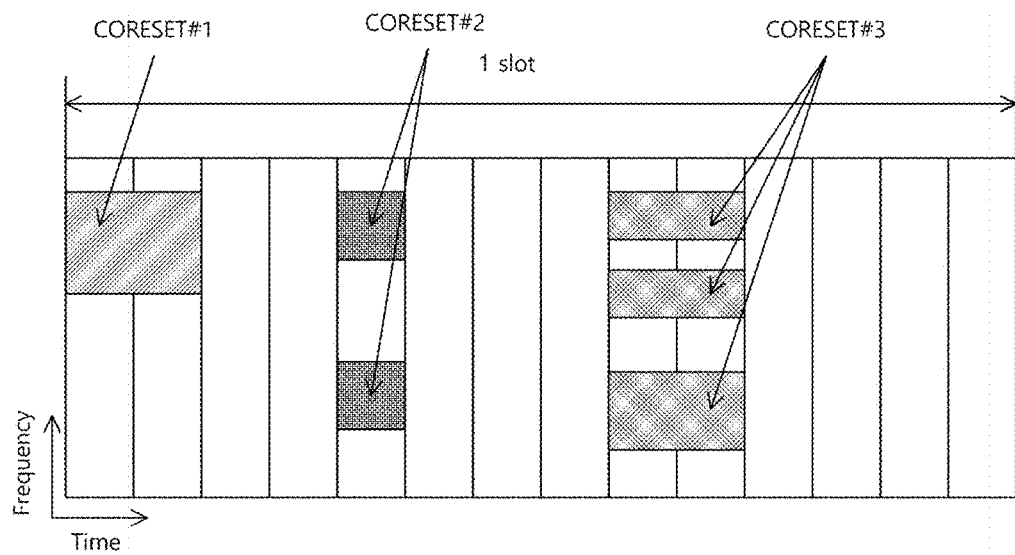
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system. The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
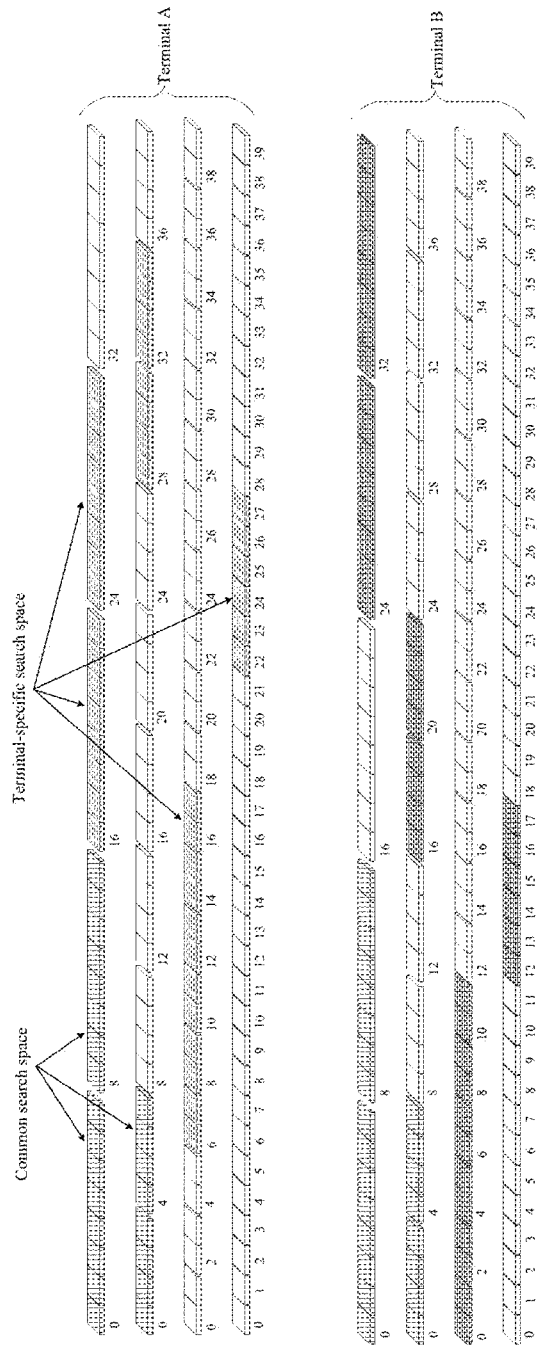
FIG. 7 illustrates a method for configuring a PDCCH search space in a 3GPP NR system.

FIG. 7 illustrates a method for setting a PUCCH search space in a 3GPP NR system. In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted through a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 2

| PUCCH format | Length in OFDM symbols | Number of bits |
| --- | --- | --- |
| 0 | 1-2 | ≤2 |
| 1 | 4-14 | ≤2 |
| 2 | 1-2 | >2 |

TABLE 2-continued

| PUCCH format | Length in OFDM symbols | Number of bits |
| --- | --- | --- |
| 3 | 4-14 | >2 |
| 4 | 4-14 | >2 |

PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format for transferring 1-bit or 2-bit HARQ-ACK information or SR. PUCCH format 0 may be transmitted through one or two OFDM symbols on the time axis and one PRB on the frequency axis. When PUCCH format 0 is transmitted through two OFDM symbols, the same sequence on the two symbols may be transmitted through different RB. Here, the sequence may be a sequence cyclic-shifted (CS) from a base sequence used in PUCCH format 0. In this manner, the user equipment may obtain a frequency diversity gain. In detail, the user equipment may determine a cyclic shift (CS) value $m_{cs}$ according to Mbit bit UCI ($M_{bit}$=1 or 2). Furthermore, a sequence obtained by cyclic-shifting a base sequence having a length of 12 on the basis of the determined CS value $m_{cs}$ may be mapped to one OFDM symbol and 12 REs of one RB so as to be transmitted. When the number of cyclic shifts available for the user equipment is 12 and $M_{bit}$=1, 1 bit UCI 0 and 1 may be mapped to two cyclic-shifted sequences having a cyclic shift value difference of 6. Furthermore, when Mbit=2, 2-bit UCI 00, 01, 11, and 10 may be respectively mapped to four cyclic-shifted sequences having a cyclic shift value difference of 3.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is Mbit=1, may be BPSK-modulated. The UE may modulate UCI, which is Mbit=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, the user equipment may perform transmission/reception using a bandwidth that is smaller than or equal to the bandwidth of a carrier (or cell). To this end, the user may receive a configuration of bandwidth part (BWP) configured with a partial continuous bandwidth of the bandwidth of a carrier. The user equipment which operates according to TDD or operates in an unpaired spectrum may receive a configuration of up to four DL/UL BWP pairs in one carrier (cell). Furthermore, the user equipment may activate one DL/UL BWP pair. The user equipment which operates according to FDD or operates in a paired spectrum may receive a configuration of up to four DL BWPs in a downlink carrier (or cell) and a configuration of up to four UL BWPs in an uplink carrier (or cell). The user equipment may activate one DL BWP and UL BWP for each carrier (or cell). The user equipment may not receive or transmit on a time-frequency resource except for activated BWP. The activated BWP may be referred to as active BWP.

The base station may indicate an activated BWP among BWPs configured for the user equipment through downlink control information (DCI). A BWP indicated through DCI is activated, and other configured BWP(s) are deactivated. In a carrier (or cell) operating according to TDD, the base station may add a bandwidth part indicator (BPI) indicating a BWP to be activated to the DCI that schedules PDSCH or PUSCH in order to change a DL/UL BWP pair of the user equipment. The user equipment may receive the DCI that schedules PDSCH or PUSCH, and may identify a DL/UL BWP pair to be activated on the basis of the BPI. In the case of a downlink carrier (or cell) operating according to FDD, the base station may add a BPI indicating a BWP to be activated to the DCI that schedules PDSCH in order to change a DL BWP of the base station. In the case of an uplink carrier (or cell) operating according to FDD, the base station may add a BPI indicating a BWP to be activated to the DCI that schedules PUSCH in order to change a UL BWP of the base station.

Figure 8:
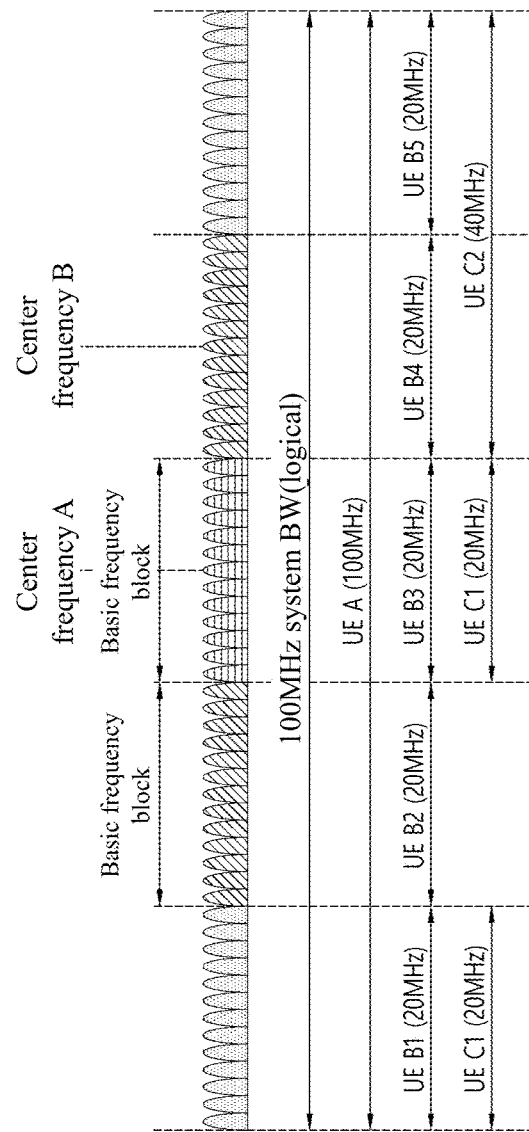
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1 \sim B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
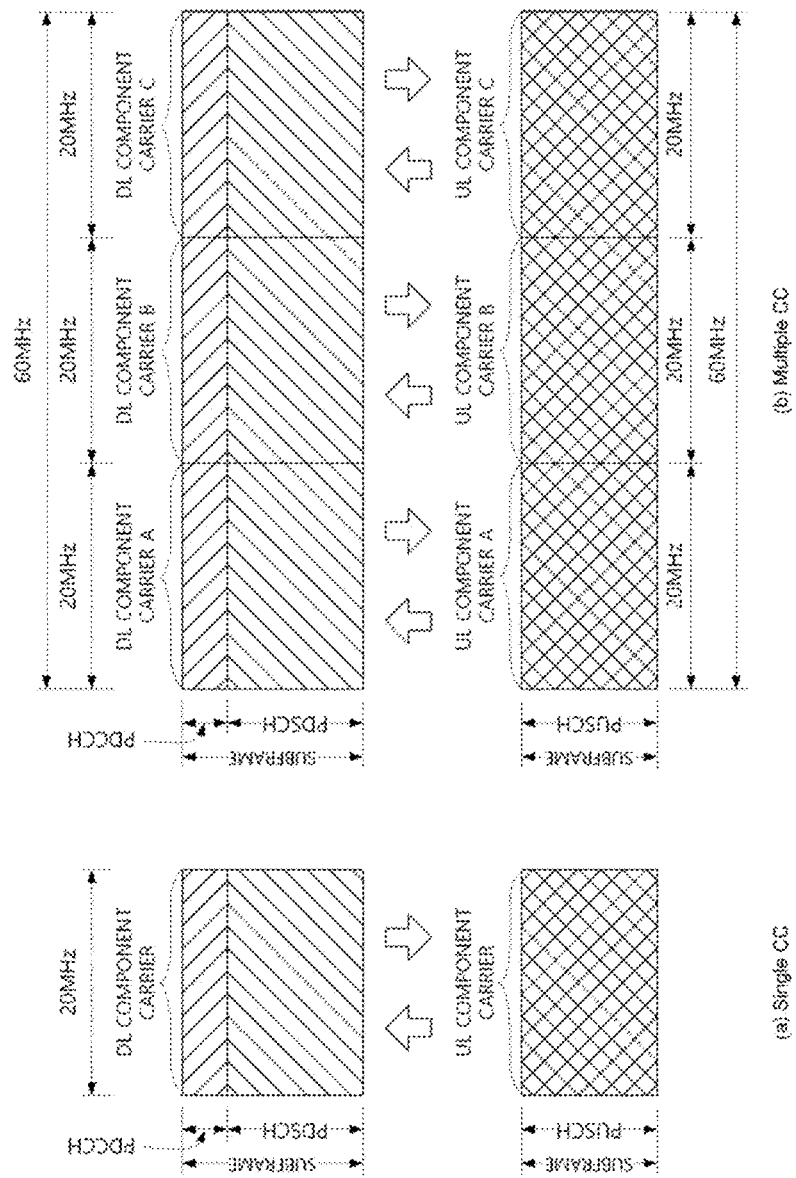
FIG. 9 is a diagram for explaining signal carrier communication and multiple carrier communication.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs may not be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PS-cell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
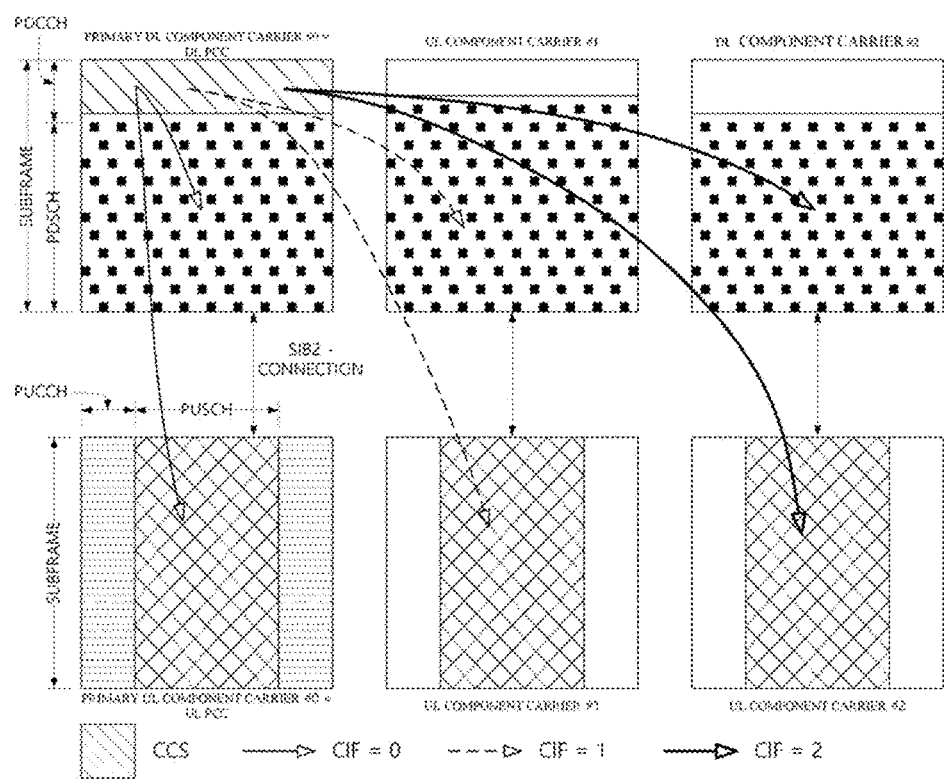
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
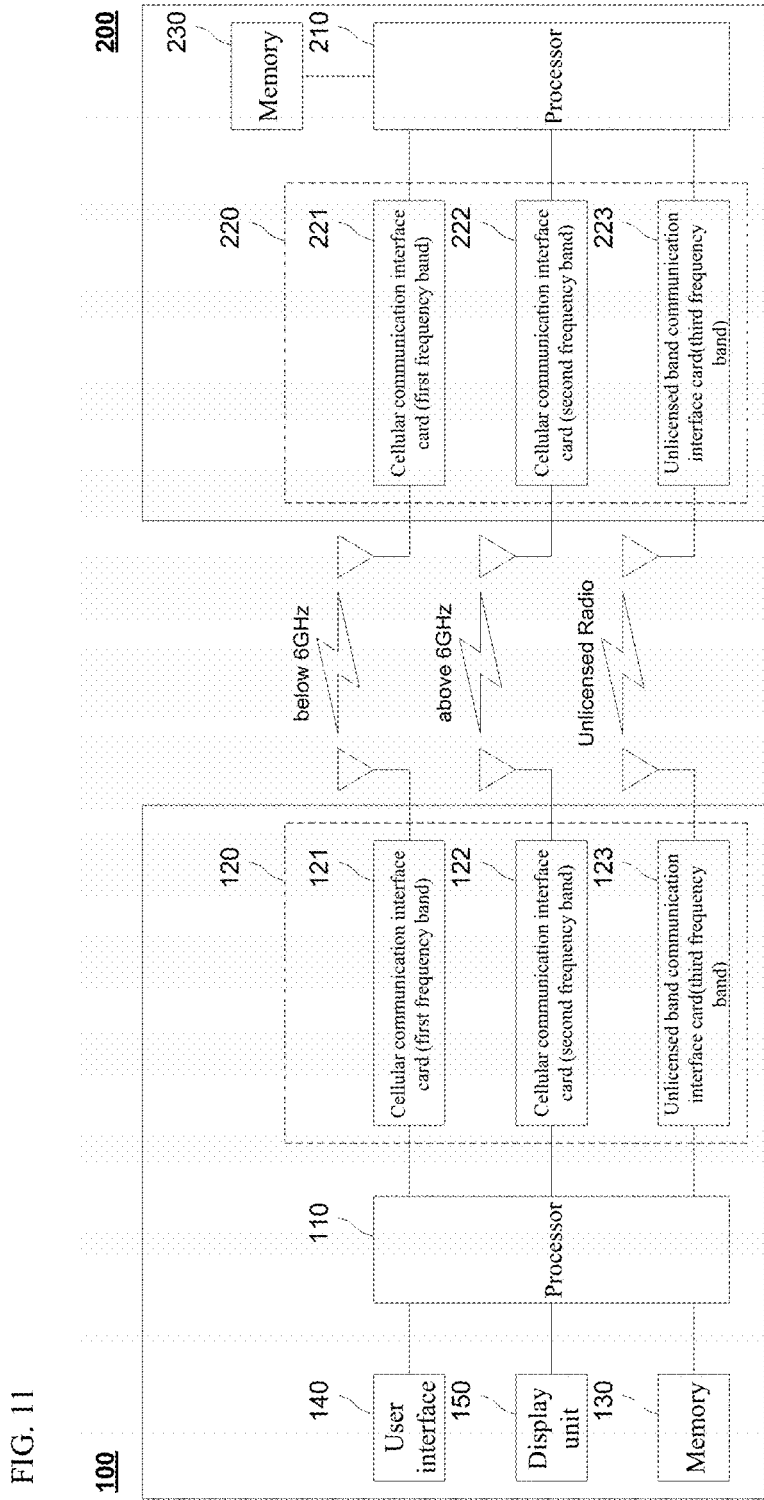
FIG. 11 is a block diagram illustrating configuration of a user equipment and a base station according to an embodiment of the present invention.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the base station 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the base station 100, an external device, and a server in accordance with the cellular communication standards or protocols in the frequency bands less than 6 GHz supported by the corresponding NIC module.

The cellular communication interface card 222 may transmit or receive a radio signal with at least one of the base station 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the base station 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

In the NR wireless communication system, the user equipment may transmit a codebook including hybrid automatic repeat request (HARQ)-ACK information to signal whether reception of a downlink signal or channel has succeeded. The HARQ-ACK codebook includes one or more bits indicating whether reception of a downlink signal or channel has succeeded. Here, the downlink channel may include at least one of a physical downlink shared channel (PDSCH), a semi-persistence scheduling (SPS) PDSCH, and a PDCCH for releasing the SPS PDSCH. The HARQ-ACK codebook may be divided into a semi-static HARQ-ACK codebook (or first-type codebook) and a dynamic HARQ-ACK codebook (or second-type codebook). The base station may set one of the two HARQ-ACK codebooks for the user equipment. The user equipment may use a HARQ-ACK codebook set for the user equipment.

When the semi-static HARQ-ACK codebook is used, the base station may use an RRC signal to configure the number of bits of the HARQ-ACK codebook and information for determining which downlink signal or channel is successfully received by each bit of the HARQ-ACK codebook. Therefore, it is not necessary for the base station to signal information required for transmitting the HARQ-ACK codebook to the user equipment each time transmission of the HARQ-ACK codebook is necessary.

When the dynamic HARQ-ACK codebook is used, the base station may signal information required for generating the HARQ-ACK codebook through a PDCCH (or DCI). In detail, the base station may signal the information required for generating the HARQ-ACK codebook through a down assignment index (DAI) field of a PDCCH (or DCI). In a specific embodiment, a DAI represents information about the number of bits of the HARQ-ACK codebook and about for which channel or signal each bit of the HARQ-ACK codebook indicates reception success or failure. The user equipment may receive the DAI field through a PDCCH (or DCI) for scheduling a PDSCH. A value of the DAI field may be divided into a counter-DAI and a total DAI. The total-DAI indicates the number of downlink signals or channels for which reception success or failure is indicated through the HARQ-ACK codebook until a current monitoring occasion (MO). The counter-DAI indicates a HARQ-ACK codebook bit indicating reception success or failure of downlink signals or channels among the downlink signals or channels for which reception success or failure is indicated through the HARQ-ACK codebook until a current cell of a current monitoring occasion. A PDCCH (or DCI) for scheduling a PDSCH may include a value of the counter-DAI corresponding to a scheduled PDSCH. Furthermore, a PDCCH (or DCI) for scheduling a PDSCH may include a value of the total-DAI corresponding to a scheduled PDSCH. The user equipment may determine the number of bits of the dynamic HARQ-ACK codebook on the basis of information signaled by a PDCCH (or DCI). In detail, the user equipment may determine the number of bits of the dynamic HARQ-ACK codebook on the basis of the DAI of a PDCCH (or DCI).

Figure 12:
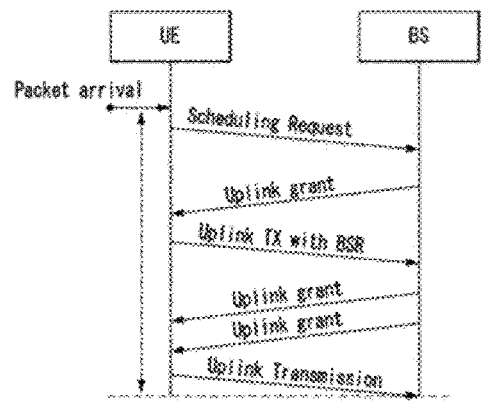
FIG. 12 is a flowchart illustrating an example of transmitting/receiving a physical uplink shared channel (PUSCH) according to an embodiment of the present invention.
Figure 12:
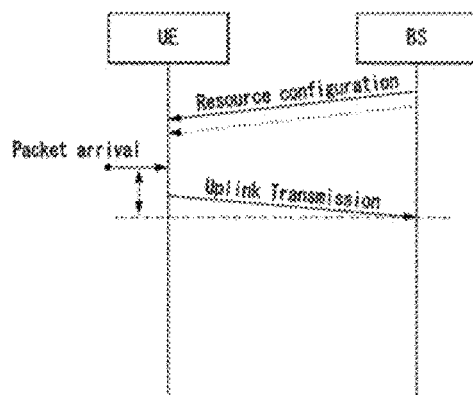

FIG. 12 is a flowchart illustrating an example of transmitting/receiving a physical uplink shared channel (PUSCH) according to an embodiment of the present invention, Referring to FIG. 12, a user equipment (UE) receives, from a base station, RRC configuration information including information for receiving downlink control information (DCI) (S12010).

For example, the RRC configuration information may include information related to a search space and a control resource set (CORESET) for the user equipment to detect a PDCCH including the downlink control information. Here, the information related to the control resource set may include at least one of an identifier (ID) of the control resource set for the user equipment to detect PDCCH including DCI, control channel element (CCE) configuration information, and a duration or frequency resource information of the control resource set. Here, the information related to the search space may include at least one of an identifier (ID) of the search space for the user equipment to detect a PDCCH including DCI, a format of DCI detectable in each search space, a detection duration or resource information.

Thereafter, the user equipment may receive DCI by detecting a PDCCH in a monitoring occasion on the basis of the RRC configuration information (S12020). The user equipment may obtain the DCI by detecting a PDCCH in a specific search space in a monitoring occasion according to the type of a service and/or data on the basis of the RRC configuration information.

Here, for the DAI included in the DCI, different bits may be set according to a format of the DCI. For example, in DCI Format 1_0, the DAI may be set with 2 bits, and, in DCI Format 1_1, the DAI may be set with 1 bit for the semi-static HARQ-ACK codebook and with 2 bits for the dynamic HARQ-ACK codebook.

Table 3 shown below shows an example of bits of the DAI according to a DCI format.

TABLE 3

| | Counter-DAI | Total DAI | UL DAI |
|---|---|---|---|
| DCI format 0_0 | — | — | — |
| DCI format 0_1 | — | — | For TB-based transmission 2 bits<br>For CBG transmission 4 bits (2 bits for TB-based reception, 2 bits for CBG-based reception) |
| DCI format 0_2 | — | — | if DownlinkassignmentindexForDCIFormat0_2 is not configured, 0 bit<br>Otherwise, for TB-based reception 2 bits<br>for CBG-based reception 4 bits (2 bits for TB-based reception, 2 bits for CBG-based reception) |
| DCI format 1_0 | 2 bits | 0 bits | — |
| DCI format 1_1 | 2 bits | 2 bits | — |
| DCI format 1_2 | if DownlinkassignmentindexForDCIFormat1_2 is not configured, 0 bit Otherwise 1 or 2 bits | if DownlinkassignmentindexForDCIFormat1_2 is not configured, 0 bit Otherwise 0 bit or 2 bits | — |

Furthermore, the user equipment may be allocated a resource for receiving a PDSCH or transmitting a PUSCH through a PDCCH (or DCI).

Thereafter, the user equipment may receive a PDSCH or transmit a PUSCH to the base station through the allocated resource (S12030). If the user equipment has received a PDSCH from the base station, the user equipment may generate a HARQ-ACK codebook indicating ACK/NACK of the received PDSCH on the basis of a DAI value included in a PDCCH (or DCI) for scheduling a PDSCH, and may add the generated HARQ-ACK codebook to uplink control information (UCI) to transmit the same to the base station. Here, the PUSCH may be repeatedly transmitted between slots through a resource allocated through the DCI.

A symbol allocated through the DCI from the base station in order to repeatedly transmit the PUSCH may be allocated to the user equipment through the location of a starting symbol, a length of an allocated resource, and the number of repetitions, and, when the allocated symbol is not valid or overlaps with a specific symbol, the PUSCH may not be transmitted on the corresponding symbol or may be transmitted by being multiplexed with a signal that is transmitted through the specific symbol.

For example, when the symbol for repeatedly transmitting the PUSCH overlaps with the symbol for transmitting a PUCCH, the user equipment may transmit the PUCSCH and the PUCCH to the base station by multiplexing the PUSCH and the PUCCH. Furthermore, when the symbol allocated to repeatedly transmit the PUSCH overlaps with the following symbols, the corresponding symbol is determined (or recognized) to be an invalid symbol, and repeated transmission of the PUSCH is not performed on the corresponding symbol.

A symbol of CORESET #0

In the case of half-duplex user equipment, a symbol for transmitting a downlink signal of another cell and a symbol on which SS/PBCH is transmitted A semi-static downlink symbol of Pcell A gap symbol after a semi-static downlink symbol of Pcell An invalid symbol configured through a bit map of RRC signaling when application of a pattern of an invalid symbol is indicated through DCI A symbol for receiving SS/PBCH UL Preemption Indication Preemption indication represents an indicator for the base station to transmit a downlink signal to another user equipment by preempting (or puncturing) some resources in an already scheduled PDSCH. Likewise, the base station may transmit an indicator for transmitting an uplink signal to another user equipment by preempting (or puncturing) some resource in an already scheduled PUSCH. This is referred to as a UL preemption indication or UL cancelation indication. The present invention relates to design of a UL preemption indication and operation of a user equipment that has received a UL preemption indication.

In an embodiment of the present invention, the user equipment may be configured with an RRC signal to receive a UL preemption indication, and the UL preemption indication may be transmitted through a group-common PDCCH. That is, the user equipment receives a configuration of a search space, monitoring period, RNTI value and duration for the UL preemption indication through the RRC signal, and the user equipment blind-decodes DCI scrambled with the RNTI value and duration. When the DCI scrambled with the RNTI value is found, the user equipment may determine that the DCI is a UL preemption indication.

The UL preemption indication may transfer the following information. First, a reference UL resource may be determined as below. The reference UL resource may include all PRBs of UL BWP. When the monitoring period of the UL preemption indication is TINT, the reference UL resource of the UL preemption indication received at an mth period may be determined by Mathematical Expression 1 shown below.

$$\{mT\_INT+1+\Delta\_offset,$$
$$mT\_INT+2+\Delta\_offset, \ldots ,$$
$$(m+1)T\_INT+1+\Delta\_offset,\}$$
[Mathematical Expression 1]

In Mathematical Expression 1, Δoffset which is an offset value may be configured with RRC or may be determined as a fixed value. Preferably, the offset value may be a multiple of the number of symbols of a slot. Furthermore, the Δoffset value may be determined according to a PUSCH processing time. For example, when Tproc,2 is assumed to be a minimum time taken for receiving a PDCCH for scheduling a PUSCH and generating a PUSCH, Δoffset may be a value that increases in proportion to a Tproc,2 value. For example, Δoffset may be given as a value of ceil(Tproc,2/Symbol_duration). Here, Symbol_duration is a duration of one OFDM symbol. In addition, the user equipment may determine Δoffset in consideration of timing advance (TA). That is, when determining Δoffset, the user equipment may consider a time difference between an uplink (UL) frame boundary and a downlink (DL) frame boundary due to a TA value. In addition, in the reference UL resource, downlink symbols may be excluded according to semi-static DL/UL assignment configured through a cell-specific RRC signal. In addition, a flexible symbol positioned immediately after the above downlink symbols may be excluded. Here, the number of excluded flexible symbols may be 1 or may be configured with an RRC signal.

The UL preemption indication may divide the reference UL resource into N pieces to notify which symbol has been preempted (or punctured), and may indicate whether each piece has been preempted using a bit-map indicated with 1 bit. Preferably, a length of the bit-map is 14 bits. Preferably, the reference UL resource may be divided into 14 parts on the time axis or 7 parts on the time axis, and each part may be divided into two parts on the frequency axis. Preferably, with regard to a method of grouping symbols into N sets when the reference UL resource has S symbols, in an embodiment of the present invention, the user equipment may be designed so that the difference between the numbers of symbols included in each set is allowed to be up to 1 when configuring N sets.

S symbols included in the reference UL resource may be assigned numbers 1, 2, . . . , S in a time sequence. In this case, N sets are configured as below according to the above method. First mod(S,N) sets among the total N sets may include ceil(S/N) symbols, and the remaining N-mod(S,N) sets may include floor(S/N) symbols. Here, mod(a,b) is a function that returns a remainder when 'a' is divided by 'b', ceil(x) is a function that returns a smallest integer among numbers larger than or equal to X, and floor(x) is a function that returns a largest integer among numbers less than or equal to X. Here, mod(S,N) may be expressed as S−floor(S/N)*N.

When the user equipment receives the UL preemption indication, the user equipment does not transmit, through an uplink, a PUSCH corresponding to a symbol indicated as being preempted by the UL preemption indication. The user equipment may transmit a PUSCH through a symbol not indicated as being preempted in the UL preemption indication. For a method of transmitting a PUSCH, when the user equipment performs transmission through symbols except for symbols indicated as being preempted in the UL preemption indication, the user equipment may discard a PUSCH that overlaps with a preempted symbol without transmitting the PUSCH and may transmit a PUSCH that overlaps with a non-preempted symbol. For another method, the user equipment may sequentially transmit PUSCHs on a transmittable symbol, and may discard remaining PUSCHs without transmitting the remaining PUSCHs. Referring to FIG. 34, when the user equipment receives a scheduled PUSCH on 14 symbols, and the UL preemption indication indicates that a fifth symbol has been preempted, the user equipment does not transmit an uplink signal on the fifth symbol. Instead, the user equipment is required to transmit a PUSCH through symbols 1, 2, 3, 5, 6, 7, 8, 9, 10, 11, 12, 13, and 14. Resource elements (REs) of PUSCH to be transmitted by the user equipment may be divided into PUSCH #1, PUSCH #2, . . . , PUSCH #14 according to an OFDM symbol. That is, PUSCH #1 indicates PUSCH REs transmitted on a first OFDM symbol in the PUSCH. Referring to FIG. 34A, the PUSCH transmitted through symbols 1, 2, 3, 5, 6, 7, 8, 9, 10, 11, 12, 13, and 14 may be PUSCH #1, PUSCH #2, PUSCH #3, PUSCH #4, PUSCH #6, PUSCH #7, PUSCH #8, PUSCH #9, PUSCH #10, PUSCH #11, PUSCH #12, PUSCH #13, and PUSCH #14 other than PUSCH #5. Referring to FIG. 34B, the PUSCH transmitted through symbols 1, 2, 3, 5, 6, 7, 8, 9, 10, 11, 12, 13, 14 may be PUSCH #1, PUSCH #2, PUSCH #3, PUSCH #4, PUSCH #5, PUSCH #6, PUSCH #7, PUSCH #8, PUSCH #9, PUSCH #10, PUSCH #11, PUSCH #12, and PUSCH #13 in this order, and PUSCH #14 may not be transmitted.

When the user equipment receives the UL preemption indication, the user equipment may transmit, on another resource, a PUSCH which could not be transmitted on a symbol indicated as being preempted by the UL preemption indication. Here, the other resource is different from an already scheduled PUSCH resource, and is an uplink resource that is temporally later than the scheduled PUSCH resource. For convenience, this resource is referred to as an additional resource. Preferably, the scheduled PUSCH and the additional resource have the same PRBs in the frequency domain. In an embodiment of the present invention, the additional resource may be an uplink symbol according to closest semi-static DL/UL assignment after an allocated PUSCH resource. In an embodiment of the present invention, the additional resource may be a flexible symbol or uplink symbol according to semi-static DL/UL assignment configured with a closest RRC after an allocated PUSCH resource. In an embodiment of the present invention, the additional resource may follow a symbol A after an allocated PUSCH resource. Preferably, the symbol A may be configured through an RRC signal or may be fixed.

In an embodiment of the present invention, when a PUCCH is not transmitted by the UL preemption indication or transmission of a PUCCH fails, the user equipment may determine whether to retransmit a PUCCH according to uplink control information (UCI) to be transmitted through a PUCCH. For example, when transmission of a PUCCH is affected by the UL preemption indication (e.g., when a resource element (RE) that is a time and frequency resource allocated for transmitting a PUCCH overlaps with a RE that is a time and frequency resource indicated by the UL preemption indication), the user equipment may retransmit a PUCCH including UCI on an additional resource according to the uplink control information (e.g., HARQ-ACK or the like) included in the PUCCH without transmitting the PUCCH on a resource overlapping with a resource indicated by the UL preemption indication.

In another embodiment of the present invention, when the user equipment has received, at a first time point, a first PDCCH for scheduling transmission of a first PUSCH, and receives, at a second time point after the first time point, a second PDCCH for scheduling transmission of a second PUSCH, if transmission of the first PUSCH and transmission of the second PUSCH are scheduled for transmitting the same transport block (TB), the user equipment transmits only the second PUSCH scheduled by the second PDCCH without transmitting the first PUSCH scheduled by the first PDCCH.

Here, whether the TBs to be transmitted through the first PUSCH and the second PUSCH are the same may be determined on the basis of PDCCHs transmitted by user equipments. In detail, when HARQ process IDs of DCI, included in the two PDCCHs, i.e., the first PDCCH and the second PDCCH, in order to be transmitted, are the same, and values of new data indicator fields indicating whether data is new data are the same, the user equipment may recognize (or determine) that the TBs to be transmitted through the first PUSCH and the second PUSCH are the same.

Whether to perform or cancel transmission of the first PUSCH may be determined according to a PUSCH processing time of the user equipment. In detail, transmission of the first PUSCH cannot be cancelled when a portion or entirety of the first PUSCH is scheduled to be transmitted between a specific time (or symbol) and the last symbol of the second PDCCH. That is, the user equipment may perform transmission of the first PUSCH. On the contrary, a portion or entirety of the first PUSCH after a specific time (or symbol) from the last symbol of the second PDCCH may not be transmitted.

In another embodiment of the present invention, when the user equipment has received, at a first time point, a first PDCCH for scheduling transmission of a first PUSCH, and has received, at a second time point, a second PDCCH for scheduling transmission of a second PUSCH, if the two PUSCHs are scheduled to be overlapped and transmitted on at least one symbol, the user equipment transmits the second PUSCH without performing transmission of the first PUSCH. The user equipment may determine, according to a PUSCH processing time, whether to perform transmission of the PUSCH that was not transmitted. In more detail, when transmission of a portion or entirety of the PUSCH is scheduled between a specific time (or symbol) and the last symbol of the second PDCCH, this transmission cannot be cancelled. That is, the user equipment may perform transmission. On the contrary, a portion or entirety of the PUSCH after a specific time (or symbol) from the last symbol of the second PDCCH is not transmitted.

However, when a PDCCH for scheduling transmission of a PUSCH including the same TB is received, it may be a waste of frequency in terms of frequency efficiency to cancel transmission of an entirety of a previously scheduled PUSCH. Furthermore, it may cause a waste in terms of frequency efficiency to entirely cancel transmission of a scheduled PUSCH. Furthermore, according to circumstances, it may be necessary to cancel transmission of a PUSCH on some of symbols for transmitting a PUSCH.

To resolve this problem, the present invention proposes a method of cancelling only a portion of a PUSCH according to a code block group (CBG) to be transmitted. In an embodiment of the present invention, when the user equipment receives a configuration of CBG-based transmission from a higher layer, the user equipment may perform the following operations.

First, the user equipment may receive a configuration of the number of CBGs from a higher layer. The user equipment may receive, in DCI format 0_1, a code block group transmission indicator (CBGTI) field having the same bit length as the configured number of CBGs. DCI format 0_1 is DCI for scheduling a PUSCH. The CBGTI field may include a bitmap for a CBG to be transmitted, and the user equipment may recognize CBGs to be transmitted through the bitmap for CBG. The user equipment transmits CBGs indicated to be transmitted by the CBGTI field, but should not transmit CBGs not indicated to be transmitted.

In an embodiment of the present invention, when the user equipment has received, at a first time point, a first PDCCH for scheduling transmission of a first PUSCH, and receives, at a second time point after the first time point, a second PDCCH for scheduling transmission of a second PUSCH, the two PUSCHs may be scheduled to transmit the same transport block (TB). In this case, CBGs which are the same as CBGs that are transmitted by being included in the PUSCH scheduled through the second PDCCH may be transmitted on the first PUSCH. The user equipment may not perform transmission of symbols to which the same CBGs as CBGs indicated to be transmitted on the PUSCH scheduled by the second PDCCH are mapped, during transmission of the first PUSCH. On the contrary, the user equipment may continue to transmit remaining symbols other than the symbols to which the same CBGs as CBGs indicated to be transmitted on the PUSCH scheduled by the second PDCCH are mapped, during transmission of the first PUSCH.

When the same TB is scheduled, if a previously scheduled PUSCH is multiplexed with UCI even if the user equipment receives a later scheduled PUSCH, the later scheduled PUSCH may be transmitted by being multiplexed with UCI.

In detail, when the same TB is included in the first PUSCH and the second PUSCH, and the user equipment receives the second PDCCH for scheduling the second PUSCH, transmission of the first PUSCH scheduled through the first PDCCH may be cancelled. However, when the first PUSCH scheduled earlier than the second PUSCH is multiplexed with UCI, the UCI multiplexed with the first PUSCH is not transmitted unless the first PUSCH is transmitted, and, thus, the user equipment cannot receive the UCI. Therefore, the user equipment may receive the second PDCCH and may multiplex the UCI with the second PUSCH to transmit the UCI to the base station since the UCI cannot be transmitted to the base station if the first PUSCH is multiplexed with the UCI when a portion or entirety of the previously scheduled PUSCH has not be transmitted. Here, entire information of the UCI may be transmitted by being multiplexed with the second PUSCH, or only partial information may be transmitted by being multiplexed with the second PUSCH. The partial information may include HARQ-ACK information.

Alternatively, the user equipment may add information related to UCI multiplexing to a DCI field of the second PDCCH to transmit the same. The DCI field may be explicitly present for UCI multiplexing, or may be inferred from values of other DCI fields, wherein the other DCI fields may include a beta offset indicator field.

Whether to perform transmission of the second PUSCH for which transmission of the first PUSCH is not performed may be determined according to a PUSCH processing time of the user equipment. In detail, when a PDCCH for cancelling transmission of a PUSCH is received, and transmission of a portion or entirety of the PUSCH is present between a specific time (or symbol) and the last symbol of the PDCCH, transmission of the first PUSCH may not be cancelled.

That is, even when the same TB is scheduled through the first PDCCH and the second PDCCH, the user equipment cannot cancel transmission of the first PUSCH and may transmit the first PUSCH to the base station if a portion or entirety of the first PUSCH is positioned between a specific time (symbol) and the last symbol of the PDCCH. On the contrary, a portion or entirety of the first PUSCH positioned after a specific time (or symbol) from the last symbol of the PDCCH may be cancelled and may not be transmitted.

Repeated Transmission of PUSCH

With regard to the enhanced ultra reliable low latency communication (eURLLC) being developed in 3GPP NR release 16, various technologies for providing highly reliable services with low latency time are discussed. In particular, in order to reduce a latency time and increase reliability in the case of uplink, a method in which a user equipment repeatedly transmits a physical uplink shared channel (PUSCH) to a base station as quickly as possible will be supported. An aspect of the present invention discloses a method for a user equipment to repeatedly transmit a physical uplink shared channel to a base station as quickly as possible.

In general, a user equipment receives scheduling information about a PUSCH from a base station. This scheduling information about a PUSCH may be received from, for example, a PDCCH (or DCI). The user equipment transmits a PUSCH through an uplink on the basis of the received scheduling information. Here, a time-frequency resource on which the PUSCH is to be transmitted may be recognized using time domain resource assignment (TDRA) information and frequency domain resource assignment (FDRA) information for PUSCH transmission included in DCI. A time frequency resource on which a PUSCH is transmitted is configured with successive symbols, and one PUSCH may not be scheduled beyond a boundary of a slot.

In 3GPP NR release 15, inter-slot repeated transmission of a PUSCH is supported. First, the user equipment may receive a configuration of the number of transmission repetitions from the base station. The configured number of transmission repetitions received by the user equipment is assumed to be K. When the user equipment receives a PDCCH (or DCI) for scheduling a PUSCH on a slot n, and is instructed to transmit a PUSCH on a slot n+k, the user equipment may transmit a PUSCH on K successive slots from the slot n+k. That is, a PUSCH may be transmitted on slot n+k, slot n+k+1, . . . , slot n+k+K−1. Furthermore, a time and frequency resource on which a PUSCH is transmitted in each slot is the same as indicated in DCI. That is, a PUSCH may be transmitted on the same symbol and the same PRB in a slot. In order to a diversity gain in the frequency domain, frequency hopping may be configured for the user equipment. The frequency hopping may be configured as intra-slot frequency hopping that is performed within a slot and inter-slot frequency hopping that is performed for each slot. If the intra-slot frequency hopping is set for the user equipment, the user equipment divides a PUSCH in half in each slot to transmit one half on a scheduled PRB and transmit the other half on a PRB obtained by adding an offset value to the scheduled PRB. Here, for the offset value, two or four values may be set through a higher layer, and one of the values may be indicated through DCI. If the inter-slot frequency hopping is set for the user equipment, the user equipment transmits a PUSCH on a scheduled PRB in an odd-numbered slot and transmits a PUSCH on a PRB obtained by adding an offset value to the scheduled PRB in an even-numbered slot. When repeatedly performing transmission in a slot, the user equipment does not transmit a PUSCH in a specific slot, in which a symbol through which a PUSCH is to be transmitted is configured as a semi-static downlink symbol. A PUSCH that could not be transmitted is not deferred to another slot in order to be transmitted.

The above-described repeated transmission of release 15 is not suitable for providing an eURLLC service for the following reason.

First, it is difficult to provide high reliability. For example, when one slot is configured with 14 symbols, and a PUSCH is transmitted on symbol 12 and symbol 13, a PUSCH is repeatedly transmitted on symbol 12 and symbol 13 also in the next slot. Although transmission is possible on symbols 1 to 11 in the next slot, this transmission is not performed, thus making it difficult to achieve high reliability.

Next, it is difficult to provide a highly low latency. For example, it is assumed that one slot is configured with 14 symbols, and a PUSCH is transmitted on symbols 0 to 13 to achieve high reliability. The base station is required to receive the last symbol of the PUSCH, i.e., symbol 13, to succeed in receiving the PUSCH. Therefore, a latency time increases with a length of the PUSCH.

To resolve this problem, an aspect of the present invention discloses a method of repeatedly transmitting a PUSCH within one slot. In more detail, the user equipment may continuously and repeatedly transmit a scheduled PUSCH. The term "continuously" represents that a PUSCH is transmitted again on a symbol immediately after a symbol on which one PUSCH is ended. Such a method may be referred to as mini-slot-level PUSCH repeated transmission or PUSCH repetition type B, and the above-described repeated transmission method of 3GPP NR release 15 may be referred to as a slot-level PUSCH repeated transmission method or PUSCH repetition type A.

In the case of the mini-slot-level PUSCH repeated transmission may resolve the above-described problems of the slot-level PUSCH repeated transmission method.

First, high reliability may be provided. For example, when one slot is configured with 14 symbols, and a PUSCH is transmitted on symbol 12 and symbol 13, a PUSCH may be repeatedly transmitted on symbol 1 and symbol 2 in the next slot. Therefore, since transmission is performed immediately and continuously, high reliability can be achieved.

Furthermore, a highly low latency may be provided. For example, it is assumed that one slot is configured with 14 symbols, and a PUSCH is transmitted on symbols 0 to 1 to achieve high reliability. Since transmission is repeated within a slot, transmission may be performed again on symbol 2 to symbol 3, and transmission may be repeated on symbol 4 to symbol 5. Therefore, reliability may be achieved, which is similar to that achieved when transmitting a PUSCH having a slot length of 14. However, in this case, the base station may not be required to receive all repeated transmissions to succeed in reception and may succeed in reception during repeated transmission according to a channel situation. Therefore, according to a situation, since transmission is successfully performed after symbol 2 on which first repeated transmission is ended, a latency time may decrease.

However, when repeatedly transmitting a PUSCH, if a symbol for repeated transmission of a PUSCH and a symbol for transmission of a PUCCH overlap with each other, a PUSCH to be repeatedly transmitted may be multiplexed with a PUCCH to transmit the PUCCH. In this case, a PUSCH to be multiplexed with a PUSCCH, among PUSCHs to be repeatedly transmitted, should be determined. That is, when a resource for repeated transmission of a PUSCH and a resource for transmission of a PUCCH overlap with each other, the user equipment may select a resource for multiplexing a PUCCH from among resource allocated for repeated transmission of a PUSCH to multiplex and transmit a PUSCH and a PUCCH to the base station. Hereinafter, a resource may include at least one of a symbol and a PRB in the present invention.

Hereinafter, in the present invention, each PUSCH through which the same TB is repeatedly transmitted is referred to as PUSCH repetition, and PUSCH includes all PUSCH repetitions.

Furthermore, hereinafter, with regard to PUSCH repeated transmission of the present invention, nominal PUSCH repetition represents a resource allocated by the base station through RRC configuration information and/or downlink control information (DCI) for repeated transmission of a PUSCH, and actual PUSCH repetition represents a resource configured with only valid symbols other than invalid symbols in the nominal PUSCH repetition.

FIGS. 13 to 18 are diagrams illustrating an example in which a PUSCH according to an embodiment of the present invention includes four PUSCH repetitions.

Figure 13:
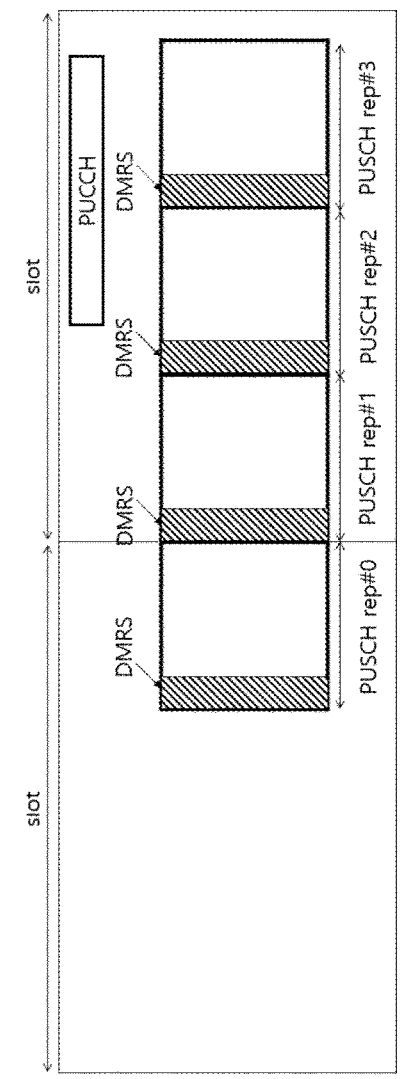
FIGS. 13 to 18 are diagrams illustrating an example in which a PUSCH according to an embodiment of the present invention includes four PUSCH repetitions.

FIG. 13 is a diagram illustrating an example in which a PUSCH is repeatedly transmitted four times.

Referring to FIG. 13, when one user equipment receives a PDCCH for scheduling PUSCH transmission from the base station, the user equipment may perform PUSCH repeated transmission for repeatedly transmitting the same TB to reduce a latency and increase reliability.

A PUSCH repetition may include DMRS, and, hereinafter, descriptions are provided on the assumption that all PUSCH repetitions include DMRS. As illustrated in FIG. 13, a resource for repeated transmission of a PUSCH and a resource for transmission of a PUCCH may overlap with each other. For example, as illustrated in FIG. 13, a PUCCH for transmitting UCI may be configured in a second slot. Here, a resource (e.g., symbol) configured for transmitting a PUCCH may overlap with a resource (e.g., symbol) for PUSCH repetition for repeatedly transmitting a PUSCH. If a PUCCH overlaps with a third PUSCH repetition (PUSCH rep #2) and a fourth PUSCH repetition (PUSCH rep #3), since the user equipment cannot simultaneously transmit two channels, i.e., PUCCH and PUSCH, on one symbol, the user equipment may multiplex and transmit a PUSCH and a PUCCH. Hereinafter, a method for multiplexing a PUSCH and a PUCCH, proposed in the present invention, will be described.

(Proposal 1: One PUSCH Repetition is Multiplexed with UCI of a PUSCH so as to be Transmitted)

When a PUSCH is repeatedly transmitted multiple times on a plurality of resources included in one or more slots, if a resource for repeated transmission of a PUSCH overlaps with a resource for transmission of a PUCCH, the user equipment may multiplex one PUSCH repetition among resources for repeated transmission of a PUSCH with UCI of a PUCCH to transmit the same to the base station. Here, a resource may include at least one of a symbol and a PRB.

Method 1: Multiplex with an earliest PUSCH repetition among PUSCH repetitions that are resources of a PUSCH overlapping with a PUCCH.

Figure 14:
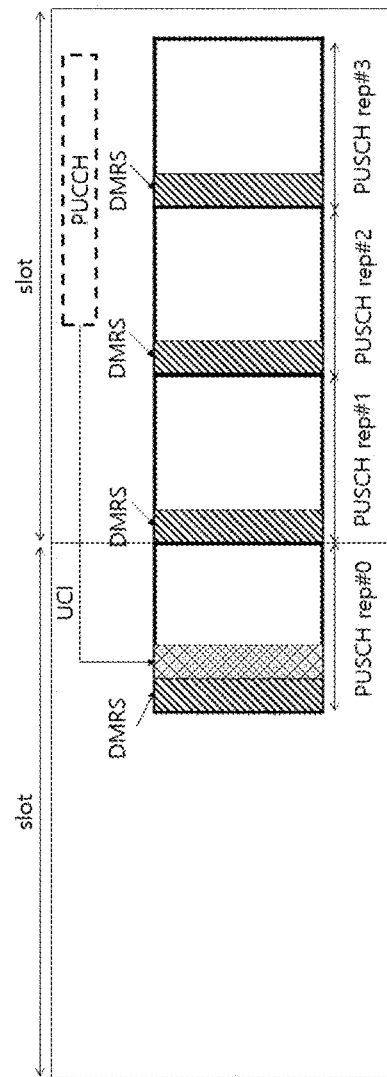

FIG. 14 illustrates an example of a method of multiplexing UCI of a PUCCH with a first resource among a plurality of resources when a PUSCH is transmitted through the plurality of resources according to an embodiment of the present invention.

Referring to FIG. 14, when a resource for transmitting a PUCCH and a resource for repeatedly transmitting a PUSCH overlap with each other on at least one symbol, an UCI to be transmitted through the PUCCH may be multiplexed and transmitted in a PUSCH repetition located at the foremost in time among all PUSCH repetitions of a PUSCH including overlapping PUSCH repetitions.

That is, UCI that is control information to be transmitted from the user equipment to the base station may be always multiplexed on a PUSCH repetition located at the foremost in time among all PUSCH repetitions that are resources allocated from the base station through DCI to transmit a PUSCH. Here, the UCI cannot be multiplexed with the other PUSCH repetitions. For example, as illustrated in FIG. 14, when four PUSCH repetitions (PUSCH rep #0, PUSCH rep #1, PUSCH rep #2, and PUSCH rep #3) are configured for transmission of a PUSCH, a PUCCH may overlap with a third PUSCH (PUSCH rep #2) and a fourth PUSCH repetition (PUSCH rep #3).

In this case, the UE transmits the UCI to be transmitted through the PUCCH by multiplexing it with PUSCH rep #0, which is the first PUSCH repetition in time, and the PUCCH may not be additionally transmitted to the base station.

That is, a PUSCH is repeatedly transmitted through a plurality of resources in one or more slots, and a PUCCH for UCI (e.g., HARQ-ACK, channel state information, and the like) may be transmitted through one slot. When one or more of resources for repeated transmission of a PUSCH overlap with a resource for transmission of a PUCCH, the user equipment may multiplex the UCI with a resource located at the foremost among the resources for repeated transmission of a PUSCH to transmit the same.

Method 2: Multiplex with an earliest PUSCH repetition within a slot in which a PUCCH is transmitted among PUSCH repetitions that are resources of a PUSCH overlapping with a PUCCH.

Figure 15:
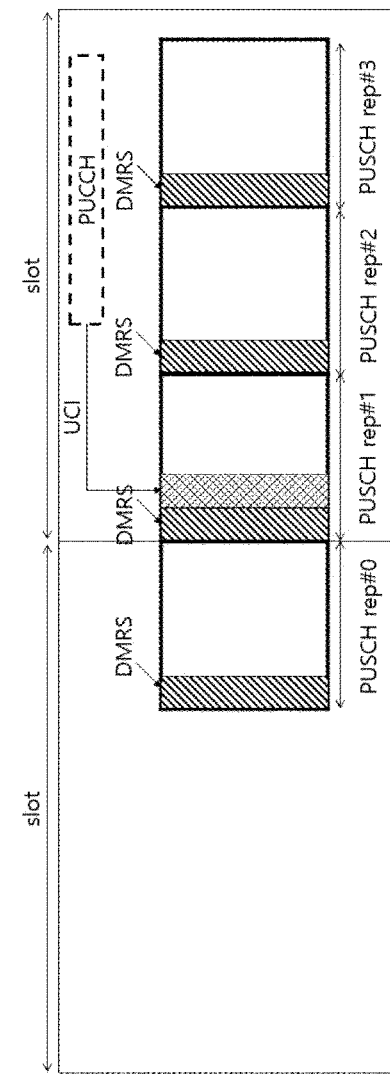

FIG. 15 illustrates an example of a method of multiplexing UCI of a PUCCH with a resource for repeated transmission of a first PUSCH within a slot in which a PUCCH is transmitted when a PUSCH is transmitted through a plurality of resources according to an embodiment of the present invention.

Referring to FIG. 15, when a resource for transmitting a PUCCH and a resource for repeatedly transmitting a PUSCH overlap with each other on at least one symbol, The UCI to be transmitted through the PUCCH may be multiplexed and transmitted in a PUSCH repetition located at the earliest in time in a slot in which a PUCCH is transmitted among all PUSCH repetitions of the PUSCH overlapping the PUSCH. That is, PUSCH repetitions included in a slot in which a PUCCH is to be transmitted are selected first from among PUSCH repetitions that are resources allocated through DCI of the base station to transmit a PUSCH, and UCI may be multiplexed with the earliest PUSCH repetition among the selected PUSCH repetitions.

Here, UCI may not be multiplexed with PUSCH repetitions of slots except for the slot in which a PUCCH is transmitted, and the PUSCH repetitions except for the PUSCH repetition located at the foremost in time among the PUSCH repetitions of the slot in which a PUCCH is transmitted may not be multiplexed with UCI.

For example, as illustrated in FIG. 15, when a PUCCH is transmitted in a second slot (slot #1), and a second PUSCH repetition (PUSCH rep #1), a third PUSCH repetition (PUSCH rep #2), and a fourth PUSCH repetition (PUSCH rep #3) for repeated transmission of a PUSCH are configured in the second slot, a resource for transmission of a PUCCH may overlap with a resource for repeated transmission of a PUSCH.

In this case, a PUCCH may overlap with the third PUSCH repetition (PUSCH rep #2) and the fourth PUSCH repetition (PUSCH rep #3) in the second slot, UCI for a PUCCH may be multiplexed with the second PUSCH repetition (PUSCH rep #1) which is the PUSCH repetition located at the foremost in time among the PUSCH repetitions of the second slot, and the user equipment may not additionally transmit a PUCCH since the UCI was transmitted by being multiplexed with a PUSCH.

Figure 16:
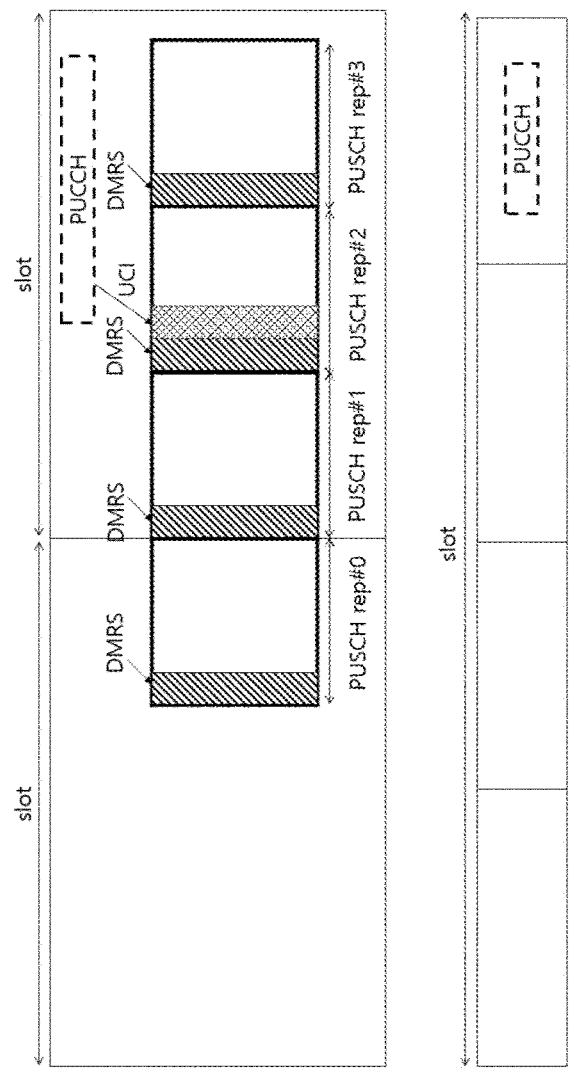

FIG. 16 illustrates an example of a method of determining a subcarrier spacing of a resource for transmission of a PUCCH overlapping with a resource for transmission of a PUSCH and a slot according to the subcarrier spacing when a PUSCH is transmitted through a plurality of resources according to an embodiment of the present invention.

If a subcarrier spacing of a cell in which a PUCCH is transmitted is different from a subcarrier spacing of a cell in which a PUSCH is transmitted, a slot in which a PUCCH is transmitted may be interpreted in two ways in Proposal 1. First, a slot in which a PUCCH is transmitted may be a slot determined according to a subcarrier spacing of a cell in which the PUCCH is transmitted. Furthermore, PUSCH repetitions overlapping with a slot in which a PUCCH is transmitted may be PUSCH repetitions included in the slot in which the PUCCH is transmitted. Second, a slot in which a PUCCH is transmitted may be a slot determined according to a subcarrier spacing of a cell in which a PUSCH overlapping with the PUCCH is transmitted.

For example, as illustrated in FIG. 16, when the subcarrier spacing of a PUCCH is determined using the first method, PUSCH repetitions in a slot in which a PUCCH is transmitted may be a third PUSCH repetition (PUSCH rep #2) and a fourth PUSCH repetition (PUSCH rep #3). However, when the subcarrier spacing of a PUCCH is determined using the second method, PUSCH repetitions in a slot in which a PUCCH is transmitted may be a second PUSCH repetition (PUSCH rep #1), the third PUSCH repetition (PUSCH rep #2), and the fourth PUSCH repetition (PUSCH rep #3).

Method 3: Multiplex with an earliest PUSCH repetition among PUSCH repetitions that are resources of a PUSCH overlapping with a PUCCH.

Figure 17:
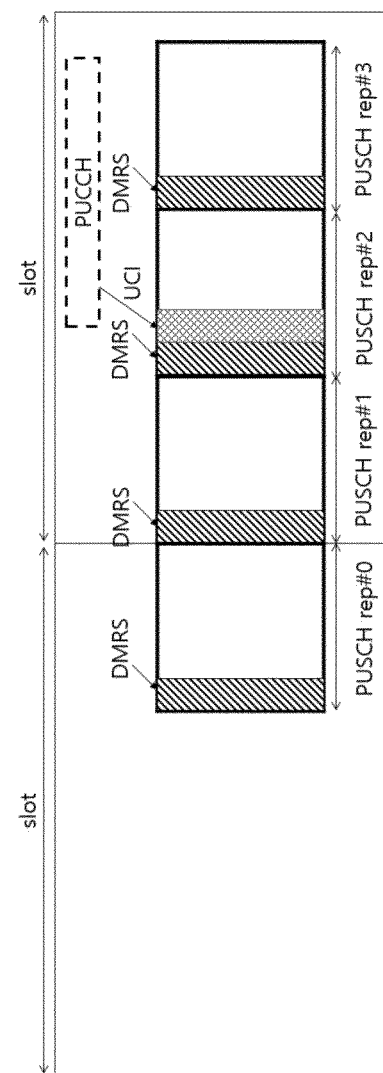

FIG. 17 illustrates an example of a method of multiplexing UCI of a PUCCH on a first-positioned resource among resources for repeated transmission of a PUSCH overlapping with a resource on which a PUCCH is transmitted when a PUSCH is transmitted through a plurality of resources according to an embodiment of the present invention.

Referring to FIG. 17, when a resource for transmitting a PUCCH and a resource for repeatedly transmitting a PUSCH overlap with each other on at least one symbol, UCI to be transmitted through a PUCCH may be multiplexed on a PUSCH repetition located at the foremost in time among all PUSCH repetitions of a PUSCH overlapping with a PUCCH so as to be transmitted. That is, PUSCH repetitions that are resources overlapping with a symbol on which a PUCCH is to be transmitted are selected first from among PUSCH repetitions that are resources allocated through DCI of the base station to transmit a PUSCH. Thereafter, the earliest PUSCH repetition among the selected PUSCH repetition may be multiplexed with UCI for a PUCCH.

In this case, UCI may not be multiplexed on PUSCH repetitions not overlapping with a resource for a PUCCH, and UCI may not be multiplexed on the PUSCH repetitions except for the earliest PUSCH repetition among the PUSCH repetitions overlapping with a symbol (or resource) on which a PUCCH is transmitted.

For example, as illustrated in FIG. 17, when a symbol of a resource on which a PUCCH is transmitted overlaps with a third PUSCH repetition (PUSCH rep #2) and a fourth PUSCH repetition (PUSCH rep #3), the user equipment may multiplex UCI to be transmitted through a PUCCH on the third PUSCH repetition (PUSCH rep #2) that is the earliest PUSCH repetition among the third PUSCH repetition (PUSCH rep #2) and the fourth PUSCH repetition (PUSCH rep #3) to transmit the same to the base station. In this case, the user equipment may not additionally transmit a PUCCH.

In detail, a PUSCH for a specific repetition type (e.g., PUSCH repetition type B) may be repeatedly transmitted on a plurality of resources (PUSCH repetition) allocated in one or more successive slots, and PUCCH for an UCI, such as HARQ-ACK and/or CSI information, may be transmitted through a single slot overlapping with PUSCH transmission in one or more slots. In this case, the user equipment may multiplex UCI on the PUSCH repetition located at the foremost in time among a plurality of PUSCH repetitions included in a PUSCH overlapping with PUCCH transmission. Thereafter, the user equipment may transmit a PUSCH multiplexed with UCI to the base station.

Here, the PUSCH repetition to be multiplexed with UCI may not be a nominal PUSCH repetition that is a resource allocated by the base station, but may be the first PUSCH repetition among actual PUSCH repetitions determined by the user equipment as a valid symbol for repeated transmission of a PUSCH.

A PUSCH repetition is required to satisfy a specific condition in order to be multiplexed with UCI. For example, an actual PUSCH repetition to be multiplexed with UCI is required to include more than one symbol and satisfy a processing time for multiplexing UCI.

That is, only actual PUSCH repetitions including more than one symbol among actual PUSCH repetitions achieved by excluding invalid symbols from nominal PUSCH repetitions that are resources for repeated transmission of a PUSCH allocated from the base station may be multiplexed with UCI. In other words, the user equipment does not expect that an actual PUSCH repetition to be multiplexed with a PUCCH is configured with one symbol.

Method 4: Multiplex with an earliest PUSCH repetition among PUSCH repetitions that are resources of a PUSCH overlapping with a slot in which a PUCCH is to be transmitted.

In detail, when a resource for transmitting a PUCCH and a resource for repeatedly transmitting a PUSCH overlap with each other on at least one symbol, UCI for a PUCCH may be multiplexed on an PUSCH repetition located at the front of the PUSCH repetitions overlapping with a slot in which a PUCCH is to be transmitted. That is, the user equipment may select PUSCH repetitions overlapping with a slot in which a PUCCH is to be transmitted among PUSCH repetitions for repeatedly transmitting a PUSCH. Thereafter, the user equipment may multiplex UCI on the PUSCH repetition located at the front of the selected PUSCH repetitions to transmit the same to the base station. Here, UCI may not be multiplexed on PUSCH repetitions not overlapping with a slot in which a PUCCH is to be transmitted, and UCI may not be multiplexed on the PUSCH repetitions except for the earliest PUSCH repetition among the PUSCH repetitions overlapping with a slot in which a PUCCH is to be transmitted.

For example, as illustrated in FIG. 15, a PUCCH may be transmitted on a resource of a second slot, and the second slot may overlap with a second PUSCH repetition (PUSCH rep #1), a third PUSCH repetition (PUSCH rep #2), and a fourth PUSCH repetition (PUSCH rep #3) in which a PUSCH is repeatedly transmitted. In this case, UCI to be transmitted through a PUCCH may be multiplexed on the second PUSCH repetition (PUSCH rep #1) which is the first-positioned PUSCH repetition among the second PUSCH repetition (PUSCH rep #1), the third PUSCH repetition (PUSCH rep #2), and the fourth PUSCH repetition (PUSCH rep #3) of the second slot, and the user equipment may not additionally transmit a PUCCH.

Method 5: Multiplex with a latest PUSCH repetition among PUSCH repetitions that are resources of a PUSCH overlapping with a PUCCH.

Figure 18:
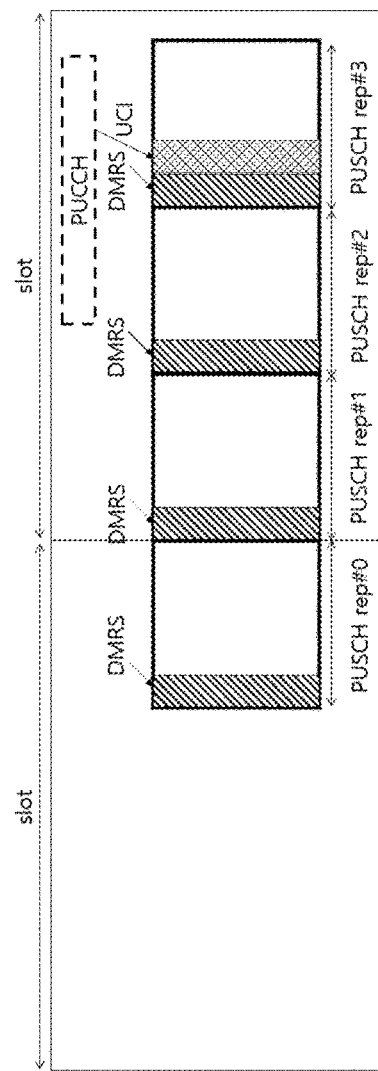

FIG. 18 illustrates an example of a method of multiplexing UCI of a PUCCH with a latest resource among a plurality of resources when a PUSCH is transmitted through the plurality of resources according to an embodiment of the present invention.

Referring to FIG. 18, when a resource for transmitting a PUCCH and a resource for repeatedly transmitting a PUSCH overlap with each other on at least one symbol, UCI may be transmitted by being multiplexed on a temporally latest PUSCH repetition among all PUSCH repetitions of a PUSCH overlapping with a PUCCH in order to satisfy a processing time required for multiplexing a PUSCH and UCI of a PUCCH. That is, PUSCH repetitions overlapping with a resource (or slot) on which a PUCCH is to be transmitted may be selected from among PUSCH repetitions for repeated transmission of a PUSCH. Thereafter, UCI may be multiplexed on the latest PUSCH repetition among the selected PUSCH repetitions in time. UCI may not be multiplexed on PUSCH repetitions not overlapping with a slot in which a PUCCH is to be transmitted, and UCI may not be multiplexed on the PUSCH repetitions except for the latest PUSCH repetition among the PUSCH repetitions overlapping with a slot (or resource) in which a PUCCH is to be transmitted.

For example, as illustrated in FIG. 18, a second slot in which a PUCCH is to be transmitted may overlap with a second PUSCH repetition (PUSCH rep #1), a third PUSCH repetition (PUSCH rep #2), and a fourth PUSCH repetition (PUSCH rep #3). In this case, UCI to be transmitted through a PUCCH may be multiplexed on the fourth PUSCH repetition (PUSCH rep #3) which is the last-positioned PUSCH repetition among the second PUSCH repetition (PUSCH rep #1), the third PUSCH repetition (PUSCH rep #2), and the fourth PUSCH repetition (PUSCH rep #3) of the second slot, and the user equipment may not additionally transmit a PUCCH.

The following two issue may be considered when selecting a PUSCH repetition that is a resource for multiplexing UCI when a PUCCH overlaps with a PUSCH repetition in methods 1 to 5 in Proposal 1.

First, a PUSCH repetition is required to satisfy a processing time for UCI to be multiplexed with a PUSCH repetition. In detail, in order for UCI to be multiplexed with a PUSCH repetition, a processing time is required until multiplexing is completed. If a PUSCH repetition which does not satisfy the processing time is present, the PUSCH repetition which does not satisfy the processing time may be excluded, and a PUSCH repetition with which UCI to be multiplexed may be selected from among PUSCH repetitions satisfying the processing time.

If all PUSCH repetitions do not satisfy the processing time for multiplexing, the PUSCH repetitions may not be multiplexed with UCI. In this case, the user equipment may transmit the UCI to the base station through a PUCCH without multiplexing the UCI with a PUSCH repetition, and may not transmit a PUSCH on PUSCH repetitions overlapping with a PUCCH.

A PUSCH which was not transmitted due to transmission of a PUCCH may be transmitted after transmission of a PUCCH.

Second, a latency restriction condition for UCI may be present. That is, when there is a latency time restriction for transmission of UCI within a fixed time, the user equipment may select a PUSCH repetition from among only PUSCH repetitions which satisfy such a latency time to multiplex UCI with the selected PUSCH repetition.

For example, when a latency time restriction condition for transmission of UCI is configured as a specific value from a higher layer, the user equipment is required to transmit UCI to the base station within a latency time according to the configured specific value. Therefore, the user equipment may exclude PUSCH repetitions which do not satisfy (violate) the latency time restriction condition, and may select a PUSCH repetition with which UCI to be multiplexed from among PUSCH repetitions satisfying the latency time restriction condition.

That is, UCI cannot be multiplexed on a PUSCH repetition positioned on a symbol other than a symbol given as the latency time restriction condition by a higher layer.

(Proposal 2: A Plurality of PUSCH Repetitions are Multiplexed with UCI of a PUSCH so as to be Transmitted)

When a PUSCH is repeatedly transmitted multiple times on a plurality of resources of one or more successive slots, if a resource for repeated transmission of a PUSCH overlaps with a resource for transmission of a PUCCH, the user equipment may multiplex a plurality of PUSCH repetitions among resources for repeated transmission of a PUSCH with a PUCCH to transmit the same to the base station. Here, a resource may include at least one of a symbol and a PRB.

Method 0: Transmit UCI of a PUCCH on all PUSCH repetitions of a PUSCH overlapping with a PUCCH When a resource for transmitting a PUCCH and a PUSCH repetition overlap with each other on at least one symbol, UCI may be transmitted by being multiplexed on all PUSCH repetitions of a PUSCH overlapping with a PUCCH. In other words, UCI may be transmitted by being multiplexed on all of one or more PUSCH repetitions included in one PUSCH.

Method 1: Transmit UCI of a PUCCH on PUSCH repetitions overlapping with a PUCCH

When a resource for transmitting a PUCCH and a PUSCH repetition overlap with each other on at least one symbol, UCI may be transmitted by being multiplexed on all PUSCH repetitions overlapping with a PUCCH. In other words, PUSCH repetitions overlapping with a symbol on which a PUCCH is to be transmitted may be selected from among PUSCH repetitions of a PUSCH, and UCI for a PUCCH may be transmitted by being multiplexed with the selected PUSCH repetitions. Here, PUSCH repetitions which do not overlap with a symbol on which a PUCCH is to be transmitted may not be multiplexed with UCI.

Method 2: Transmit UCI of a PUCCH on all PUSCH repetitions included in a slot in which a PUCCH is to be transmitted When a resource for transmitting a PUCCH and a PUSCH repetition overlap with each other on at least one symbol, UCI may be transmitted by being multiplexed on all PUSCH repetitions of a slot in which a PUCCH is to be transmitted. In other words, PUSCH repetitions included in a slot in which a PUCCH is to be transmitted may be selected from among PUSCH repetitions of a PUSCH, and UCI for a PUCCH may be transmitted by being multiplexed with the selected PUSCH repetitions. That is, a slot in which a PUCCH is to be transmitted may be selected from among PUSCH repetitions of a PUSCH, and UCI may be transmitted by being multiplexed on PUSCH repetitions included in the selected slot. Here, PUSCH repetitions of a slot in which a PUCCH is not transmitted may not be multiplexed with UCI.

Method 3: UCI of a PUCCH is transmitted by being multiplexed on foremost PUSCH repetitions of each slot overlapping with a PUCCH When a resource for transmitting a PUCCH and a PUSCH repetition overlap with each other on at least one symbol, slots in which a PUCCH is transmitted may be selected first in a cell in which a PUSCH is transmitted. Thereafter, UCI may be transmitted by being multiplexed on a PUSCH repetition located at the foremost in time among the PUSCH repetitions of each of the selected slots.

Method 4: UCI of a PUCCH is transmitted by being multiplexed on foremost PUSCH repetitions of each slot overlapping with a PUCCH slot When a PUCCH and a PUSCH repetition for repeated transmission of a PUSCH overlap with each other on at least one symbol, slots overlapping with a slot in which a PUCCH is transmitted may be selected first in a cell in which a PUSCH is transmitted. Thereafter, UCI may be transmitted by being multiplexed on a PUSCH repetition located at the foremost in time among the selected slots.

When UCI is multiplexed on a plurality of PUSCH repetitions, UCI may be transmitted through the following methods.

Method 1: When all of the same UCI are multiplexed with a plurality of PUSCH repetitions respectively, all of the same UCI may be repeatedly transmitted in each PUSCH repetition. That is, if the user equipment receives multiplexed UCI in one PUSCH repetition, the user equipment may successfully receive UCI since all UCI is included in one PUSCH repetition even if another PUSCH repetition is not received.

Method 2: When UCI is multiplexed in a plurality of PUSCH repetitions, UCI may be transmitted by being divided as equally as possible among PUSCH repetitions. That is, when UCI is multiplexed in a plurality of PUSCH repetitions, UCI may be transmitted by being divided into equal bits and included in a plurality of PUSCH repetitions to be multiplexed.

Here, UCI may be equally multiplexed in PUSCH repetitions such that a difference of up to 1 bit occurs. For example, when UCI includes HARQ-ACK, CSI type 1, and CSI type 2, UCI may be divided by X bits so as to be equally included in N number of PUSCH repetitions. Here, ceil(X/N) bits of UCI may be multiplexed with mod(X,N) number of PUSCH repetitions, and floor(X/N) bits of UCI may be multiplexed with N-mod(X,N) number of PUSCH repetitions.

Method 3: UCI may be transmitted by being divided as equally as possible among PUSCH repetitions included in one slot. That is, UCI may be multiplexed by being divided into equal bits in PUSCH repetitions included in the same slot, and UCI may not be divided among PUSCH repetitions of different slots in order to be transmitted.

In another embodiment of the present invention, when a PUCCH and a PUSCH overlap with each other on at least one symbol, the user equipment may transmit a PUCCH without transmitting a PUSCH in the following cases.

First: When a priority of a UL-SCH transmitted through a PUSCH is lower than a priority of UCI transmitted through a PUCCH, a PUSCH overlapping with a PUCCH may not be transmitted, and only a PUCCH may be transmitted. Here, the priority may be indicated through a PDCCH for scheduling a PUSCH and a PUCCH, and may be configured by a higher layer.

Second: When a resource of a PUSCH for transmitting UCI by multiplexing the UCI with a PUSCH is not present or insufficient, a PUSCH overlapping with a PUCCH may not be transmitted, and only a PUCCH may be transmitted. For example, when 1-symbol PUSCH and a DMRS symbol of a PUSCH are positioned on the last symbol of a PUSCH, and UCI is required to be multiplexed on a symbol next to the DMRS symbol, a resource for multiplexing and transmitting UCI is not present. In this case, since UCI cannot be multiplexed with a PUSCH, the user equipment may transmit a PUCCH without transmitting a PUSCH.

That is, when a PUSCH repetition is multiplexed with UCI (e.g., HARQ-ACK and/or CSI information), a PUSCH repetition may be configured with two or more symbols. In other words, the user equipment may assume that a PUSCH repetition overlapping with a PUCCH includes at least one symbol.

When a resource of a PUSCH for transmitting UCI by multiplexing the UCI with a PUSCH is not present or insufficient (e.g., when 1-symbol PUSCH and a DMRS symbol of a PUSCH are positioned on the last symbol of a PUSCH, and UCI is required to be multiplexed on a symbol next to the DMRS symbol), UCI may be multiplexed with a PUSCH since there is no resource for transmitting UCI. In this case, the user equipment may transmit a PUCCH on a resource overlapping with a PUCCH without transmitting a PUSCH. Or, the user equipment may transmit a PUSCH on the resource without transmitting a PUCCH. Or, a channel to be transmitted among a PUSCH and a PUCCH may be indicated to the user equipment through a PDCCH. For example, a channel indicated by a PDCCH transmitted later may be transmitted and other channels may not be transmitted, or a channel to be transmitted may be determined by DCI transmitted by a PDCCH.

In detail, when a specific field included in DCI for scheduling a PUSCH indicates a specific code point, a PUCCH may not be transmitted and a PUSCH may be transmitted. Here, the specific code point may be indicated so that a beta_offset value becomes 0. The beta_offset is a parameter, which is indicated by a DCI field referred to as a beta_offset indicator and is used to determine the number of REs occupied when UCI of the beta_offset is multiplexed with a PUSCH.

In the above second method, when a resource for transmitting UCI by multiplexing the UCI with a PUSCH is not present or insufficient in the symbol next to the DMRS symbol of a PUSCH (e.g., when there is no symbol next to the DMRS symbol since the DMRS symbol of a PUSCH is the last symbol of a PUSCH, or when UCI cannot be transmitted while satisfying a sufficient code rate since the number of REs of a symbol is not sufficient even if the symbol next to the DMRS symbol of a PUSCH is present), the UCI may be multiplexed using additional REs of a symbol positioned immediately before the DMRS symbol. For example, UCI is multiplexed by being sequentially mapped to symbols after a symbol to which DMRS of a PUSCH is mapped, from the symbol next to the symbol to which DMRS of a PUSCH is mapped to following symbols. When RE required for multiplexing is insufficient while UCI is being mapped, UCI is multiplexed by being sequentially mapped to symbols before the symbol to which DMRS is mapped, from the symbol immediately before the symbol to which DMRS is mapped to previous symbols.

For another example, UCI may be multiplexed with a PUSCH by alternately mapping UCI to symbols after the symbol to which DMRS is mapped and symbols before the symbol to which DMRS is mapped. That is, UCI is first mapped to the symbol next to the symbol to which DMRS is mapped so as to be multiplexed. If RE required for multiplexing UCI is insufficient, UCI is mapped to the symbol immediately before the symbol to which DMRS is mapped. Thereafter, when RE required for multiplexing is still insufficient, UCI is multiplexed by being mapped to the next symbol of the symbol next to the symbol to which DMRS is mapped. Thereafter, when RE is still insufficient since all of UCI are not mapped, UCI may be multiplexed by being mapped to the previous symbol of the symbol positioned immediately before the symbol to which DMRS is mapped. As described above, UCI may be alternately mapped to symbols before and symbols after the symbol to which DMRS is mapped. For another example, UCI may be multiplexed by being sequentially mapped to symbols starting from a temporally earliest symbol, except for the symbol to which DMRS is mapped.

If a resource (e.g., RE) that is not mapped to DMRS is present in the symbol to which DMRS is mapped, the resource may be used for multiplexing UCI. For example, first, UCI may be multiplexed by being sequentially mapped to symbols from the symbol next to the DMRS symbol to following symbols. If RE required for multiplexing UCI is insufficient, UCI is multiplexed by being mapped to REs to which DMRS is not mapped in a symbol to which DMRS is mapped. Thereafter, when RE required for multiplexing is insufficient, UCI may be multiplexed by being sequentially mapped to symbols before the symbol to which DMRS is mapped, from the symbol immediately before the symbol to which DMRS is mapped to previous symbols.

In another embodiment, pieces of UCI may be mapped first to a symbol next to the symbol to which DMRS is mapped. Thereafter, when RE for multiplexing UCI is insufficient, UCI may be multiplexed by being mapped to resources (e.g., RE) to which DMRS is not mapped in the symbol to which DMRS is mapped. If RE required for multiplexing UCI is insufficient, UCI may be multiplexed by being mapped to the symbol immediately before the symbol to which DMRS is mapped.

If RE required for multiplexing UCI is additionally required, UCI may be multiplexed by being sequentially mapped to a symbol after the symbol next to the symbol to which DMRS is mapped and to a symbol before the symbol immediately before the symbol to which DMRS is mapped. As described above, UCI may be alternately mapped to symbols after and symbols before the symbol to which DMRS is mapped.

In another embodiment, UCI may be multiplexed by being sequentially mapped to symbols starting from a temporally earliest symbol among all symbols.

Another problem to be solved by the present invention relates to a method for transmitting UCI when a PUCCH for transmitting HARQ-ACK having low priority overlaps with a PUCCH for transmitting a scheduling request (SR) having high priority on at least one symbol.

In NR Rel-15, when a PUCCH for transmitting a SR and a PUCCH for transmitting HARQ-ACK overlaps with each other on at least one symbol, the following operation is performed.

In the case of SR with PUCCH format 0+HARQ-ACK with PUCCH format 1, i.e., when a resource of PUCCH format 0 for transmitting SR overlaps with a resource of PUCCH format 1 for transmitting HARQ-ACK, the user equipment transmits HARQ-ACK with PUCCH format 1 but does not transmit SR with PUCCH format 0 (here, SR may be limited to positive SR). However, since SR has high priority, it may not be a correct operation not to transmit SR.

To resolve such a situation, the following methods are proposed.

Method 1: Information of SR may be added to remaining bits of PUCCH format 1 so as to be transmitted.

In detail, in the case of PUCCH format 1, information of up to 2 bits may be transmitted. If HARQ-ACK is 1 bit, 1 bit remains. SR to be transmitted through PUCCH format 0 may be expressed with 1 bit. For example, 0 indicates negative SR, and 1 indicates positive SR. 2-Bit information may be generated by connecting 1-bit HARQ-ACK and 1-bit SR by adding information of SR to the remaining 1 bit of PUCCH format 1, and 2-bit HARQ-ACK and SR may be transmitted through PUCCH format 1.

If HARQ-ACK has 2 bits, 2-bit HARQ-ACK may be bundled to have 1 bit, and the bundled 1-bit HARQ-ACK and 1-bit SR may be connected so as to generate information including 2-bit HARQ-AC and SR. The generated information may be added to PUCCH format 1 so as to be transmitted to the user equipment. Here, HARQ-ACK bundling represents that 2 bits of HARQ-ACK are set to 1 when both the bits indicate ACK and to 0 for other situations.

Method 2: According to a PUCCH format to be transmitted, information of HARQ-ACK and SR may be differently determined. In detail, according to PUCCH format 0, information may be transferred according to 12 cyclic shift (CS) values. In the case of positive SR, the user equipment may transmit PUCCH format 1 with a preset (or predetermined) CS value among the 12 CSs. In the case of negative2 SR, PUCCH format 1 for transferring HARQ-ACK information may be intactly transmitted to the base station. In the case of positive SR, HARQ-ACK information and SR information may be transmitted through PUCCH format 0 having different CS values. Here, the case of 1-bit HARQ-ACK is described below.

The difference between a CS value corresponding to NACK and a CS value corresponding to ACK may be 6. Here, determining the two CS values so that the difference therebetween is 6 may be the same as determining two farthest CS values. Furthermore, the CS value corresponding to NACK may be a CS value which does not overlap with HARQ-ACK and is used only for transmitting positive SR.

Here, the case of 2-bit HARQ-ACK is described below.

A CS value corresponding to NACK, NACK, a CS value corresponding to NACK, ACK, a CS value corresponding to ACK, ACK, and a CS value corresponding to ACK, NACK may have a difference of 3 in this order. Here, determining the four CS values so that the difference therebetween is 3 may be the same as determining four most equalized CS values.

Furthermore, 2-bit HARQ-ACK corresponding to two adjacent CS values among the four CS values may only differ in a value of up to 1 bit, and the CS value corresponding to NACK, NACK may be a CS value used for transmitting only positive SR without overlapping with HARQ-ACK. The base station, first of all, determines a PUCCH format transmitted through an uplink among PUCCH format 0 and PUCCH format 1. It may be recognized that positive SR has been transmitted if it is determined that PUCCH format 0 has been transmitted, and it may be recognized that negative SR has been transmitted if it is determined that PUCCH format 1 has been transmitted. That is, the type of SR may be recognized according to PUCCH format. Thereafter, HARQ-ACK information may be determined. For example, when PUCCH format 1 is transmitted, HARQ-ACK information may be determined by decoding PUCCH format 1, and, when PUCCH format 0 is transmitted, HARQ-ACK information may be determined using a CS value of PUCCH format 0.

Another problem to be solved by the present invention is a situation in which SR having a high priority and a PUSCH having a low priority overlap with each other on at least one symbol. The following operation is defined in NR Rel-15. If a PUSCH is scheduled in a SR occasion (transmittable symbol in the case of positive SR), the user equipment transmits a PUSCH but does not transmit a SR. This is because the user equipment is already capable of transmitting information through a PUSCH, and thus does not need to transmit a SR for requesting information through an uplink. However, as described above, if a SR has a high priority, SR transmission is required for uplink transmission of high priority other than a PUSCH already scheduled to be transmitted. To this end, the following method is proposed.

Some of resources in a scheduled PUSCH may be reserved as a resource for SR transmission. Furthermore, a PUSCH does not use a resource for SR transmission, and performs rate matching or puncturing on the corresponding resource. A resource for SR transmission may be determined as below.

First, a resource for SR transmission may be reserved in the same symbol as SR occasion. For example, when a resource for SR transmission is positioned in an even-numbered symbol of a slot, some of resources of a PUSCH may be reserved as a resource for SR transmission in the even-numbered symbol. That is, a resource for SR transmission may be reserved in a PUSCH using a period of SR occasion. A resource for SR transmission may be reserved in a PUSCH at the same period as SR occasion. Furthermore, some of resources of a PUSCH of the same number of symbols as the symbols of SR occasion may be reserved as a resource for SR transmission.

Furthermore, in the case of positive SR, on a resource for SR transmission, a SR having the same PUCCH format as that transmitted in SR occasion may be transmitted. If a resource reserved for SR transmission overlaps with a resource used as DMRS of a PUSCH, the resource reserved for SR transmission may be dropped. That is, this resource may not be reserved for SR transmission.

In another embodiment, the user equipment may transmit DMRS on a symbol other than a resource for SR transmission, and PRBs positioned on an end side of a PUSCH may be used as PRB of a resource reserved for SR transmission. For example, a PRB of a lowest index or a PRB of a highest index may be used. In another embodiment, a PRB of a resource to be reserved for SR transmission may be a PRB that is most adjacent to SR occasion.

In another embodiment of the present invention, when a resource for mapping a PUCCH from the user equipment to the base station overlaps or collides with a resource of another PUCCH, pieces of UCI of each of PUCCHs may be transmitted by being multiplexed or through a new PUCCH resource. That is, a method of selecting a new PUCCH resource when UCI includes time-sensitive information is proposed.

Method 1: When resources for transmitting PUCCHs overlap or collide with each other, the user equipment may select a PUCCH resource for transmitting pieces of UCI in one slot through the following method. In a first step, the user equipment excludes, from PUCCH resources configured in the corresponding slot, PUCCH resources mapped to a symbol after the last symbol of a resource to which a PUCCH for transmitting UCI (or UCI having a high priority) is mapped. That is, PUCCH resources that end later than UCI of URLLC may be excluded.

Thereafter, in a second step, the user equipment sequentially checks whether pieces of UCI can be transmitted on PUCCH resources in a certain order among PUCCH resources of which the last symbol is positioned before or at the same position as the last symbol of a PUCCH resource for transmitting UCI (or UCI having a high priority). Here, the certain order may be determined on the basis of the number of REs included in each PUCCH and modulation order and/or code rate.

In detail, the certain order may be determined as an ascending order of values obtained by multiplying the number of REs, modulation order, and code rate. It may be determined to be possible to transmit pieces of UCI on a PUCCH resource if the length of pieces of UCI to be transmitted is less than the size of bits transmittable through a PUCCH.

A PUCCH resource for transmitting pieces of UCI in one slot may be selected from PUCCH resources except for PUCCH resources which do not satisfy a processing timeline. Through this process, the user equipment may select one PUCCH resource for transmitting pieces of UCI.

Method 2: When resources for transmitting PUCCHs overlap or collide with each other, the user equipment may select a PUCCH resource for transmitting pieces of UCI in one slot through the following method. In a first step, the user equipment selects the foremost symbol among the last symbols of PUCCH resources configured in the corresponding slot. In a second step, the user equipment selects a PUCCH resource corresponding to the symbol selected in the first step. If two or more PUCCH resources correspond to the selected symbol, the PUCCH resources may be sorted in a certain order. Here, the certain order may be determined in the same manner as in method 1. Thereafter, a PUCCH resource for transmitting UCI may be selected from among the PUCCH resources sorted in the certain order.

The user equipment may transmit UCI on the selected PUCCH resource selected through the first step and the second step. If the user equipment cannot transmit UCI on the selected PUCCH (e.g., when the selected PUCCH resource exceeds the code rate and does not satisfy the processing time of the user equipment, or does not satisfy a latency condition of UCI), the user equipment may select, through the first step and the second step, one PUCCH resource from among the PUCCH resources except for the corresponding PUCCH resource. Through these steps, the user equipment may select one PUCCH resource for transmitting UCI.

Method 3: The user equipment may transmit UCI by selecting a PUCCH resource for multiplexing pieces of UCI except for URLLC UCI (or UCI having a high priority).

Method 3 uses a scheme of Rel-15. According to the scheme of Rel-15, PUCCH resources which overlap in the time domain are sorted in an ascending order on the basis of values obtained by multiplying the number of REs in the PUCCH resources, modulation order, and/or code rate, and it is sequentially determined whether UCI transmission is possible on the PUCCH resources.

In this way, A first PUCCH resource for multiplexing and transmitting pieces of UCI except for URLLC UCI (or UCI having a high priority) and a second PUCCH through which URLLC UCI (or UCI having a high priority) is transmitted may be multiplexed as described below. First, when the first PUCCH resource ends earlier than or simultaneously with the second PUCCH resource (e.g., when the last symbol of the first PUCCH resource is the same as or before the last symbol of the second PUCCH resource), and URLLC UCI of the second PUCCH resource can be multiplexed With the first PUCCH resource, the user equipment may multiplex URLLC and pieces of UCI of the first PUCCH resource to transmit the both on the first PUCCH resource. In this case, the first PUCCH resource is required to satisfy the processing time for transmitting URLLC UCI. Otherwise, URLLC UCI cannot be multiplexed with UCI of the first resource.

If the first PUCCH resource ends later than the second PUCCH resource (e.g., when the last symbol of the first PUCCH resource is positioned after the last symbol of the second PUCCH resource), and pieces of UCI cannot be multiplexed with the first PUCCH resource, the user equipment may transmit a URLLC resource through the second PUCCH resource without transmitting the first PUCCH resource.

The present invention provides a method for transmitting, when HARQ-ACK is scheduled to be transmitted through 2-symbol PUCCH format 0, SR and HARQ-ACK in a situation in which the corresponding PUCCH overlaps with two PUCCHs for SR transmission. Here, the format of PUCCH for transmitting SR may include PUCCH format 0. In Rel-15 NR, when one PUCCH for transmitting SR temporally overlaps with PUCCH format 0 for transmitting HARQ-ACK, SR and UCI may be transmitted using the following method.

When HARQ-ACK is transmitted through 1 bit of a PUCCH, and a PUCCH for transmitting SR overlaps with a PUCCH for transmitting HARQ-ACK, HARQ-ACK may transmit, as a cyclic shift value, one of 9 (NACK) and 6 (ACK) if SR is negative SR.

When a PUCCH for transmitting SR overlaps with a PUCCH for transmitting HARQ-ACK, and SR is positive SR, the user equipment may transmit, as a cyclic shift value, one of 3 (NACK+positive SR) and 9 (ACK+positive SR) to the base station. That is, when positive SR overlaps with HARQ-ACK, the user equipment may add 3 to the CS value for the case where negative SR overlaps with HARQ-ACK to transmit the CS value.

When HARQ-ACK is transmitted through 2 bits of a PUCCH, and a PUCCH for transmitting SR overlaps with a PUCCH for transmitting HARQ-ACK, HARQ-ACK may transmit, as a cyclic shift value, one of 0 (NACK, NACK), 3 (NACK, ACK), 6 (ACK, ACK), and/or 9 (ACK, NACK). When SR overlaps with HARQ-ACK and is positive SR, UCI may be transmitted through a cyclic shift value. For example, one of 1 (NACK, NACK, positive SR), 4 (NACK, ACK, positive SR), 7 (ACK, ACK, positive SR), and/or 10 (ACK, NACK, positive SR) may be transmitted as the cyclic shift value, and HARQ-ACK and SR may be recognized according to the transmitted cyclic shift value. In this case, in the case of overlapping with positive SR, the CS value of positive SR may be a value obtained by adding 1 to the CS value for the case of negative SR.

Rel-15 NR does not consider a situation in which two or more SRs and PUCCH format 0 for transmitting HARQ-ACK overlap with each other in the time domain. However, it is necessary to configure SR of a shorter period through an uplink to provide a URLLC service of Rel-16. Therefore, when PUCCH format 0 for transmitting HARQ-ACK is 2-symbol format, it may overlap with a PUCCH for transmitting two SRs. In this case, a method for transmitting two SRs and HARQ-ACK is required.

Method 1: One of two SRs may be transmitted together with HARQ-ACK, and the other SR may be dropped without being transmitted. Furthermore, one SR and HARQ-ACK may be transmitted using a CS value in the same manner as in the method used in Rel-15. The SR to be transmitted together with HARQ-ACK among two SRs may be determined through the following three methods.

1) SR to be transmitted together with HARQ-ACK and SR to be dropped without being transmitted may be determined using ID of SR. For example, SR having a lower ID may be determined to be SR that is always transmitted, or SR having a higher ID may be determined to be SR that is always transmitted.

2) SR to be transmitted may be determined using allocation information of a time domain. For example, a PUCCH that is earlier in the time domain among PUCCHs for respectively transmitting two SRs may be determined to be SR that is always transmitted. On the contrary, SR for a PUCCH that is later in the time domain among PUCCHs for respectively transmitting two SRs may be determined to be SR that is always transmitted.

3) SR to be transmitted may be determined according to a priority of SR. The priority of SR may be set by a higher layer (e.g., RRC signaling). The user equipment may determine SR always having a high priority as SR to be always transmitted.

Method 2: Two SRs and HARQ-ACK may be differentiated by CS so as to be transmitted. When HARQ-ACK is 2-bit, two SRs and HARQ-ACK may be transmitted using CS through the following method. Here, a HARQ-ACK value of 0 indicates NACK, and HARQ-ACK value of 1 indicates ACK.

A first SR and a second SR may be determined according to 1) ascending order of SR IDs, 2) ascending order of symbols of PUCCH for transmitting SR, or 3) ascending order of SR priorities. That is, when the first SR among two SRs is positive, CS obtained by adding 1 to a CS value for transmitting negative SR may be transmitted in the same manner as in the above method of transmitting SR and 2-bit HARQ-ACK in Rel-15, and, when the second SR is positive, CS obtained by adding 2 to a CS value for transmitting negative SR may be transmitted.

Following table 4 shows an example of CS values according to SR and HARQ-ACK.

TABLE 4

| HARQ-ACK Value | {0, 0} | {0, 1} | {1, 1} | {1, 0} |
|---|---|---|---|---|
| Sequence cyclic shift if first SR is positive | $m_{CS} = 1$ | $m_{CS} = 4$ | $m_{CS} = 7$ | $m_{CS} = 10$ |
| Sequence cyclic shift if second SR is positive | $m_{CS} = 2$ | $m_{CS} = 5$ | $m_{CS} = 8$ | $m_{CS} = 11$ |

When HARQ-ACK is 1 bit, two SRs and 1-bit HARQ-ACK may be transmitted using a CS value determined according to whether SR is positive or negative. For example, when the first SR among two SRs is positive, a value obtained by adding 3 to a CS value for transmitting negative SR may be transmitted in the same manner as in the method of transmitting SR and 1-bit HARQ-ACK in Rel-15, and, when the second SR is positive, a value obtained by adding 4 to a CS value for transmitting negative SR may be transmitted.

Following table 5 shows an example of CS values according to SR and HARQ-ACK.

TABLE 5

| HARQ-ACK Value | 0 | 1 |
|---|---|---|
| Sequence cyclic shift if first SR is positive | $m_{CS} = 3$ | $m_{CS} = 9$ |
| Sequence cyclic shift if second SR is positive | $m_{CS} = 4$ | $m_{CS} = 0$ |

Through this method, even if PUCCHs for respectively transmitting SR and HARQ-ACK overlap with each other, information about HARQ-ACK and SR may be transmitted to the user equipment through a CS value, and the user equipment may recognize, through a received SR value, whether HARQ-ACK is ACK or NACK and whether SR is positive or negative.

<Proposal 3: PUSCH is Repeatedly Transmitted Only on a Valid Symbol Other than an Invalid Specific Symbol on a Resource for Repeated Transmission of PUSCH>

FIGS. 19 to 22 are diagrams illustrating an example of a slot format for repeated transmission of PUSCH according to an embodiment of the present invention.

Figure 19:
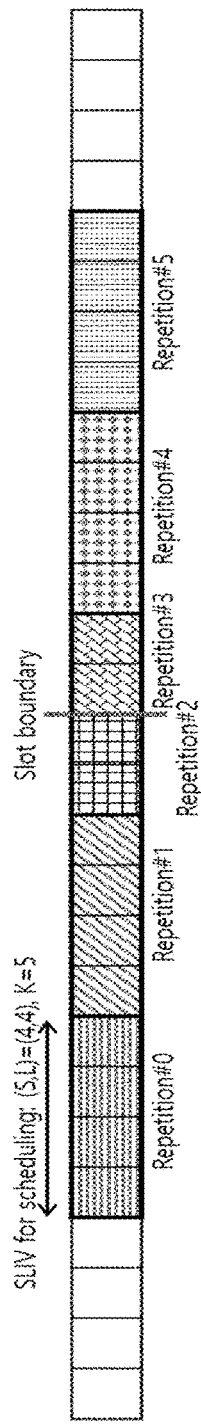
FIGS. 19 to 22 are diagrams illustrating an example of a slot format for repeated transmission of PUSCH according to an embodiment of the present invention.

FIG. 19 is a diagram illustrating an example of a resource allocated for repeated transmission of PUSCH.

Referring to FIG. 19, a resource for repeated transmission of PUSCH may be allocated by transmitting a starting symbol index and allocated resource length from the base station.

In detail, the base station transmits, to the user equipment, resource allocation information of time domain for a first PUSCH repetition for repeated transmission of PUSCH. The resource allocation information may include starting symbol index S, symbol length L, repetition number K. The user equipment determines a symbol for repeated transmission of PUSCH on the basis of the resource allocation information. Here, a next PUSCH repetition may be successively transmitted on a symbol immediately next to a first PUSCH repetition. That is, in FIG. 19, the first PUSCH repetition (repetition #0) for repeated transmission of PUSCH is determined on the basis of the resource allocation information, and, on the next symbol, a second PUSCH repetition (repetition #1) for repeated transmission may be determined.

When a PUSCH repetition for repeated transmission of PUSCH exceeds a boundary of a slot, the PUSCH repetition may be divided on the basis of the boundary of a slot.

Furthermore, when one PUSCH repetition overlaps with a downlink symbol or SS/PBCH block configured by semi-static UL/DL configuration, the PUSCH repetition may transmit PUSCH repetition on a symbol which does not overlap with the downlink symbol. In addition, the user equipment may also exclude, from PUSCH repetition, a flexible symbol next to the downlink symbol configured by semi-static UL/DL configuration.

For example, as illustrated in FIG. 19, when the resource allocation information transmitted from the base station indicates that the starting symbol index of the first PUSCH repetition is 4, the length is 4, and the transmission repetition number is 5, since a third PUSCH repetition (repetition #2) is beyond a slot boundary, PUSCH repetition is divided on the basis of the slot boundary.

This method may cause the disadvantage that the number of symbols of one PUSCH repetition is too small when PUSCH repetition is divided at a slot boundary. To resolve this issue, in an embodiment of the present invention, if a PUSCH repetition is configured with only one symbol, the user equipment may not transmit this PUSCH repetition. This is because when PUSCH repetition is configured with only one symbol, data except for DMRS cannot be transmitted on the symbol. Furthermore, when the number of symbols that are transmitted by PUSCH repetition is less than or equal to the number of DMRS symbols to be transmitted in the PUSCH repetition, the user equipment may not transmit the corresponding PUSCH repetition.

Figure 20:
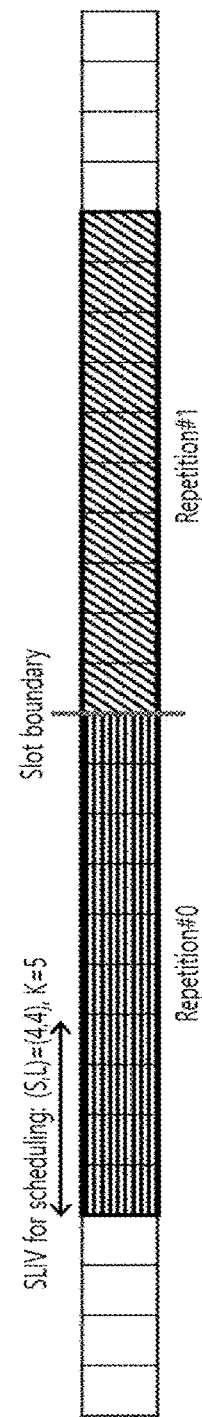

FIG. 20 is a diagram illustrating another example of a resource allocated for repeated transmission of PUSCH.

Referring to FIG. 20, a resource for repeated transmission of PUSCH may be differently configured according to a slot boundary.

In detail, the base station transmits, to the user equipment, resource allocation information of time domain for repeated transmission of PUSCH. The resource allocation information may include starting symbol index S, symbol length L, repetition number K. The user equipment confirms whether L*K number of symbols starting from the starting symbol exceed a slot boundary. If the L*K number of symbols do not exceed a slot boundary, a first PUSCH repetition may be configured with L number of symbols starting from the starting symbol, and, thereafter, K−1 number of PUSCH repetitions may successively start immediately after the first PUSCH repetition and may occupy L number of symbols.

If the L*K number of symbols from the starting symbol exceed a slot boundary, the user equipment may divide PUSCH repetition of the L*K number of symbols on the basis of a slot boundary. For example, as illustrated in FIG. 20, when the user equipment is given the resource allocation information indicating that the starting symbol index of PUSCH is 4, the length is 4, and the transmission repetition number is 5, the user equipment may divide 20 symbols on the basis of a slot boundary since 20 symbols from starting symbol index 4 exceed a slot boundary. Therefore, in FIG. 20, two PUSCH repetitions may be transmitted.

Figure 21:
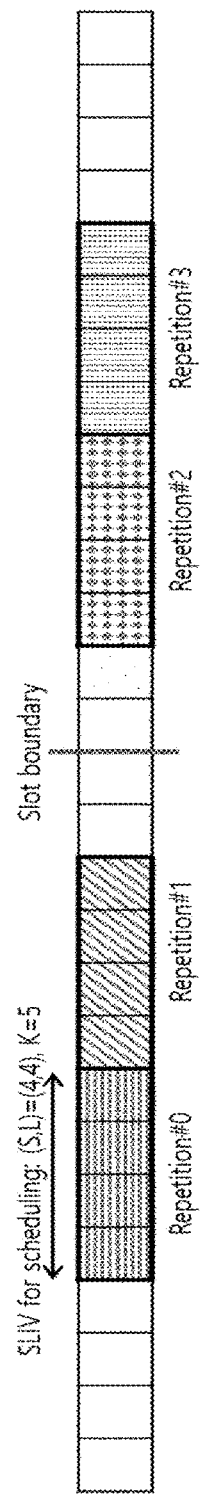

FIG. 21 is a diagram illustrating another example of a resource allocated for repeated transmission of PUSCH.

Referring to FIG. 21, when a resource allocated for repeated transmission of PUSCH includes a slot boundary, PUSCH may not be transmitted on the boundary.

In detail, the base station transmits, to the user equipment, resource allocation information of time domain for repeated transmission of PUSCH. The resource allocation information may include starting symbol index S, symbol length L, repetition number K. The user equipment determines a symbol on which PUSCH repetition for repeated transmission of PUSCH is to be transmitted on the basis of the resource allocation information. That is, as illustrated in FIG. 21, a first PUSCH repetition (repetition #0) may be determined on the basis of the starting symbol index and the symbol length included in the resource allocation information. Thereafter, a next PUSCH repetition may be successively transmitted on a symbol immediately next to the first PUSCH repetition.

However, since there are only two symbols included in a slot after a second PUSCH repetition (repetition #1), two symbols are required to be additionally allocated in a next slot beyond a slot boundary. That is, due to the slot boundary, two symbols are allocated to the first slot, and two symbols are additionally required in the next slot. In this case, the user equipment may not transmit a PUSCH on the last two symbols of a previous slot that are corresponding resources and the first two symbols of a next slot, and may resume repeated transmission of a PUSCH in a third PUSCH repetition (repetition #2) allocated in a next symbol. That is, in FIG. 21, the last two symbols of the first slot (that could be transmitted through the third PUSCH repetition if transmission is possible at a slot boundary) and the first two symbols of the second slot overlap with the slot boundary and are thus not transmitted.

Furthermore, when one PUSCH repetition overlaps with a downlink symbol or SS/PBCH block configured by semi-static UL/DL configuration, the PUSCH repetition may transmit PUSCH repetition on a symbol which does not overlap with the downlink symbol. In addition, the user equipment may also exclude, from PUSCH repetition, a flexible symbol next to the downlink symbol configured by semi-static UL/DL configuration.

Figure 22:
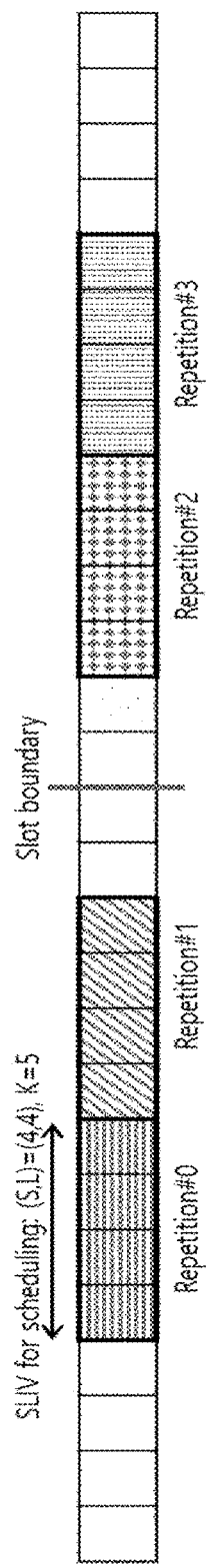

FIG. 22 is a diagram illustrating another example of a resource allocated for repeated transmission of PUSCH.

Referring to FIG. 22, when a resource allocated for repeated transmission of PUSCH includes a slot boundary, symbols positions on the slot boundary may be included in a previous PUSCH repetition and a next PUSCH repetition.

In detail, the base station transmits, to the user equipment, resource allocation information of time domain for repeated transmission of PUSCH. The resource allocation information may include starting symbol index S, symbol length L, repetition number K. The user equipment determines a symbol on which PUSCH repetition for repeated transmission of PUSCH is to be transmitted on the basis of the resource allocation information.

Here, a next PUSCH repetition is successively transmitted on a symbol next to a first PUSCH repetition (repetition #0). If symbols allocated to one PUSCH repetition exceed a slot boundary, the user equipment may divide the symbols allocated to the corresponding PUSCH repetition on the basis of the slot boundary, and may include the divided symbols in an adjacent PUSCH repetition of the same slot. If there is no adjacent PUSCH repetition, the user equipment cannot transmit PUSCH repetition on the above symbols.

For example, as illustrated in FIG. 22, symbols allocated to a third PUSCH repetition exceed a slot boundary. The symbols may be divided into two groups each including two symbols according to the slot boundary, and the last two symbols of the first slot may be included in a previous PUSCH repetition (repetition #1) and the first two symbols of the second slot may be included in a next PUSCH repetition (repetition #2).

In FIGS. 19 to 22, when determining PUSCH repetition for repeated transmission of PUSCH, a downlink symbol and/or SS/PBCH block configured by semi-static UL/DL configuration of a cell in which PUSCH repetition is transmitted is used. In addition, when the symbols described below overlap with a symbol for PUSCH repetition, the user equipment may regard the corresponding symbol as the same symbol as a symbol overlapping with a downlink symbol and/or SS/PBCH block configured by semi-static UL/DL configuration of a cell in which PUSCH repetition is transmitted is used.

That is, when a resource allocated for PUSCH repetition overlaps with a specific symbol, the corresponding symbol may be recognized not to be a valid symbol, and PUSCH repetition may be transmitted only on valid symbols. Here, a resource allocated to the base station is referred to as a nominal PUSCH repetition, and a resource which substantially enables repeated transmission of PUSCH is referred to as an actual PUSCH repetition excluding an invalid symbol from nominal PUSCH repetitions.

1) Semi-Static DL Symbol and a Symbol for Receiving SS/PBCH Block

When a symbol allocated by the base station through resource allocation information for transmission of PUSCH repetition overlaps with a downlink symbol configured through semi-static UL/DL configuration, the user equipment may recognize the corresponding symbol as an invalid symbol, and may transmit PUSCH repetition on a symbol which does not overlap with the downlink symbol configured through semi-static UL/DL configuration. Furthermore, a symbol (e.g., flexible symbol or the like) after the symbol indicated as a downlink by semi-static UL/DL configuration may also be recognized as an invalid symbol.

For example, a symbol indicated as a downlink by higher layer signaling (e.g., RRC configuration) may be considered to be an invalid symbol for PUSCH repetition. Furthermore, at least one symbol after the last symbol of symbols indicated as a downlink may be considered to be an invalid symbol. Here, the at least one symbol may be a gap symbol for changing a transmission direction from a downlink to an uplink.

Furthermore, a symbol overlapping with a symbol for receiving a SS/PBCH block may also be considered to be an invalid symbol. For example, symbols indicated for receiving SS/PBCH blocks by system information or configuration information may be considered to be invalid symbols for PUSCH repetition.

2) Symbol Overlapping with CORESET #0

A symbol overlapping with CORESET #0 indicated through PBCH is determined as an invalid symbol, and the user equipment cannot repeatedly transmit PUSCH on a symbol overlapping with CORESET #0 even if this symbol is allocated through PUSCH transmission by the base station. Here, CORESET #0 indicated through PBCH should be used by the user equipment for initial cell access. Therefore, symbols that configure CORESET #0 should not be used for transmission of an uplink channel or signal. Therefore, the user equipment may recognize nominal PUSCH repetition that is a resource allocated for repeated transmission of PUSCH, through resource allocation information including a starting index and length of a symbol to be transmitted by the user equipment by the base station. Thereafter, the user equipment may recognize a symbol related to CORESET #0 as an invalid symbol and may exclude this symbol from nominal PUSCH repetition.

That is, a symbol of CORESET #0 that is a resource set used for an initial access procedure indicated by resource information transmitted from the base station may be recognized as an invalid symbol.

For example, with regard to PUSCH repetition of a specific type (e.g., type B), the user equipment may determine invalid symbols for transmission of PUSCH repetition. In detail, symbols indicated as a search space of a specific type for detecting PDCCH for initial access in CORESET #0 that is CORESET for initial connection may be considered to be invalid symbols for transmitting PUSCH repetition.

Here, CORESET #0 and a search space of a specific type for detecting PDCCH for initial connection may be indicated by parameters of a master information block (MIB) or system information block (SIB) received through PBCH.

Here, PDCCH monitored in CORESET #0 indicated by PBCH may schedule a system information block and may be scrambled with SI-RNTI.

That is, a symbol overlapping with CORESET #0 may be determined as an invalid symbol such as a symbol indicated for downlink transmission by semi-static UL/DL configuration of a cell in which PUSCH repetition is transmitted or a symbol indicated for reception of SS/PBCH, described above with reference to FIGS. 19 to 22.

3) Downlink Symbol of Another Cell

When the user equipment only has half duplex capability (i.e., when the user equipment is a user equipment that is unable to receive in one cell and transmit in another cell simultaneously), the user equipment cannot transmit an uplink signal to the base station on a symbol overlapping with a symbol for receiving a downlink channel and signal if reception of a downlink channel and signal is indicated or set in another cell. Therefore, when a symbol configured for PUSCH repetition is configured (or indicated) as a downlink symbol in another cell, the user equipment that only supports half duplex capability recognizes the corresponding symbol as an invalid symbol and does not use this symbol for transmission of PUSCH repetition.

For example, a symbol overlapping with a symbol configured as a downlink symbol by semi-static UL/DL configuration of Pcell is an invalid symbol that cannot be used for transmission of PUSCH repetition. Here, Pcell (or primary cell) is one cell in carrier aggregation in which a plurality of cells are configured for the user equipment. The cell having a lowest index among the plurality of cells may be referred to as Pcell (or primary cell).

For example, when the user equipment satisfies the following condition to support only half duplex operation, if a symbol allocated by resource allocation information transmitted from the base station for PUSCH repetition overlaps with a symbol indicated for reception of SS/PBCH blocks in another cell, the user equipment may consider the corresponding symbol as an invalid symbol.

Furthermore, a symbol overlapping with a symbol indicated as a downlink by configuration information of a higher layer in one cell or a symbol (e.g., CSI-RS, PDCCH, or PDSCH) configured by one cell for reception of a downlink channel and signal may be considered to be an invalid symbol for transmission of PUSCH repetition.

Or, at least one of symbols overlapping with a symbol configured for receiving SS/PBCH block of a cell different from a serving cell in which the user equipment is to transmit PUSCH or symbols configured for monitoring PDCCH in CORESET #0 indicated by PBCH may be considered to be invalid symbols for transmission of PUSCH repetition.

4) Symbol Configured by RRC

The user equipment may not transmit PUSCH repetition on a symbol configured by a higher layer parameter as an invalid symbol for transmission of PUSCH repetition.

The user equipment may configure, for the user equipment, pattern information about an invalid symbol for PUSCH repetition in a bitmap form through a parameter of a higher layer signal. Each of bits of a pattern of a bitmap form indicates validity of each symbol. For example, when a bit value of a bitmap is 1, this value indicates that a symbol corresponding to the bit value is an invalid symbol.

The pattern information about an invalid symbol configured by a higher layer may be applied by an indicator included in DCI transmitted by PDCCH. That is, DCI may include an indicator indicating whether to apply the pattern information about an invalid symbol configured by a higher layer signal, and the user equipment may apply the pattern information about a symbol configured by a higher layer signal, according to a value of the indicator received through DCI.

For example, when the value of the indicator received by DCI is 1, the user equipment may apply the pattern information about an invalid symbol, and may recognize a symbol corresponding to each bit of the bitmap of the pattern information as an invalid symbol for transmission of PUSCH repetition. The user equipment may transmit PUSCH repetition on symbols allocated for PUSCH repetition, except for symbols determined as invalid symbols on the basis of the pattern information.

5) At Least G Number of Symbols After Symbols Corresponding to One of 1) to 4)

G number of symbols positioned after the last symbol of symbols that correspond to above-described 1) to 4) and are thus considered to be invalid symbols may be recognized as invalid symbols. For example, at least one of G number of symbols (G is an integer) after the last symbol of semi-static DL symbol and symbols for receiving SS/PBCH block, described in 1), G number of symbols after the last symbol of symbols for monitoring PDCCH in CORESET #0 indicated by PBCH, described in 2), G number of symbols after the last symbol of downlink symbols of another cell when the user equipment supports only half duplex operation, described in 3), and G number of symbols after the last symbol of symbols configured as invalid symbols by RRC, described in 4), may be considered to be invalid symbols for transmission of PUSCH repetition.

Here, the symbols of 2) to 5) may be determined among symbols except for at least the symbols described in 1). That is, the symbols of 2) to 5) may be determined among symbols configured as flexible symbols and/or uplink symbols by semi-static UL/DL configuration of a cell in which PUSCH repetition is transmitted or among all symbols when there is no semi-static UL/DL configuration. This is for preventing the symbols determined in 1) from overlapping with the symbols determined in 2) to 5).

As described above, symbols that cannot be used for transmission of PUSCH repetition may include at least one of the following symbols.

1) Semi-static DL symbol and a symbol for receiving SS/PBCH block
2) Symbol overlapping with CORESET #0
3) Downlink symbol of another cell
4) Symbol configured as an invalid symbol by RRC
5) At least G number of symbols after the last symbol of symbols corresponding to 1) to 4)

The user equipment may repeatedly transmit PUSCH on actual PUSCH repetitions that are resources obtained by excluding invalid symbols such as the above-described invalid symbols from nominal PUSCH repetitions that are resources allocated through resource allocation information of the base station for PUSCH repetition.

The five types of symbols described in 1) to 5) cannot be used for transmitting PUSCH even if the symbols correspond to symbols allocated by the base station for repeated transmission of PUSCH, and may be differentiated as below according to whether the base station performs scheduling/transmission. Hereinafter, symbols corresponding to 1) to 5) are defined as an invalid symbol set.

An invalid symbol set corresponding to a first type is a set of symbols in which uplink transmission by the user equipment is absolutely impossible.

For example, the first-type invalid symbol set may be a symbol set configured with some of the symbols described in 1) among symbols included in the invalid symbol set. The user equipment cannot perform uplink transmission on a downlink symbol configured by semi-static DL/UL configuration among symbols corresponding to 1).

Or, the first-type invalid symbol set may be a symbol set configured with some of the symbols described in 1) among symbols included in the invalid symbol set. A symbol for receiving SS/PBCH blocks among symbols corresponding to 1) may be included in the first-type invalid symbol set. Since a symbol for receiving SS/PBCH blocks is used by the base station to perform downlink transmission, the user equipment is required to receive SS/PBCH blocks on the corresponding symbol. Therefore, the user equipment cannot perform uplink transmission on the corresponding symbol.

Or, the first-type invalid symbol set may be a symbol set configured with symbols corresponding to 3) among symbols included in the invalid symbol set. Since symbols corresponding to 3) are used for receiving a downlink symbol of one cell when the user equipment supports only half duplex operation, the user equipment which supports only half duplex operation cannot perform uplink transmission on the corresponding symbols.

Or, the first-type invalid symbol set may be a symbol set configured with at least one of symbols corresponding to 1) or 3) among symbols included in the invalid symbol set. That is, at least one of the semi-static DL symbol and symbol for receiving SS/PBCH block, described in 1), and/or the symbol for transmitting a downlink signal of a reference cell when the user equipment supports only half duplex operation, described in 3), may be included in the first-type invalid symbol set. That is, the first-type invalid symbol set may be configured with all of the symbols corresponding to 1) and 3) or only some of the symbols corresponding to 1) and 3).

A second-type invalid symbol set is a set of symbols in which uplink transmission by the user equipment is not necessarily impossible (i.e., symbols in which uplink transmission is possible according to situations).

For example, the second-type invalid symbol set may be a symbol set configured with symbols corresponding to 2) among the above-described invalid symbols. The above-described symbols corresponding to 2) represent symbols for monitoring PDCCH in CORESET #0 indicated by PBCH. The base station may or may not transmit PDCCH in CORESET #0. Therefore, when the base station does not transmit PDCCH on the corresponding symbol, the user equipment may transmit an uplink signal on a symbol for monitoring PDCCH.

Furthermore, when PDCCH has been detected, the user equipment may transmit an uplink signal on a symbol after a symbol on which PDCCH has been detected among symbols for monitoring PDCCH, and, thus, the user equipment can repeatedly transmit PUSCH on the corresponding symbol.

Here, as described above, symbols for receiving SS/PBCH block of 1) to symbols corresponding to 5) represent symbols other than symbols configured as downlink symbols by semi-static DL/UL configuration of a cell in which PUSCH repetition is transmitted.

Furthermore, the second-type invalid symbol set may be a symbol set configured with symbols corresponding to 5) among the above-described invalid symbols. The symbols corresponding to 5) represent at least G number of symbols positioned after the last symbol of symbols corresponding to 1) to 4).

The symbols corresponding to 5) are symbols used for switching from downlink reception to uplink transmission (RX-to-TX switching) for uplink transmission after the user equipment receives a signal transmitted on symbols corresponding to 1) to 4). However, since the user equipment does not always receive a downlink channel or signal on symbols corresponding to 1) to 4), symbols for switching from downlink reception to uplink transmission may not be necessary when not receiving a downlink channel or signal.

For example, a downlink signal is transmitted and received on a symbol configured as a downlink symbol by semi-static DL/UL configuration in 1) only when a downlink channel/signal is scheduled or configured, and, thus, a downlink signal is not always transmitted on this symbol. Furthermore, although SS/PBCH blocks are transmitted by the base station in 1), the user equipment may skip reception of SS/PBCH blocks without receiving SS/PBCH blocks in a particular case. Also in the case of 2), with regard to a symbol for monitoring PDCCH in CORESET #0 indicated by PBCH, the base station may or may not transmit PDCCH on the symbol for monitoring. Therefore, the user equipment may skip PDCCH on the corresponding symbol without receiving PDCCH in a special case. Furthermore, when the user equipment supports only half duplex operation in 3), even if a downlink signal is transmitted in one cell, the user equipment may skip reception of the transmitted signal without receiving the signal in a particular case. Furthermore, also in the case of 4), since a symbol is configured as an invalid symbol by the base station, pattern information about an invalid symbol may not be applied by an indicator of DCI through a higher layer signal, and a downlink signal may not be transmitted on the corresponding symbol. Therefore, in such a case, since symbols for RX-to-TX switching are not necessary, it may be possible for the user equipment to perform uplink transmission on the corresponding symbols.

Or, the second-type invalid symbol set may be a symbol set configured with at least one of symbols corresponding to 2) to 5) among symbols included in the invalid symbol set. That is, the second-type invalid symbol set may be configured with all of the symbols corresponding to 2) to 5) or only some of the symbols corresponding to 2) to 5).

The first-type invalid symbol set and the second-type invalid symbol set do not have duplicate symbols therebetween, and the union of the two symbol sets may be the same as a set of all invalid symbols. That is, the second-type invalid symbol set may include only symbols other than the symbols i4444441111111111111111111ncluded in the first-type invalid symbol set.

Preferably, the first-type invalid symbol set may be configured with symbols corresponding to 1) and 3) among the symbols included in the invalid symbol set, and the second-type invalid symbol set may be configured with the symbols included in the invalid symbol set except for the symbols corresponding to the first type.

The base station may schedule, for the user equipment, PUSCH repetition for repeated transmission of PUSCH. Here, PDCCH (or DCI) for scheduling PUSCH repetition may include a starting symbol index and length of a first nominal PUSCH repetition, and may further include the number of repetitions of transmission of PUSCH repetition. The user equipment may receive the PDCCH (or DCI), and may obtain information about the number of repetitions of transmission of PUSCH repetition and symbols in which the first nominal PUSCH repetition is scheduled, on the basis of the starting symbol index and length of the received PDCCH (or DCI).

The user equipment may determine symbols in which a second nominal PUSCH repetition having a length of L is scheduled immediately after the symbols in which the first nominal PUSCH repetition is scheduled. Here, the length L is equal to the length of the first nominal PUSCH repetition. Furthermore, the user equipment may determine symbols in which a third nominal PUSCH repetition having a length of L is scheduled immediately after the symbols in which the second nominal PUSCH repetition is scheduled. This process may be repeated until symbols in which corresponding PUSCH repetitions are scheduled are determined on the basis of the number of repetitions of PUSCH repetition obtained from PDCCH (or DCI).

The user equipment determines whether determined symbols scheduled as nominal PUSCH repetition overlap with symbols included in the invalid symbol set, and recognizes an overlapping symbol as an invalid symbol to exclude this symbol from scheduled symbols. That is, the user equipment does not transmit PUSCH repetition on a symbol overlapping with an invalid symbol. The user equipment may determine actual PUSCH repetition for actual transmission of PUSCH by grouping successive symbols that do not exceed a slot boundary among symbols except for the overlapping symbols.

Some of symbols corresponding to the invalid symbol set may be used for transmission of PUSCH repetition in a particular situation, but may be always excluded from transmission of PUSCH repetition. For example, it is preferable that symbols (symbols included in the first-type invalid symbol set) in which uplink transmission is necessarily impossible among symbols of 1) to 5) corresponding to the above-described invalid symbol set are excluded during a process of determining actual PUSCH repetition for actual transmission of PUSCH. However, it is preferable that symbols (symbols included in the second invalid symbol set) in which uplink transmission is not necessarily impossible under a particular condition are selectively excluded during a process of determining actual PUSCH repetition.

In a first embodiment of the present invention, when symbols in which a determined first nominal PUSCH repetition is scheduled overlap with symbols included in the first-type invalid symbol set, the user equipment excludes the corresponding symbols from the symbols in which the nominal PUSCH repetition is scheduled. However, symbols overlapping with symbols included in the second-type invalid symbol set are not excluded from the symbols in which the first nominal PUSCH repetition is scheduled. That is, the user equipment does not transmit nominal PUSCH repetition only on a symbol overlapping with the first-type invalid symbol set. The user equipment may determine actual PUSCH repetition for actual transmission of PUSCH by grouping successive symbols that do not exceed a slot boundary among symbols except for symbols overlapping with the first-type invalid symbol.

The user equipment excludes, from symbols in which PUSCH repetition is scheduled, symbols in which a nominal PUSCH repetition after the determined first nominal PUSCH repetition is scheduled and which overlaps with symbols included in the first-type invalid symbol set or the second-type invalid symbol set. That is, the user equipment does not transmit nominal PUSCH repetition on a symbol overlapping with the first-type invalid symbol set and a symbol overlapping with the second-type invalid symbol set. The user equipment may determine actual PUSCH repetition by grouping successive symbols that do not exceed a slot boundary among symbols except for symbols overlapping with the first-type and second-type invalid symbol sets.

When the base station schedules PUSCH repetition for the user equipment, the base station indicates symbols allocated to a first nominal PUSCH repetition, and next PUSCH repetitions are determined by symbols after the first nominal PUSCH repetition. Therefore, the base station may indicate, in PDCCH (or DCI), symbols in which the first nominal PUSCH repetition is transmitted. If symbols included in the second-type invalid symbol set cannot be used in the first nominal PUSCH repetition, the base station may indicate the first nominal PUSCH repetition on symbols except for the symbols included in the second-type invalid symbol set. On the contrary, the base station may schedule the first nominal PUSCH repetition on symbols included in the second-type invalid symbol set. In this case, the symbols included in the second-type invalid symbol set may be available for the first nominal PUSCH repetition.

Figure 23:
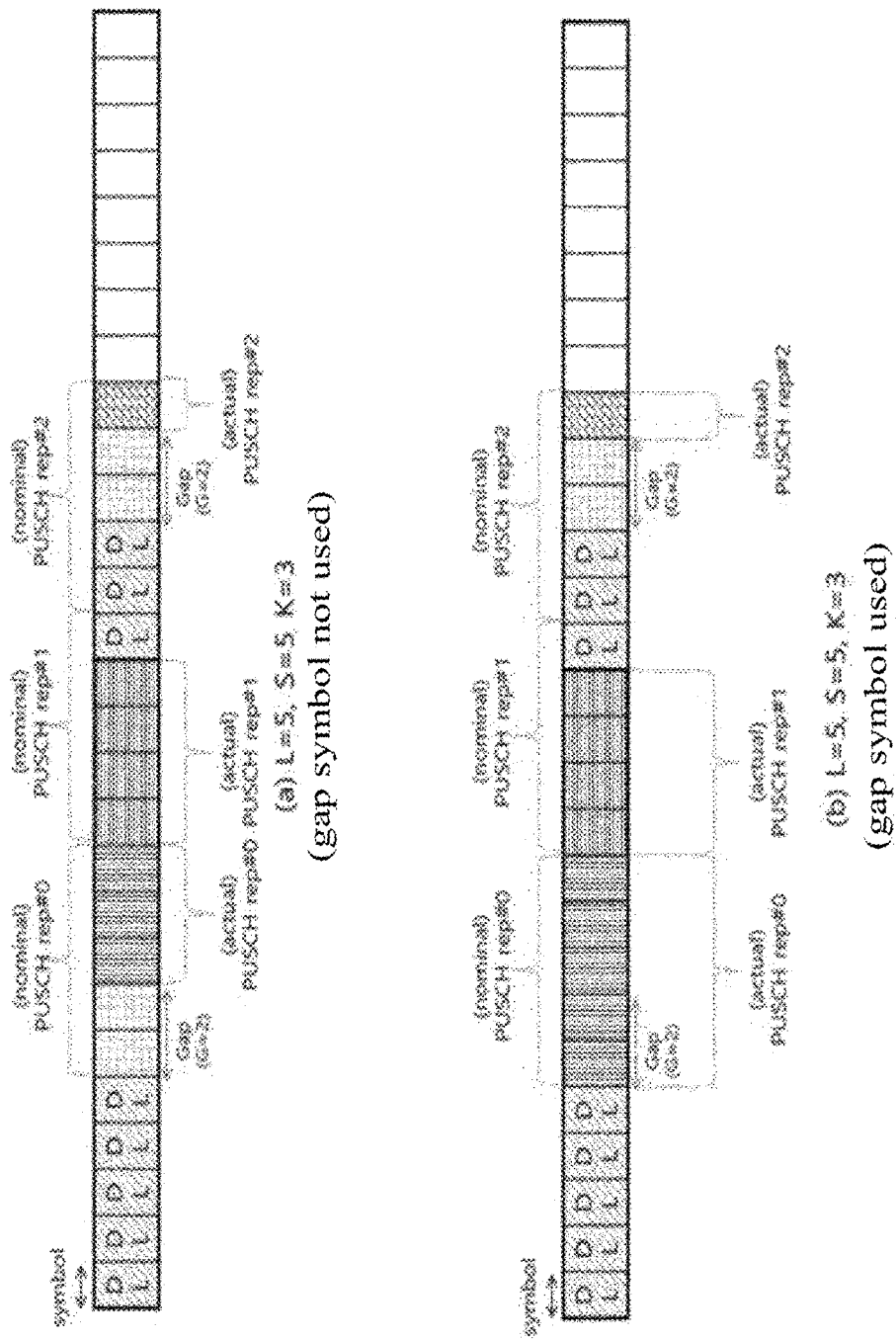
FIGS. 23 and 24 are diagrams illustrating another example of a symbol in which repeated transmission of PUSCH cannot be performed according to an embodiment of the present invention.
Figure 24:
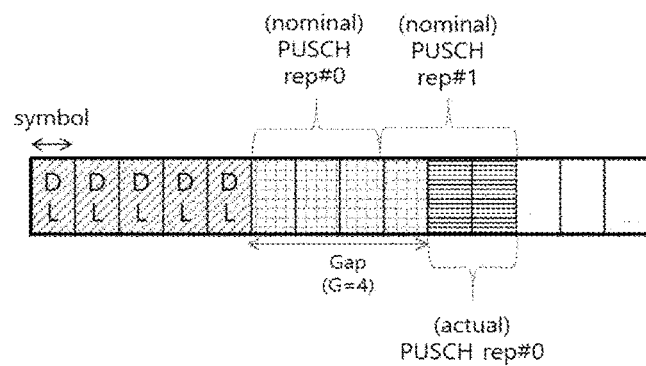
Figure 24:
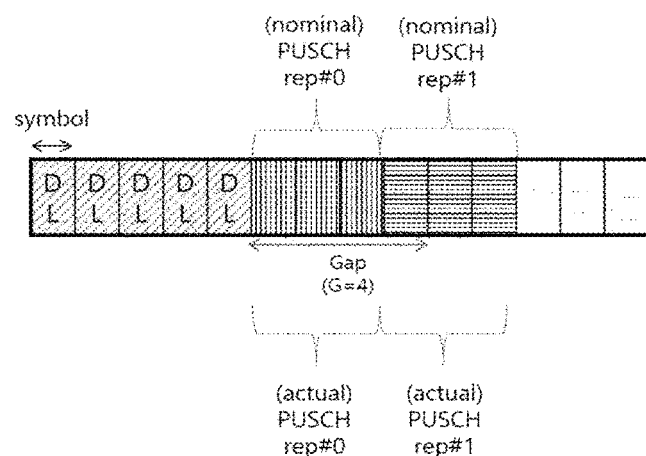

FIGS. 23 and 24 are diagrams illustrating another example of a symbol in which repeated transmission of PUSCH cannot be performed according to an embodiment of the present invention.

FIG. 23 is a diagram illustrating an example of excluding an invalid symbol from symbols allocated for repeated transmission of PUSCH in an embodiment of the present invention.

Referring to FIG. 23, in the above-described invalid symbol set, a symbol configured as a downlink by semi-static DL/UL configuration among symbols corresponding to 1) and at least G number of symbols (G is assumed as 2 in the present embodiment) for switching from downlink to uplink corresponding to 5) may be excluded as invalid symbols.

Here, the symbols corresponding to 1) may belong to a first type, and the symbols corresponding to 5) may belong to a second type.

Referring to FIG. 23A, all symbols may be considered to be invalid symbols and may be excluded from nominal PUSCH repetition without differentiating the first type and the second type. That is, from symbols in which a certain nominal PUSCH repetition is scheduled, symbols overlapping with symbols included in an invalid symbol set (union of the first type and the second type) may be excluded. For example, as illustrated in FIG. 23A, the user equipment may receive, from the base station, PDCCH (or DCI) for scheduling PUSCH repetition. Here, the PDCCH (or DCI) may include at least one of an index value (S=5) of the starting symbol of a first nominal PUSCH repetition, a length (L=5), and the number of repetitions (K=3).

The first nominal PUSCH repetition (PUSCH rep #0) does not overlap with a first-type invalid symbol (i.e., semi-static downlink symbol), but overlaps with a symbol (i.e., G=2 symbol after the semi-static downlink symbol) corresponding to 5) and belonging to the second type. Therefore, in the first nominal PUSCH repetition, the user equipment may determine, as actual PUSCH repetition to be actually transmitted, three consecutive symbols other than two symbols corresponding to 5).

A second nominal PUSCH repetition (PUSCH rep #1) has a last symbol overlapping with a first-type downlink symbol (i.e., semi-static downlink symbol). Therefore, in the second nominal PUSCH repetition, the user equipment may determine, as actual PUSCH repetition to be actually transmitted, four consecutive symbols other than one semi-static downlink symbol corresponding to the first type.

A third nominal PUSCH repetition (PUSCH rep #2) has first two symbols overlapping with a symbol belonging to the first type and has third and fourth symbols overlapping with a symbol corresponding to 5) of the second type. Therefore, in the third nominal PUSCH repetition, the user equipment may determine, as actual PUSCH repetition to be actually transmitted, one consecutive symbol other than symbols corresponding to 1) and 5).

Referring to FIG. 23B, symbols included in an invalid symbol set of a first type and a second type may be differentially excluded. That is, from symbols in which a certain nominal PUSCH repetition is scheduled, symbols overlapping with symbols included in an invalid symbol set (union of the first type and the second type) may be differentially excluded. In other words, among symbols in which a first nominal PUSCH repetition is scheduled, a symbol overlapping with a symbol included in the first-type invalid symbol set may be excluded. However, among symbols in which a nominal PUSCH repetition after the first nominal PUSCH repetition is scheduled, a symbol overlapping with a symbol included in the first-type and second-type invalid symbol set may be excluded.

For example, as illustrated in FIG. 23B, the user equipment may receive, from the base station, PDCCH (or DCI) for scheduling PUSCH repetition. Here, the PDCCH (or DCI) may include at least one of an index value (S=5) of the starting symbol of a first nominal PUSCH repetition, a length (L=5), and the number of repetitions (K=3).

The first nominal PUSCH repetition (PUSCH rep #0) does not overlap with a first-type invalid symbol (i.e., semi-static downlink symbol), but overlaps with a symbol (i.e., G=2 symbol after the semi-static downlink symbol) corresponding to 5) and belonging to the second type. In this case, since only a symbol corresponding to the first type is excluded from scheduled symbols, the symbol (G=2) corresponding to 5) of the second type is not excluded. Therefore, the user equipment may determine, as actual PUSCH repetition to be actually transmitted, five successive symbols of the first nominal PUSCH repetition.

A second nominal PUSCH repetition (PUSCH rep #1) has a last symbol overlapping with a first-type invalid symbol (i.e., semi-static downlink symbol). Therefore, in the second nominal PUSCH repetition, the user equipment may determine, as actual PUSCH repetition to be actually transmitted, four consecutive symbols other than one semi-static downlink symbol corresponding to the first type.

A third nominal PUSCH repetition (PUSCH rep #2) has first two symbols overlapping with a symbol belonging to the first type and has third and fourth symbols overlapping with a symbol corresponding to 5) of the second type. Therefore, in the third nominal PUSCH repetition, the user equipment may determine, as actual PUSCH repetition to be actually transmitted, one consecutive symbol other than symbols corresponding to 1) and 5). That is, in the third nominal PUSCH repetition, a gap symbol corresponding to 5) may be selectively applied as an invalid symbol, unlike in the second nominal PUSCH repetition.

In a second embodiment of the present invention, a symbol overlapping with a symbol in which a first nominal PUSCH repetition is scheduled, among symbols included in the second-type invalid symbol set, may be used in the first nominal PUSCH repetition, and, additionally, in nominal PUSCH repetitions after the first nominal PUSCH repetition, symbols to be used are determined according to a result of the first nominal PUSCH repetition.

That is, the symbol scheduled and used in the first nominal PUSCH repetition among the symbols included in the second-type invalid symbol set may be regarded as a symbol that is also used in next nominal PUSCH repetition.

For example, the second-type invalid symbol set may include the above-described symbols corresponding to 5). In the present embodiment, G number of symbols after the last symbol of a semi-static downlink symbol are exemplarily described as invalid symbols belonging to the second type. If the first nominal PUSCH repetition is scheduled to overlap with some of the G number of symbols, the user equipment may not exclude overlapping symbols among the G number of symbols from symbols in which nominal PUSCH repetition is scheduled and may use the same for transmitting nominal PUSCH repetition. Thereafter, when symbols allocated for a second nominal PUSCH repetition overlap with some of the G number of symbols, the user equipment is required to determine whether to exclude or use some symbols overlapping with the second nominal PUSCH repetition among the G number of symbols.

Here, the G number of symbols may represent symbols that can be used as an RX-to-TX switching time for the user equipment to receive a downlink channel signal scheduled/configured on a semi-static downlink symbol and transmit an uplink channel/signal. Therefore, when some overlapping symbols among the G number of symbols are used in the first nominal PUSCH repetition without being excluded, some overlapping symbols among the G number of symbols may also be sued in the second nominal repetition.

FIG. 24 is a diagram illustrating another example of excluding an invalid symbol from symbols allocated for repeated transmission of PUSCH in an embodiment of the present invention.

Referring to FIG. 24, a second embodiment may be applied so that some symbols may be excluded from PUSCH repetition. In FIG. 24, the user equipment has received PDCCH (or DCI) for scheduling PUSCH repetition, wherein the PDCCH (or DCI) indicates that the index (S) of the first symbol of a first (nominal) PUSCH repetition is 5, the length (L) is 3, and the number of repetitions is 2. First five symbols of a slot are configured as downlink symbols by semi-static DL/UL configuration, and the other symbols are configured as flexible or uplink symbols. In FIG. 24, symbols corresponding to 1) (symbols configured as downlink symbols by semi-static DL/UL configuration) and symbols corresponding to 5) (at least G number of symbols after the last symbol of the symbols configured as downlink symbol by semi-static DL/UL configuration, G is assumed as 4) in the invalid symbol set are used as an example to provide descriptions. Here, the first-type invalid symbol set includes symbols corresponding to 1), and the second-type invalid symbol set includes symbols corresponding to 5).

In FIG. 24A, all symbols may be considered to be invalid symbols and may be excluded from nominal PUSCH repetition without differentiating the first type and the second type. That is, from symbols in which a certain nominal PUSCH repetition is scheduled, symbols overlapping with symbols included in an invalid symbol set (union of the first type and the second type) may be excluded. As illustrated in FIG. 24A, in the first nominal PUSCH repetition, there is no remaining symbol if symbols overlapping with symbols corresponding to the first type and the second type are excluded. The first symbol of a second nominal PUSCH repetition overlaps with a symbol belonging to the second type. Therefore, in the second nominal PUSCH repetition, the user equipment may determine, as actual PUSCH repetition to be actually transmitted, two successive symbols other than one symbol corresponding to 5).

In FIG. 24B, a symbol belonging to the second type is not excluded from the first nominal PUSCH repetition, unlike FIG. 24A. That is, the first nominal PUSCH repetition does not overlap with a symbol corresponding to the first type, but overlaps with a symbol corresponding to the second type. However, a symbol corresponding to the second type may be used in the first nominal PUSCH repetition without being excluded. In this case, three successive symbols included in the first nominal PUSCH repetition may be determined as actual PUSCH repetition to be actually transmitted. A second nominal PUSCH repetition overlaps with a symbol corresponding to the second type. However, since a symbol corresponding to the second type has not been excluded from the first nominal PUSCH repetition, a symbol corresponding to the second type is not excluded from the second nominal PUSCH repetition either. Therefore, three successive symbols included in the second nominal PUSCH repetition may be determined as actual PUSCH repetition to be actually transmitted.

<Proposal 4: Method for Determining Numerology of Gap Symbol>

When at least G number of symbols of 5) included in an invalid symbol set are defined, a time point at which the G number of symbols start and numerology (i.e., subcarrier spacing) of the G number of symbols may be determined. Hereinafter, a method for defining at least G number of symbols after a semi-static downlink symbol will be described with regard to Proposal 4. However, this method may also be applied to at least G number of symbols after a symbol for receiving SS/PBCH block, at least G number of symbols after a symbol for monitoring PDCCH of CORE-SET #0 indicated by PBCH, and, when user equipment supports half duplex operation, at least G number of symbols after a downlink signal of another cell. That is, this method may be applied to all of the above-described symbols corresponding to 5).

First, the time point at which G number of symbols start may be defined as below.

If a last time point of a last downlink symbol in DL BWP (this is the same as a start time point of a next symbol of the last downlink symbol) is the same as a last time point of a certain uplink symbol of UL BWP (this is the same as a start time point of a next symbol of the uplink symbol), the user equipment may determine the last time point as the time point at which G number of symbols start.

If a last time point of a last downlink symbol in DL BWP (this is the same as a start time point of a next symbol of the last downlink symbol) is not the same as a last time point of a certain uplink symbol of UL BWP (this is the same as a start time point of a next symbol of the uplink symbol), the user equipment may determine, as the time point at which G number of symbols start, the last time point of one symbol among uplink symbols overlapping with the last downlink symbol. Here, the last time point of the last uplink symbol among the uplink symbols overlapping with the last downlink symbol may be determined as the time point at which G number of symbols start.

That is, the starting symbol of G number of symbols may be determined on the basis of the last symbol of symbols for uplink transmission.

For another example, the last time point of the first symbol among the uplink symbols overlapping with the last downlink symbol may be determined as the time point at which G number of symbols start. If a last time point of a last downlink symbol in DL BWP (this is the same as a start time point of a next symbol of the last downlink symbol) is not the same as a last time point of a certain uplink symbol of UL BWP (this is the same as a start time point of a next symbol of the uplink symbol), the user equipment may determine, as the time point at which G number of symbols start, the start time point of one symbol among uplink symbols overlapping with the last downlink symbol. Here, the start time point of the last uplink symbol among the uplink symbols overlapping with the last downlink symbol may be determined as the time point at which G number of symbols start.

For another example, here, the start time point of the first symbol among the uplink symbols overlapping with the last downlink symbol may be determined as the time point at which G number of symbols start.

If a last time point of a last downlink symbol in DL BWP (this is the same as a start time point of a next symbol of the last downlink symbol) is not the same as a last time point of a certain uplink symbol of UL BWP (this is the same as a start time point of a next symbol of the uplink symbol), the user equipment may determine, as the time point at which G number of symbols start, the last time point of one symbol among uplink symbols overlapping with a next symbol of the last downlink symbol.

Here, the last time point of the last symbol among the uplink symbols overlapping with the next symbol of the last downlink symbol may be determined as the time point at which G number of symbols start. For another example, here, the last time point of the first symbol among the uplink symbols overlapping with the next symbol of the last downlink symbol may be determined as the time point at which G number of symbols start.

If a last time point of a last downlink symbol in DL BWP (this is the same as a start time point of a next symbol of the last downlink symbol) is not the same as a last time point of a certain uplink symbol of UL BWP (this is the same as a start time point of a next symbol of the uplink symbol), the user equipment may determine, as the time point at which G number of symbols start, the start time point of one symbol among uplink symbols overlapping with a next symbol of the last downlink symbol. Here, the start time point of the last symbol among the uplink symbols overlapping with the next symbol of the last downlink symbol may be determined as the time point at which G number of symbols start.

For another example, here, the start time point of the first symbol among the uplink symbols overlapping with the next symbol of the last downlink symbol may be determined as the time point at which G number of symbols start.

Numerology (e.g., subcarrier spacing) of G number of symbols may be determined as below. For reference, the length of G number of symbols is determined according to the numerology, and the determined length of G number of symbols starts from the time point, determined through the above embodiment, at which G number of symbols start.

Through a first method, the numerology of G number of symbols may be determined as a subcarrier spacing of active UL BWP.

Through a second method, the numerology of G number of symbols may be determined as a subcarrier spacing of active DL BWP.

Through a third method, the numerology of G number of symbols may be determined as a maximum value or minimum value of a subcarrier spacing of active DL BWP and a subcarrier spacing of active UL BWP.

Through a fourth method, the numerology of G number of symbols may be determined as a maximum value or minimum value in a list of subcarrier spacings that can be used in a cell in which G number of symbols are to be applied.

Through a fifth method, the numerology of G number of symbols may be determined as a reference subcarrier spacing used in semi-static UL/DL configuration of a cell in which G number of symbols are to be applied. The reference subcarrier spacing is a subcarrier spacing used for determining the duration of a downlink symbol or the duration of an uplink symbol according to semi-static UL/DL configuration of a cell.

Through a sixth method, the numerology of G number of symbols may be determined as a fixed number. This fixed value may vary in FR1 and in FR2. Furthermore, this value may be a minimum value or maximum value among subcarrier spacings that can be used in each FR. For example, when the fixed value is the minimum value of subcarrier spacings that can be used in each FR, the fixed value is 15-kHz subcarrier spacing for FR1 and 60-kHz subcarrier spacing for FR2. For example, when the fixed value is the maximum value of subcarrier spacings that can be used in each FR, the fixed value is 60-kHz subcarrier spacing for FR1 and 120-kHz subcarrier spacing for FR2.

Through a seventh method, the numerology of G number of symbols may be set from the base station. That is, the base station may transmit, to the user equipment, a subcarrier spacing to be used in G number of symbols, and the user equipment may use a value received from the base station as a subcarrier spacing of G number of symbols.

Figure 25:
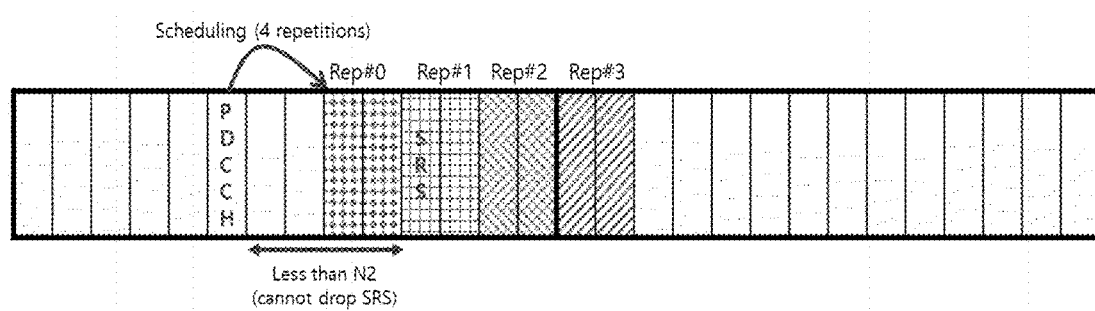
FIG. 25 illustrates an example of a method for determining an invalid symbol according to an embodiment of the present invention.

FIG. 25 illustrates an example of a method for determining an invalid symbol according to an embodiment of the present invention.

Referring to FIG. 25, the user equipment may be instructed, through DCI of PDCCH, to repeatedly transmit PUSCH, and may determine symbols in which PUSCH repetition corresponding to repeated transmission of PUSCH cannot be transmitted, so as to perform repeated transmission of PUSCH through an allocated resource.

In detail, the user equipment may determine (or decide) symbols in which PUSCH repetition cannot be transmitted. When there is a non-cancellable uplink channel or signal according to a processing time capability of the user equipment, the user equipment may determine a resource for repeated transmission of PUSCH. Furthermore, the user equipment may determine symbols in which repeated transmission of PUSCH cannot be performed such as PRACH occasion. Although the following descriptions are provided on the basis of a non-cancellable uplink signal or channel, the present invention is not limited thereto, and may be equally applied to other cases such as PRACH occasion.

As illustrated in FIG. 25, the user equipment may be instructed, through PDCCH, to repeatedly transmit PUSCH. That is, the base station may add resource allocation information for repeated transmission of PUSCH and transmission repetition number information to DCI of PDCCH to transmit the same, and the user equipment may receive, through PDCCH, a time frequency resource for first PUSCH repeated transmission and the number of transmission repetitions. Here, the resource allocation information may include a starting symbol index and length of first PUSCH repeated transmission.

The user equipment performs the first PUSCH repeated transmission on the time/frequency resource indicated through PDCCH, and performs PUSCH repeated transmission as many times as the number of transmission repetitions. For example, as illustrated in FIG. 25, PDCCH may schedule first PUSCH repeated transmission having a length of 2 from a ninth symbol of a first slot. That is, in order to indicate repeated transmission of PUSCH, DCI of PDCCH may include index information and length information about a starting symbol index of 9 and a length of 2 of the first PUSCH repeated transmission, and may further include transmission repetition number information about the number of transmission repetitions of 4 in order to indicate the number of transmission repetitions of 4.

The user equipment may perform the first repeated transmission on 9th and 10th symbols of the first slot. Furthermore, the user equipment may perform second repeated transmission on 11th and 12th symbols of the first slot, third repeated transmission on 13th and 14th symbols of the first slot, and fourth repeated transmission on 1st and 2nd symbols of a second slot.

Here, when transmission of an uplink signal or channel is scheduled or set on the 11th symbol of the first slot, the user equipment requires at least N2 symbols (or time T2) from an end of PDCCH to a symbol to which the uplink signal or channel is allocated, in order to cancel (or drop) the set transmission of the uplink signal or channel. That is, the transmission of an uplink signal or channel within N2 symbols (or time T2) from the end of PDCCH cannot be cancelled (or dropped) due to the processing time of the user equipment.

In this case, the user equipment may perform PUSCH repeated transmission through the following method.

In a first embodiment, the user equipment may determine symbols on which PUSCH repeated transmission is to be performed regardless of whether an uplink signal or channel is cancelled (or dropped).

Figure 26:
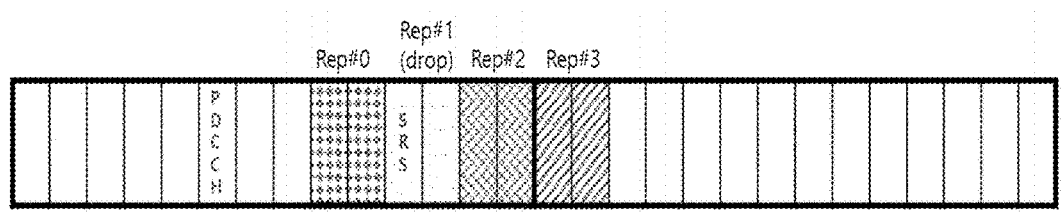
FIG. 26 illustrates an example of a method for determining a symbol for repeated transmission of PUSCH according to an embodiment of the present invention.

FIG. 26 illustrates an example of a method for determining a symbol for repeated transmission of PUSCH according to an embodiment of the present invention.

Referring to FIG. 26, the user equipment may determine symbols on which PUSCH repeated transmission is to be performed regardless of whether an uplink signal or channel is cancelled or dropped. Furthermore, when a symbol for one PUSCH repeated transmission overlaps with an uplink signal or channel that cannot be cancelled (or dropped), PUSCH repeated transmission may not be performed on the overlapping symbol, and the uplink signal or channel that cannot be cancelled (or dropped) may be transmitted.

Here, a redundancy value (RV) of each PUSCH repeated transmission may be determined regularly regardless of each PUSCH repeated transmission. For example, if indicated RVs are a, b, c, d in this order, the RVs of 'a', 'b', 'c', and 'd' may be respectively allocated to a first PUSCH repeated transmission, a second PUSCH repeated transmission, a third PUSCH repeated transmission, and a fourth PUSCH repeated transmission.

In FIG. 26, a symbol for a second PUSCH repeated transmission (Rep #1) overlaps with a symbol for transmission of SRS that is a non-cancellable signal. Therefore, the user equipment may transmit the SRS on the corresponding symbol without transmitting the second PUSCH repeated transmission (Rep #1).

According to this method, a RV may be simply allocated, and PUSCH may be repeatedly transmitted. However, reliability may deteriorate since PUSCH is repeatedly transmitted a number of times that is less than the number of transmission repetitions indicated by the base station through DCI of PDCCH. Furthermore, since PUSCH repeated transmission corresponding to one RV among indicated RVs is cancelled (or dropped) without being performed, the relevant reliability may also deteriorate.

In a second embodiment, the user equipment may determine a symbol for PUSCH repeated transmission to perform PUSCH repeated transmission after confirming whether an uplink signal or channel is cancelled (or dropped).

Figure 27:
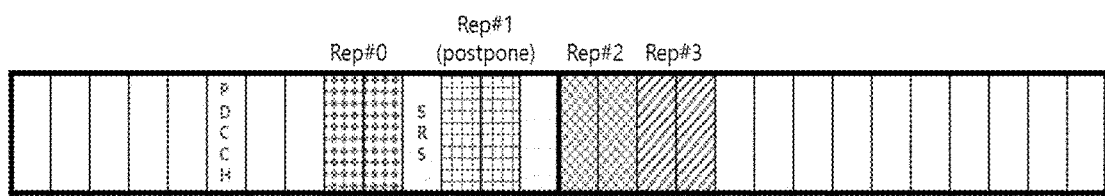
FIG. 27 illustrates another example of a method for determining a symbol for repeated transmission of PUSCH according to an embodiment of the present invention.

FIG. 27 illustrates another example of a method for determining a symbol for repeated transmission of PUSCH according to an embodiment of the present invention.

Referring to FIG. 27, the user equipment may determine a symbol for PUSCH repeated transmission according to the number of PUSCH transmission repetitions to transmit PUSCH, after confirming whether an uplink signal or channel is cancelled (or dropped). Furthermore, RVs to be applied to each PUSCH repeated transmission may be sequentially determined as 'a', 'b', 'c', and 'd' according to determined PUSCH repeated transmission.

As illustrated in FIG. 27, since a SRS signal that is a non-cancellable uplink signal or channel is positioned on an 11th symbol of a first slot, repeated transmission of PUSCH is possible on symbols other than the corresponding symbol. Therefore, a symbol for a second PUSCH repeated transmission may be postponed by one symbol compared to when there is no SRS signal, according to the symbol on which the non-cancellable SRS signal is positioned.

Furthermore, thereafter, a symbol allocation for a third PUSCH repeated transmission and a symbol allocation for a fourth PUSCH repeated transmission may follow. According to this method, PUSCH repeated transmission may be performed in compliance with the number of PUSCH transmission repetitions indicated by the base station through DCI of PDCCH compared to the first embodiment of FIG. 26. Furthermore, since omission of RVs does not occur, high reliability may be provided. However, in this case, overall PUSCH repeated transmission may be temporally delayed, thus increasing latency.

In a third embodiment, the user equipment may determine symbols on which PUSCH repeated transmission is to be performed regardless of whether an uplink signal or channel is cancelled (or channel).

Figure 28:
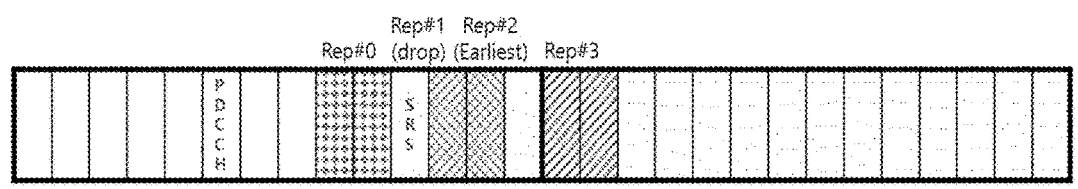
FIG. 28 illustrates another example of a method for determining a symbol for repeated transmission of PUSCH according to an embodiment of the present invention.

FIG. 28 illustrates another example of a method for determining a symbol for repeated transmission of PUSCH according to an embodiment of the present invention.

Referring to FIG. 28, when a symbol for one PUSCH repeated transmission overlaps with a symbol of an uplink signal or channel that cannot be cancelled (or dropped), PUSCH repeated transmission may not be performed on the overlapping symbol, and the uplink signal or channel that cannot be cancelled (or dropped) may be transmitted. Furthermore, when a cancelled PUSCH repeated transmission is present, next PUSCH repeated transmissions may be performed on a symbol on which transmission can be most quickly performed among remaining symbols.

As illustrated in FIG. 28, when a second PUSCH repeated transmission (Rep #1) overlaps with a symbol for a non-cancellable SRS signal, the PUSCH repeated transmission is cancelled (or dropped). Thereafter, symbols on which PUSCH repeated transmissions (Rep #2, Rep #3) are to be transmitted may be re-determined as symbols on which the transmissions can be most quickly performed among remaining symbols. That is, the third PUSCH repeated transmission (Rep #2) is allocated to 13th and 14th symbols of a first slot normally, but may be transmitted on 12th and 13th symbols that are symbols to be transmitted most quickly after the second PUSCH repeated transmission (Rep #1) is cancelled. That is, the third PUSCH repeated transmission may be advanced by one symbol so as to be transmitted.

Compared to the first method, this method provides the same reliability and provides low latency since transmission is carried out at an as early symbol as possible.

In another embodiment of the present invention, the base station may change an uplink beam for transmitting each PUSCH repeated transmission to the user equipment. This is because reliability can be improved by using different uplink beams when the base station transmits a signal to the user equipment using beamforming in a high frequency band.

This may be referred to as beam diversity. In an embodiment of the present invention, at least one symbol gap may be inserted between PUSCH repeated transmissions transmitted using different beams, thereby securing a time for the user equipment to change a beam. Here, the number of symbols for the gap may vary according to an uplink subcarrier spacing. That is, as the uplink subcarrier spacing increases, the number of symbols that can be used for the gap may increase.

Another problem to be solved by the present invention relates to a method for calculating the size of a transport block (TB) when transmitting PUSCH repetition. According to TS38.214, the size of TB may be proportional to the number of REs of a resource to which PUSCH is allocated. That is, a PUSCH having a larger number of allocated REs may have a larger size of TB. However, as described above with regard to the embodiments related to PUSCH repetition, the number of REs that may be occupied by each PUSCH may vary. For example, a first PUSCH repetition may occupy two symbols, and a second PUSCH repetition may occupy 10 symbols. In this case, it is necessary to determine on which number of REs the size of TB should be based.

A preferred embodiment of the present invention relates to a method of determining the size of TB so that a first PUSCH is decodable. The reason why PUSCH repetition is used is because a latency time can be reduced through a fast decoding success. Therefore, it is important that a first PUSCH is decodably transmitted. To this end, the user equipment may determine the size of TB according to the number of REs of the first PUSCH. To generalize, the user equipment may determine the size of TB on the basis of a minimum value of REs corresponding to PUSCH repetition with a RV value of 0. However, when the size of TB is determined always on the basis of the number of REs of the first PUSCH, an optimum TB size may not be determined since the number of REs occupied by another PUSCH is not considered.

For example, when the number of REs occupied by the first PUSCH is larger than the number of REs occupied by a second PUSCH, if the size of TB is determined on the basis of the number of REs occupied by the first PUSCH, a code rate increases due to the fewer number of REs occupied by the second PUSCH, thus causing performance deterioration.

According to a preferred embodiment for resolving this issue, if the number of REs of the first PUSCH repetition is less than the average of the numbers of REs of all repetitions (i.e., the value obtained by dividing the number of REs of all PUSCH repetitions by the number of repetitions), the size of TB may be determined according to the number of REs of the first PUSCH; otherwise, the size of TB for PUSCH may be determined according to the average of the numbers of REs of all repetitions.

According to a preferred embodiment for resolving this issue, if the size of TB according to the number of REs of the first PUSCH repetition is less than the average of sizes of TB according to the numbers of REs of all repetitions (i.e., the value obtained by dividing the sum of sizes of TB according to the number of REs of each PUSCH repetition by the number of repetitions), the size of TB is determined according to the number of REs of the first PUSCH; otherwise, the size of TB is determined according to the average of sizes of TB according to the numbers of REs of all repetitions.

The size of TB for repeated transmission of PUSCH may be determined using this method.

Figure 29:
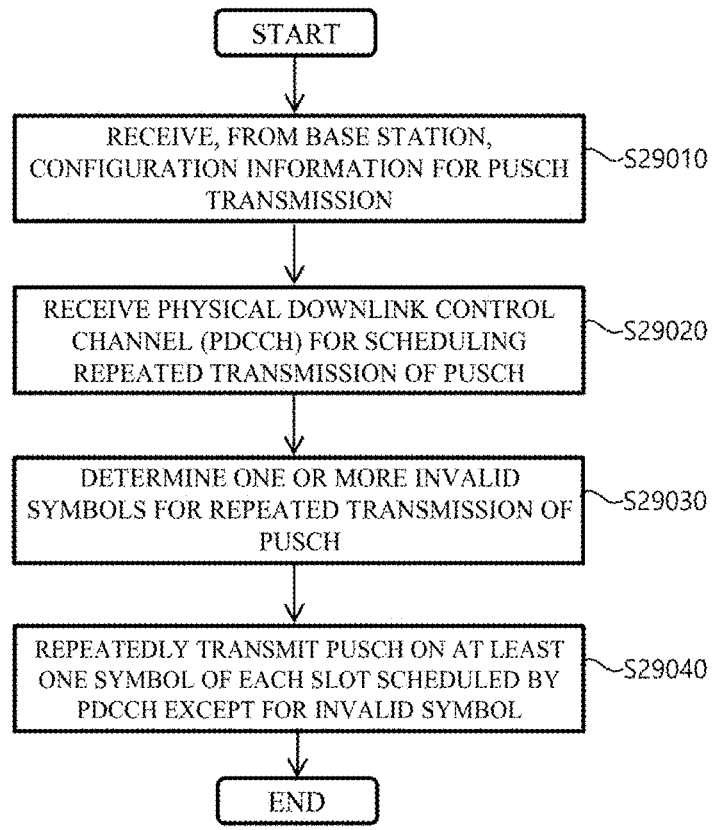
FIG. 29 is a flowchart illustrating an example of a method for a user equipment to perform repeated transmission of PUSCH according to an embodiment of the present invention.

FIG. 29 is a flowchart illustrating an example of a method for a user equipment to perform repeated transmission of PUSCH according to an embodiment of the present invention.

Referring to FIG. 29, the user equipment may determine a resource for PUSCH repeated transmission of a specific type to perform repeated transmission of PUSCH. Here, repeated transmission of PUSCH may be performed through a resource configured with symbols except for an invalid symbol.

In detail, first, the user equipment may receive, from a base station, configuration information for PUSCH transmission (S29010). Here, the configuration information may include resource information related to a control resource set used for an initial access procedure and/or bitmap information indicating a symbol pattern of an invalid symbol.

Furthermore, the configuration information may further include information for indicating a semi-static downlink symbol and information indicating a symbol for receiving SS/PBCH block.

Thereafter, the user equipment may receive, from the base station, PDCCH including DCI for scheduling repeated transmission of PUSCH (S29020). DCI may include at least one of a starting symbol index of a first PUSCH repetition, a length and the number of repetitions.

Furthermore, DCI may further include an indicator related to whether to apply the bitmap information indicating an invalid symbol, transmitted through the configuration information.

Thereafter, the user equipment may determine one or more invalid symbols for repeated transmission of PUSCH (S29030). The one or more invalid symbols may include the above-described symbols corresponding to 1) to 5).

That is, the one or more invalid symbols may include the following symbols.

1) Semi-static DL symbol and a symbol for receiving SS/PBCH block
2) Symbol overlapping with CORESET #0
3) Downlink symbol of another cell
4) Symbol configured as an invalid symbol by RRC
5) At least G number of symbols after the last symbol of symbols corresponding to 1) to 4)

For example, the one or more invalid symbols may include a symbol indicated by the resource information related to the resource set used for the initial access procedure.

Thereafter, the user equipment may repeatedly transmit PUSCH on at least one symbol of each slot scheduled by PDCCH except for the invalid symbol (S29040).

Here, invalid symbols may be classified into the first type or the second type as described above, and a symbol belonging to the first type may be necessarily excluded from symbols allocated for repeated transmission of PUSCH, and a symbol belonging to the second type may be or may not be excluded according to situations.

Furthermore, a subcarrier spacing of a gap symbol may be a reference subcarrier spacing included in semi-static uplink and/or downlink configuration information of a cell to which the gap symbol is applied for repeated transmission of PUSCH.

Figure 30:
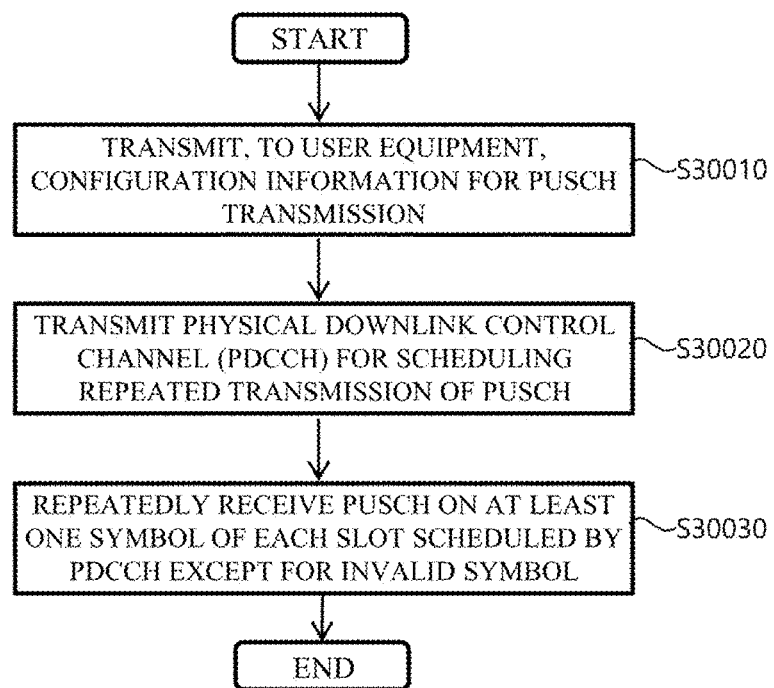
FIG. 30 is a flowchart illustrating an example of a method for a base station to repeatedly receive PUSCH according to an embodiment of the present invention.

FIG. 30 is a flowchart illustrating an example of a method for a base station to repeatedly receive PUSCH according to an embodiment of the present invention.

Referring to FIG. 30, the base station may repeatedly receive, from the user equipment, PUSCH through a resource determined for repeated transmission of PUSCH of a specific type. Here, repeated transmission of PUSCH may be performed through a resource configured with symbols except for an invalid symbol.

In detail, first, the base station may transmit, to the user equipment, configuration information for PUSCH transmission (S30010). Here, the configuration information may include resource information related to a control resource set used for an initial access procedure and/or bitmap information indicating a symbol pattern of an invalid symbol.

Furthermore, the configuration information may further include information for indicating a semi-static downlink symbol and information indicating a symbol for receiving SS/PBCH block.

Thereafter, the base station may transmit, to the user equipment, PDCCH including DCI for scheduling repeated transmission of PUSCH (S30020). DCI may include at least one of a starting symbol index of a first PUSCH repetition, a length and the number of repetitions.

Furthermore, DCI may further include an indicator related to whether to apply the bitmap information indicating an invalid symbol, transmitted through the configuration information.

Thereafter, the base station may repeatedly receive the PUSCH on at least one symbol of each slot scheduled by PDCCH except for an invalid symbol (S30040).

The one or more invalid symbols may include the above-described symbols corresponding to 1) to 5).

That is, the one or more invalid symbols may include the following symbols.

1) Semi-static DL symbol and a symbol for receiving SS/PBCH block
2) Symbol overlapping with CORESET #0
3) Downlink symbol of another cell
4) Symbol configured as an invalid symbol by RRC
5) At least G number of symbols after the last symbol of symbols corresponding to 1) to 4)

For example, the one or more invalid symbols may include a symbol indicated by the resource information related to the resource set used for the initial access procedure.

Here, invalid symbols may be classified into the first type or the second type as described above, and a symbol belonging to the first type may be necessarily excluded from symbols allocated for repeated transmission of PUSCH, and a symbol belonging to the second type may be or may not be excluded according to situations.

Furthermore, a subcarrier spacing of a gap symbol may be a reference subcarrier spacing included in semi-static uplink and/or downlink configuration information of a cell to which the gap symbol is applied for repeated transmission of PUSCH.

Through this method, the base station may repeatedly receive, from the user equipment, PUSCH only on valid symbols.

The above description of the present invention is merely illustrative, and it would be easily understood that those of ordinary skill in the art could easily make modifications without departing from the technical concept of the present invention or changing essential features. Therefore, the above embodiments should be considered illustrative and should not be construed as limiting. For example, each component described as a single type may be distributed, and likewise, components described as being distributed may be implemented as a combined form.

The scope of the present invention is indicated by the following claims rather than the detailed description, and it should be construed that all changes or modifications derived from the meaning and scope of the claims and their equivalents are included in the scope of the present invention.

What is claimed is:

1. A method for use by a user equipment in a wireless communication system, the method comprising:
   receiving a physical downlink control channel (PDCCH) for scheduling repeated transmission of a physical uplink shared channel (PUSCH);
   determining an invalid symbol group for the repeated transmission of the PUSCH; and
   performing the repeated transmission of the PUSCH on at least one symbol scheduled by the PDCCH except for the invalid symbol group,
   wherein, when the repeated transmission of the PUSCH overlaps with one or more symbols of a control resource set (CORESET) and when the overlapped CORESET is a CORESET indicated by a physical broadcast channel (PBCH) among a plurality of CORESETs associated with the user equipment, the invalid symbol group includes the one or more symbols of the overlapped CORESET, and
   wherein each of the plurality of CORESETs represents a respective time-frequency resource to which at least one search space for PDCCH monitoring is associated.

2. The method of claim 1,
   wherein the CORESET indicated by the PBCH has an index value of 0.

3. The method of claim 1,
   wherein the invalid symbol group further includes a symbol indicated as a semi-static downlink symbol for downlink reception and synchronization signal (SS) and/or a symbol for receiving the PBCH.

4. The method of claim 1,
   wherein, when the user equipment supports only a half duplex mode, the invalid symbol group further includes a symbol allocated for a downlink channel and signal and/or a symbol indicated as a semi-static downlink symbol in a cell different from a cell in which the repeated transmission of the PUSCH is performed.

5. The method of claim 1,
   wherein the invalid symbol group further includes a gap symbol, and
   wherein the gap symbol is at least one symbol positioned after a symbol indicated for downlink reception.

6. The method of claim 5,
   wherein a subcarrier spacing of the gap symbol is a reference subcarrier spacing included in semi-static uplink and/or downlink configuration information of a cell to which the gap symbol is applied for the repeated transmission of the PUSCH.

7. The method of claim 5,
   wherein the symbol indicated for downlink reception is a semi-static downlink symbol, a symbol for receiving a SS/PBCH block, or a symbol included in control resource set.

8. The method of claim 1, wherein, when the repeated transmission of the PUSCH overlaps with a physical uplink control channel (PUCCH) over a plurality of PUSCH repetitions, and when a condition is satisfied:
   uplink control information (UCI) associated with the PUCCH is transmitted through an earliest PUSCH repetition among the overlapped plurality of the PUSCH repetitions.

9. The method of claim 8,
   wherein the condition includes at least one of:
      the earliest PUSCH repetition satisfies a processing time for multiplexing with the UCI, and
      the earliest PUSCH repetition includes more than one symbol.

10. The method of claim 1,
    wherein, when the overlapped CORESET is not the CORESET indicated by the PBCH, the overlapped CORESET is not subject to the invalid symbol group.

11. The method of claim 1,
    wherein the CORESET indicated by the PBCH is associated with a cell access.

12. A user equipment for use in a wireless communication system, the user equipment comprising:
    a communication module; and
    a processor for controlling the communication module,
    wherein the processor is configured to:
    receive a physical downlink control channel (PDCCH) for scheduling repeated transmission of a physical uplink shared channel (PUSCH);
    determine an invalid symbol group for the repeated transmission of the PUSCH; and
    perform the repeated transmission of PUSCH on at least one symbol scheduled by the PDCCH except for the invalid symbol group,
    wherein, when the repeated transmission of the PUSCH overlaps with one or more symbols of a control resource set (CORESET) and when the overlapped CORESET is a CORESET indicated by a physical broadcast channel (PBCH) among a plurality of CORESETs associated with the user equipment, the invalid symbol group includes the one or more symbols of the overlapped CORESET, and
    wherein each of the plurality of CORESETs represents a respective time-frequency resource to which at least one search space for PDCCH monitoring is associated.

13. The user equipment of claim 12,
    wherein the CORESET indicated by the PBCH has an index value of 0.

14. The user equipment of claim 12,
    wherein the invalid symbol group further includes a symbol indicated as a semi-static downlink symbol for downlink reception and synchronization signal (SS) and/or a symbol for receiving the PBCH.

15. The user equipment of claim 12,
    wherein, when the user equipment supports only a half duplex mode, the invalid symbol group further includes a symbol allocated for a downlink channel and signal and/or a symbol indicated as a semi-static downlink symbol in a cell different from a cell in which the repeated transmission of the PUSCH is performed.

16. The user equipment of claim 12, wherein the invalid symbol group further includes a gap symbol, and wherein the gap symbol is at least one symbol positioned after a symbol indicated for downlink reception.

17. The user equipment of claim 16,
    wherein a subcarrier spacing of the gap symbol is a reference subcarrier spacing included in semi-static uplink and/or downlink configuration information of a cell to which the gap symbol is applied for the repeated transmission of the PUSCH.

18. The user equipment of claim 16,
    wherein the symbol indicated for downlink reception is a semi-static downlink symbol, a symbol for receiving a SS/PBCH block, or a symbol included in control resource set.

19. The user equipment of claim 12, wherein, when the repeated transmission of the PUSCH overlaps with a physical uplink control channel (PUCCH) over a plurality of PUSCH repetitions, and when a condition is satisfied:
- uplink control information (UCI) associated with the PUCCH is transmitted through an earliest PUSCH repetition among the overlapped plurality of the PUSCH repetitions.

20. The user equipment of claim 19,
wherein the condition includes at least one of:
- the earliest PUSCH repetition satisfies a processing time for multiplexing with the UCI, and
- the earliest PUSCH repetition includes more than one symbol.

21. The user equipment of claim 12,
wherein, when the overlapped CORESET is not the CORESET indicated by the PBCH, the overlapped CORESET is not subject to the invalid symbol group.

22. The user equipment of claim 12,
wherein the CORESET indicated by the PBCH is associated with a cell access.

* * * * *